US011083977B2

(12) United States Patent
Bedi

(10) Patent No.: US 11,083,977 B2
(45) Date of Patent: Aug. 10, 2021

(54) DISTILLATION APPARATUS AND METHOD

(71) Applicant: Sanjeev Bedi, Waterloo (CA)

(72) Inventor: Sanjeev Bedi, Waterloo (CA)

(73) Assignee: Sanjeev Bedi

( * ) Notice: Subject to any disclaimer, the term of this patent is extended or adjusted under 35 U.S.C. 154(b) by 86 days.

(21) Appl. No.: 16/492,859

(22) PCT Filed: Mar. 8, 2018

(86) PCT No.: PCT/CA2018/050273
§ 371 (c)(1),
(2) Date: Sep. 10, 2019

(87) PCT Pub. No.: WO2018/161167
PCT Pub. Date: Sep. 13, 2018

(65) Prior Publication Data
US 2020/0171406 A1    Jun. 4, 2020

Related U.S. Application Data

(60) Provisional application No. 62/470,121, filed on Mar. 10, 2017.

(51) Int. Cl.
| B01D 5/00 | (2006.01) |
| B01D 1/28 | (2006.01) |
| B01D 1/00 | (2006.01) |
| B01D 1/22 | (2006.01) |
| B01D 3/00 | (2006.01) |
| C02F 1/04 | (2006.01) |
| F28D 21/00 | (2006.01) |

(52) U.S. Cl.
CPC .............. B01D 5/006 (2013.01); B01D 1/28 (2013.01); *B01D 1/0082* (2013.01); *B01D 1/222* (2013.01); *B01D 3/007* (2013.01); *C02F 1/048* (2013.01); *F28D 2021/0066* (2013.01)

(58) Field of Classification Search
None
See application file for complete search history.

(56) References Cited

U.S. PATENT DOCUMENTS

| 2,065,147 A | 12/1936 | Munson et al. |
| 2011/0011724 A1* | 1/2011 | Schmitt .................. F28F 25/00 |
| | | 203/10 |

FOREIGN PATENT DOCUMENTS

| CA | 2801236 A1 | 12/2011 |
| FR | 2326656 A1 | 4/1977 |

* cited by examiner

*Primary Examiner* — Derek N Mueller
(74) *Attorney, Agent, or Firm* — Riodut & Maybee LLP

(57) ABSTRACT

A distillation apparatus includes an evaporator-condenser heat exchanger in combination with a compressor. The heat exchanger is mounted to float in an at least partially immersed position in a sump of liquid. The liquid may be a sap, or may be soiled water, and may have suspended solid. Heating of the liquid yield steam, the steam is compressed, and the heated, compressed steam is fed back into the heat exchanger to provide further heat to the liquid. The process yields a concentrated in the liquid bath and distilled water, each of which may be a desired product. The system may include a pre-heater that exchanges residual heat from the hot distillate with the cooler input liquid. The apparatus and process may have multiple stages.

20 Claims, 30 Drawing Sheets

FIG 2: TS diagram for steam

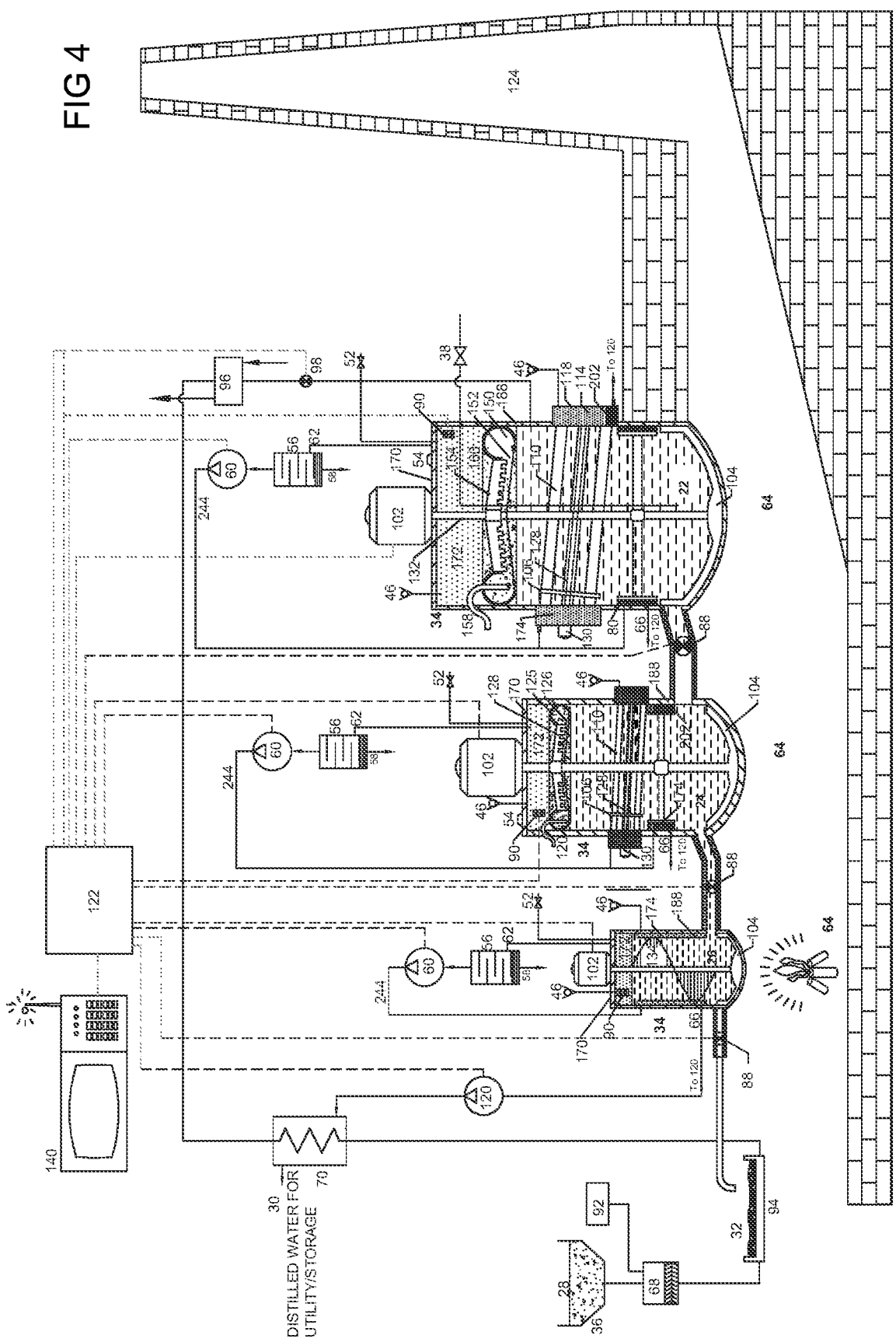

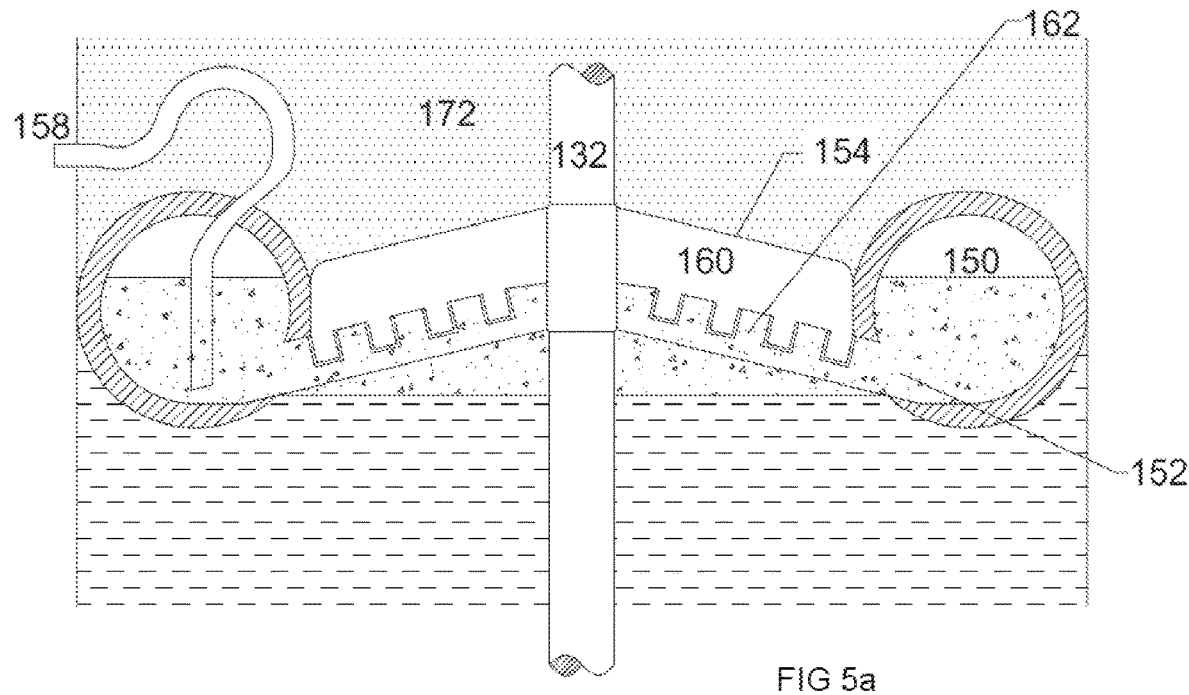
FIG 5a
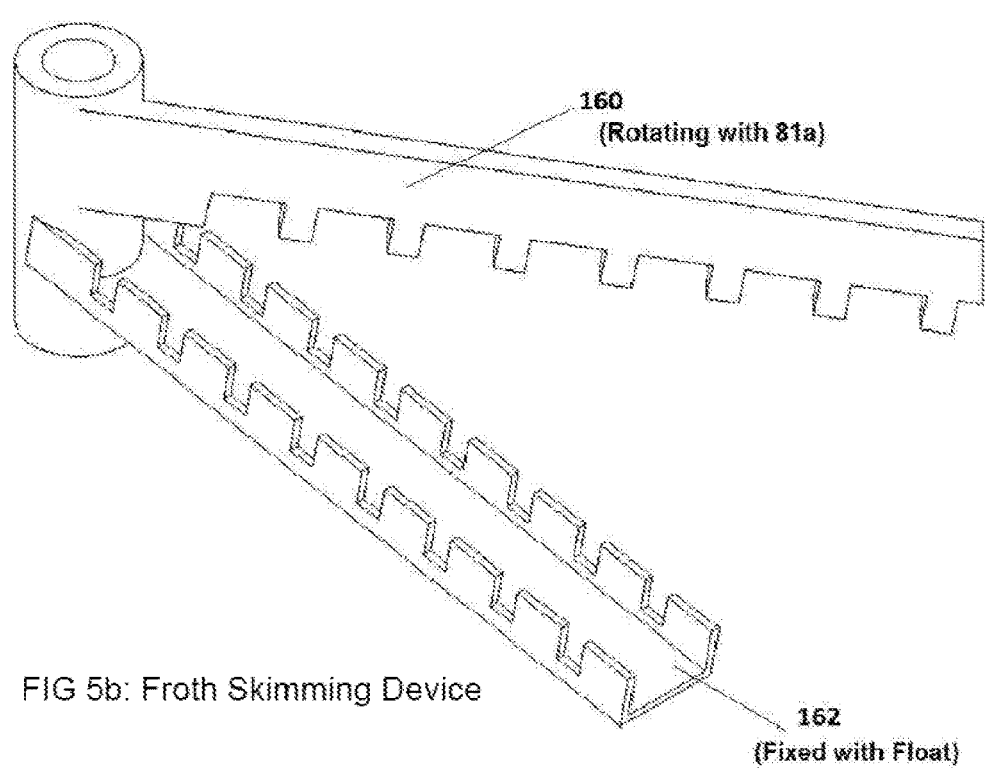
FIG 5b: Froth Skimming Device

FIG 7
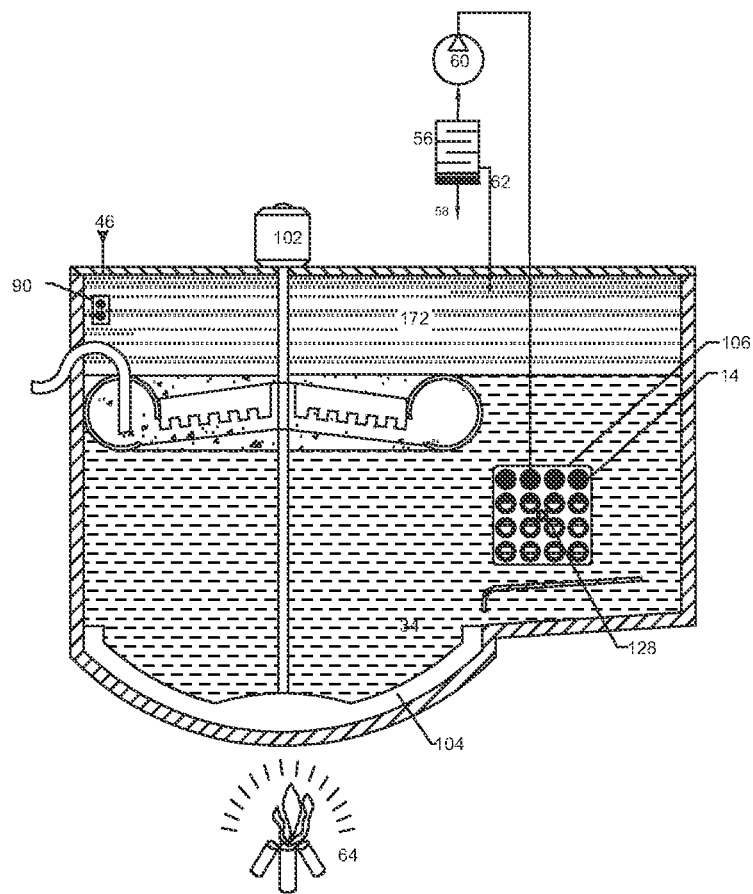
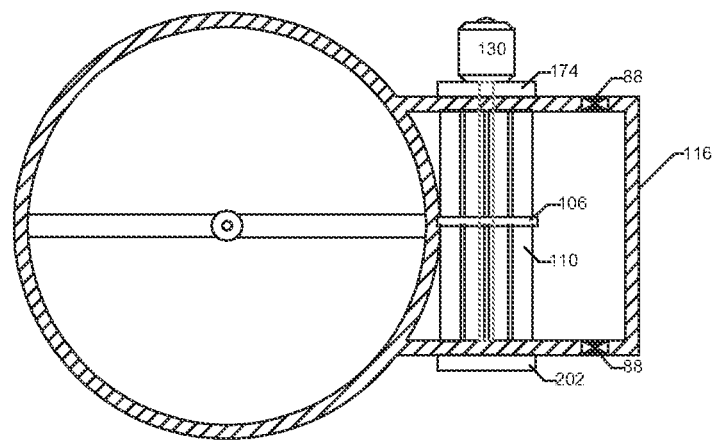

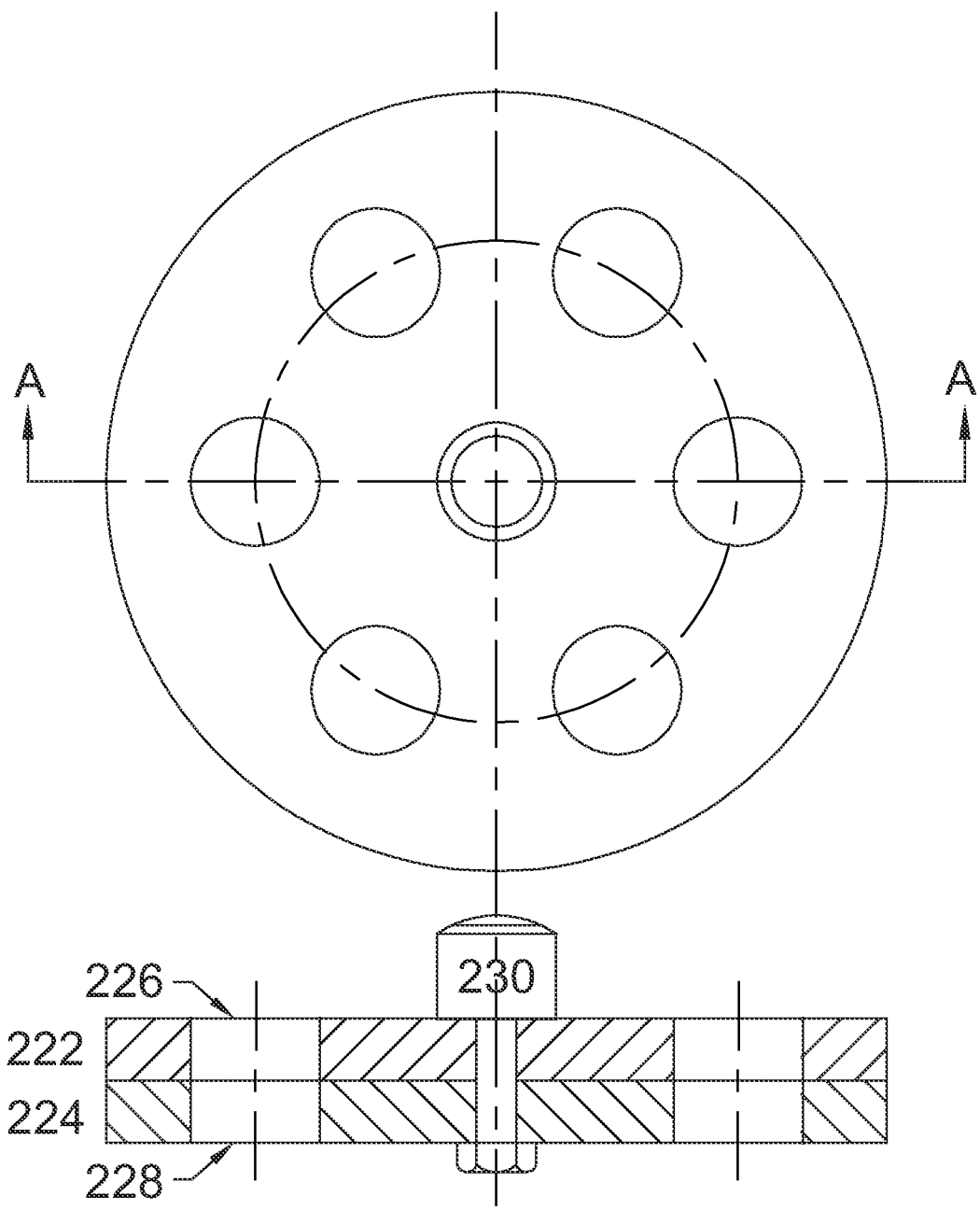

FIG 18c
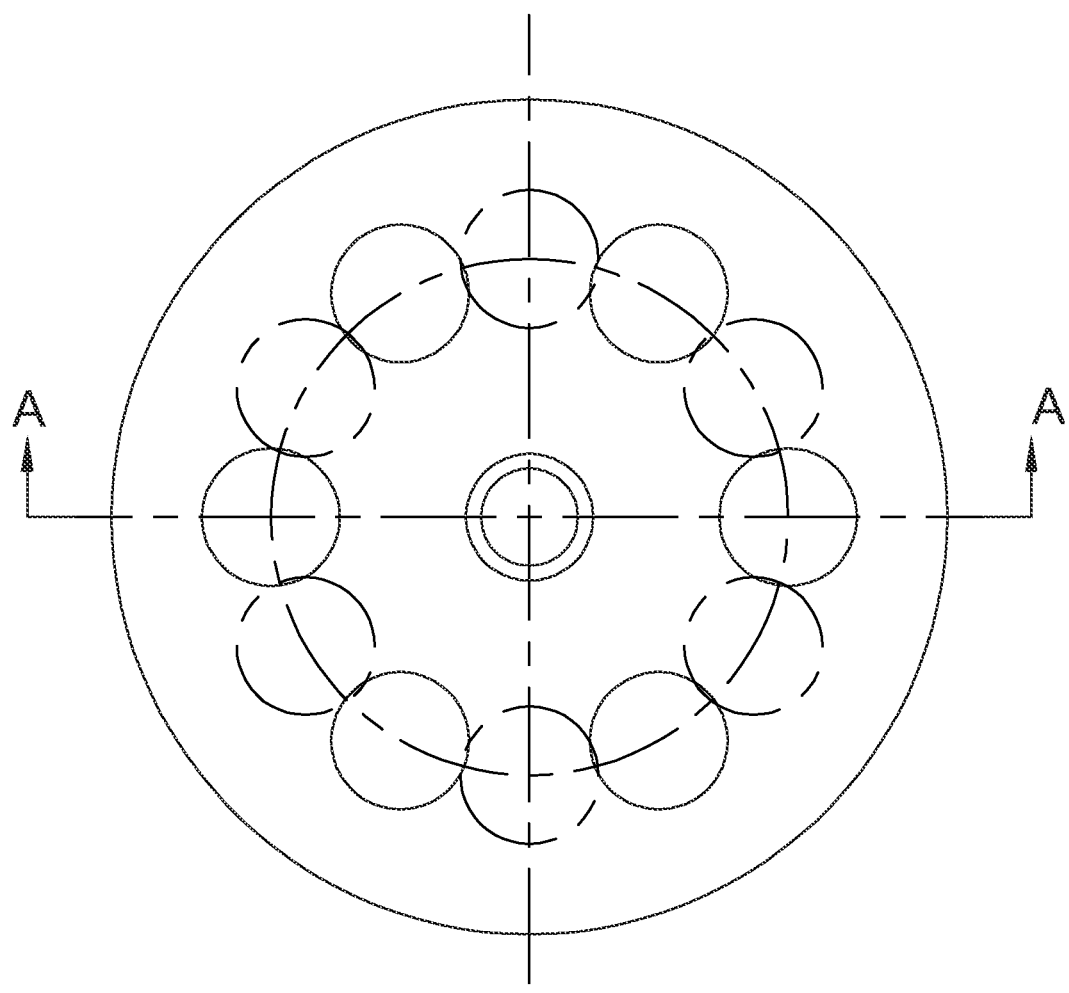
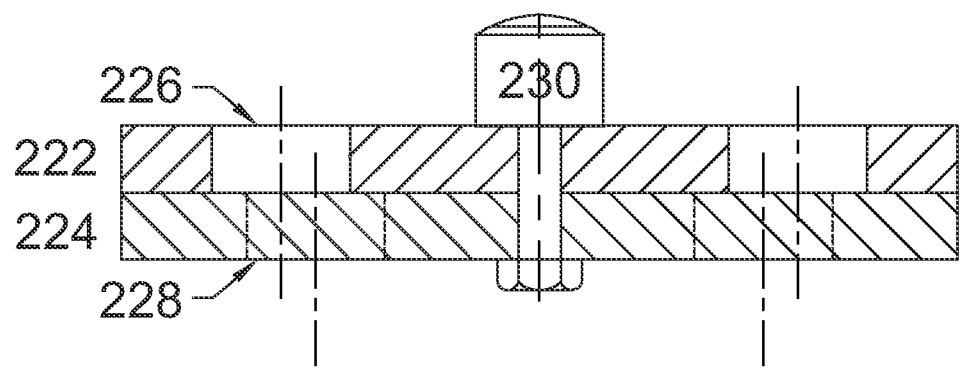
FIG 18e

DISTILLATION APPARATUS AND METHOD

FIELD OF THE INVENTION

This invention relates to the field of distillation apparatus and the uses and methods of their operation.

BACKGROUND OF THE INVENTION

Water is a precious natural resource. In North America a typical family of three can consume on average 180 cubic meter ($m^3$) of water per year. This water once used is discarded into the sewage line, and thence to a water treatment plant. At the sewage treatment facility, it is processed and when deemed safe for the environment discharged into nature or reused.

In many jurisdictions sewage treatment facilities do not exist or are over loaded. In such cases the sewage is pumped either directly into natural bodies such as lakes, sea or rivers etc. or the sewage is permitted to infiltrate the ground whether in a designed or uncontrolled manner. Both result in contamination of the environment and natural resources. In 2015 over 150 billion liters of sewage was discharged into waterways in Canada. Even sophisticated water treatment plants cannot remove all the toxins from sewage.

Water distillation is a well-recognized method for obtaining contamination free water by separation from the soiled water. Many patents and research articles have devoted attention to studying, developing and improving this process and devices that implement it. The process involves heating the soiled water until it boils and condensing the steam. This may typically be done in a pan evaporator. However, this method, at its elementary level, requires a large heat input to boil the water and collect the vapour. A nearly equal amount of cooling is required to condense the steam. The large requirement of energy required impedes the application of pan evaporation in water distillation to cleaning soiled water.

Advances in vapour distillation systems have shown that high efficiencies of heat transfer can be achieved if the latent heat released by the condensing steam can be reclaimed and reused. Such vapour distillation systems have been developed around falling tube/plate and rising tube/plate evaporator condenser type units. They have however not been applied to pan evaporators because any application requiring pan evaporators can be done more efficiently with tube or plate evaporators although the equipment cost is more.

Portions of this disclosure pertain to the refining of Jaggery. Jaggery has been used in India as a sweetener for centuries. Jaggery predominantly is prepared from sugarcane and certain species of palm. This document refers to jaggery made from sugarcane juice but covers all types of liquids from which jaggery may be made.

The jaggery-making process removes 80% water from the sugar cane juice. The steam produced to boil the liquid is typically all released into the environment. In Indian patent 162/MUM/2011 it has been proposed to use auxiliary steam in a multi-stage evaporator to process pre-heated sugarcane juice.

In the traditional method a hearth fueled by bagasse energizes the process that results in the generation of steam. This process is however unpredictable and uncontrollable. The heat provided by the hearth is uncontrollable. Furthermore, the steam and smoke produced by burning bagasse are both released into the environment, it would be helpful to reduce the emissions of the burning process by reducing the amount of bagasse that is used as fuel, and to reclaim energy from the steam that would otherwise be released into space.

The heat supplied to the sugar cane, to convert it into jaggery, can be broken up into two parts. First part comprises of the heat that is used to heat the sugarcane juice from room temperature to boiling point. This heat is called the sensible heat. The second part of the heat is used to boil the water into steam. This part is called the latent heat. The latent heat, in the example of sugarcane production discussed above, is about five times the sensible heat. Yet in the traditional process of making jaggery the steam that is released into the atmosphere is a manifestation of the latent heat and takes away over 80% of the overall heat used in jaggery making. Advances in vapor distillation systems have shown that better utilization of energy can be achieved if the latent heat released as steam in the environment can be reclaimed and reused.

SUMMARY OF THE INVENTION

In an aspect of the invention there is a floating heat exchanger.

In a feature of that aspect of the invention, the floating heat exchanger is an evaporator-condenser connected to a compressor. In a further feature, the evaporator-condenser and the compressor are used to concentrate a sugary sap. In an alternate process, the evaporator-condenser is used to extract distilled water from a supply of waste-water.

In another feature of that aspect of the invention, the heat exchanger is mounted to transfer heat to the fluid in which the heat exchanger is mounted to float. In another feature, for use with an at least partially liquid medium, the floating heat exchanger is mounted to a buoyant member for floatation in the at least partially liquid medium. The heat exchanger has at least a first heat transfer interface at which, in operation, the heat exchanger interacts with the at least partially liquid medium. In another feature, the heat exchanger has a second heat transfer interface, the second heat transfer interface has an inlet and an outlet by which a working fluid may pass, whereby, in operation, heat is transferred between the working fluid and the at least partially liquid medium through the first and second heat transfer interfaces.

In another feature, the heat exchanger is combined with a vapour collector mounted to capture vapour given off by the liquid medium in consequence of heating thereof. In a further feature, the vapour collector is movable in response to changes in fluid level of the at least partially liquid medium. In another feature, the vapour collector is fixedly mounted relative to the buoyant member. In a still further feature, the floating heat exchanger is a tube and shell heat exchanger. In a yet further feature, the tubes of the tube and shell heat exchanger are inclined relative to the at least partially liquid medium. In another feature, the apparatus is combined with a compressor. The compressor is connected to receive input vapour leaving the floating heat exchanger, and the compressor having an output connected to return compressed vapour to the floating heat exchanger, whereby heat from the compressed vapour is transferred away therefrom in the floating heat exchanger. In a further feature, in operation, at least part of the first heat transfer interface is submerged in the at least partially liquid medium.

In another aspect of the invention, there is a distillation apparatus. It has a heat exchanger having a first side and a second side; and a compressor. The first side of the heat exchanger is mounted for interaction with an at least partially liquid source fluid, whereby to heat at least a portion of the source fluid. The compressor is mounted to take in vapour from the source fluid. The compressor is mounted to output compressed vapour to the second side of the heat exchanger. The second side of the heat exchanger is in heat transfer co-operation with the first side of the heat exchanger whereby, in operation, heat flows from the second side to the first side and into the source fluid. The distillation apparatus accommodates changes in fluid level of the at least partially liquid fluid source.

In another feature of that aspect, in use, the heat exchanger is at least partially immersed in the source fluid. In another feature, the heat exchanger is mounted to move in response to fluid level of the source fluid. In another feature, the heat exchanger is floatingly mounted relative to the source fluid. In a further feature, the apparatus has a buoyant member mounted to float relative to the source fluid, and the heat exchanger is mounted to the buoyant member.

In still another feature, a vapour collector is mounted to extract vapour from the first side of the heat exchanger. In a further feature, the vapour collector defines a roof over the heat exchanger. In still another feature, the vapour collector is a vapour collector dome mounted to rise and fall in response to fluid level of the source fluid. In yet another feature, the vapour collector is mounted to rise and fall with the heat exchanger. In still yet another feature, a liquid separator is mounted between the first side of the heat exchanger and the compressor, thereby to discourage liquid ingestion into the compressor.

In another feature the distillation apparatus includes multiple stages mounted in series. In still another feature, each of the stages includes a pan for source fluid, and, in operation, the pans are arranged in series for successive processing of the source fluid. In a further feature, each stage has a respective heat exchanger; the compressor is a first compressor of a first stage of the apparatus, and there is at least a second compressor of a second stage of the apparatus; the first compressor draws vapour from a first the heat exchanger and the second compressor draws vapour from a second of the heat exchangers. In another feature a compressor of the apparatus draws vapour from more than one of the stages. In yet another feature, output of a compressor of the apparatus is allocated to heat exchangers of more than one the distillation stage.

In a still further feature, the compressor is a first compressor, the apparatus includes an electronic control system and an array of sensors, and output from at least the first compressor is allocated by the electronic control system to at least one heat exchanger second side in response to sensed observations. In another feature, the apparatus includes at least one agitator mounted to disturb the source fluid. In still another feature, the apparatus includes at least one wiper operable to discourage encrustation of source fluid. In a further feature, the apparatus includes a feedwater heater that accepts condensed distillate from the second side of the heat exchanger as a hot side fluid, and that accepts incoming source fluid as a cold side fluid. In another feature, the apparatus includes a concentrate accumulator mounted to receive an output source fluid remainder; and the apparatus includes a feedstock heater mounted to transfer heat from the accumulator to incoming source fluid. In a further feature, the apparatus includes an external heat source. In still another feature, the external heat source is a combustion heat source. In another feature, the second side of the heat exchanger is a condenser. In again another feature, the heat exchanger is a tube and shell heat exchanger. In still another feature, the first side of the heat exchanger is a shell side of the tube and shell heat exchanger, and the second side of the heat exchanger is a tube side of the tube and shell heat exchanger. In another feature, the apparatus includes a containment vessel for the source fluid.

In another aspect of the invention there is a method of distillation using the apparatus shown and described herein, in its various aspects and features. That method includes heating a source fluid to cause vapour to be given off, and to leave a concentrate remainder. Collecting the vapour. Compressing the vapour. Transferring heat from the compressed vapour to the source fluid whereby to condense at least a portion of the compressed vapour into a liquid distillate; and retaining at least one of (a) the concentrate remainder; and (b) the liquid distillate for processing.

In a feature of that aspect of the invention, the process includes more than one step of distillation of the fluid source and progressively more concentrated remainders. In another feature, the method includes provision of an external heat source to heat at least one of (a) the source fluid; and (b) any the concentrate remainder of the source fluid. In another feature, the method includes transfer of heat from the liquid distillate to pre-heat at least a portion of the source fluid. In still another feature, the method includes collecting any the concentrate remainder in an accumulator, and transferring heat from the accumulator to pre-heat at least a portion of the source fluid. In a further feature, the method includes mounting a heat exchanger in an at least partially immersed condition in the source fluid. In another feature, the method includes mounting a heat exchanger in a floating condition relative to the source fluid. In a further feature, the source fluid is received within a containment vessel, and a vapour dome is positioned to collect the vapour given off from heating of the source fluid, and the process includes permitting the vapour dome to move relative to the containment vessel. In still another feature, the process includes heating the source fluid in pans of successively increasingly concentrated remainders. In yet another feature, the process includes emptying at least a portion of the most concentrated remainder into a concentrate receptacle, and then emptying at least a portion of each less concentrated remainder into the pan of the next more concentrated remainder in succession. In another feature, the process includes at least one of (a) agitating the fluid being heated; and (b) wiping at least one of (i) the wall of the containment vessel of the fluid to be heated; and (ii) the first side of the heat exchanger transferring heat to the fluid to be heated.

In another aspect of the invention there is an energy recycling system that includes any set of the foregoing aspects and features. It has a sump to collect condensed liquid from any components of the evaporator-condenser; a control valve with at least one input for hot water and at least one output connected to at least one heat exchanger, the control valve being operable to direct flow of the input to at least one of the outputs; a fluid conduit connected to transport hot water from the sump to the input of the control valve; at least one heat exchanger where the heat in the hot water is transferred to a second medium; and at least one sensor mounted to monitor a system parameter. The control valve is connected to function in response to the sensor input.

In a feature of that aspect of the invention, there is a second control valve with at least one input connected to receive hot pressurized steam and at least one output connected to at least one heat exchanger where the heat in the hot steam is transferred to a second medium. There is at least a second sensor. The second control valve is connected to operate in response to input from the second sensor. In another feature, the first control valve can control the flow rate out of the first control valve. In another feature, there is a controller operable to govern the first control valve and any other device in response to sensor measurements according to pre-programmed steps. In another feature, it has an interface to control additional devices and heat exchangers. In still another feature, there is a telephony means operable remotely to control the system. In still another feature, the system is enabled to be a part of the internet of things. In still another feature, it has an auxiliary heat source employed to heat the input source of feedstock.

BRIEF DESCRIPTION OF THE DRAWINGS

These aspects and other features of the invention can be understood with the aid of the following illustrations of a number of exemplary, and non-limiting, embodiments of the principles of the invention in which:

FIG. 4 is a schematic drawing similar to FIG. 3 in which sugarcane juice recycles heat between compressed steam and parent sugarcane juice in multiple pans;

FIG. 5a is a schematic drawing of froth removing mechanism for the processing plant of FIG. 1;

FIG. 5b is a schematic drawing of the froth skimming device of FIG. 5a;

FIG. 7 shows an embodiment of the energy recycling pan processing plant of FIG. 1 with an offset steam in tube evaporator condenser located in an extension to a pan thereof;

FIGS. 18b and 18c are schematics of the venting mechanism used to exhaust the concentrated soiled water from the apparatus of FIG. 16, FIGS. 18d and 18e being views indicated at sections '18d-18d' and '18e-18e' of FIGS. 18b and 18c respectively;

DETAILED DESCRIPTION

Figure 1:
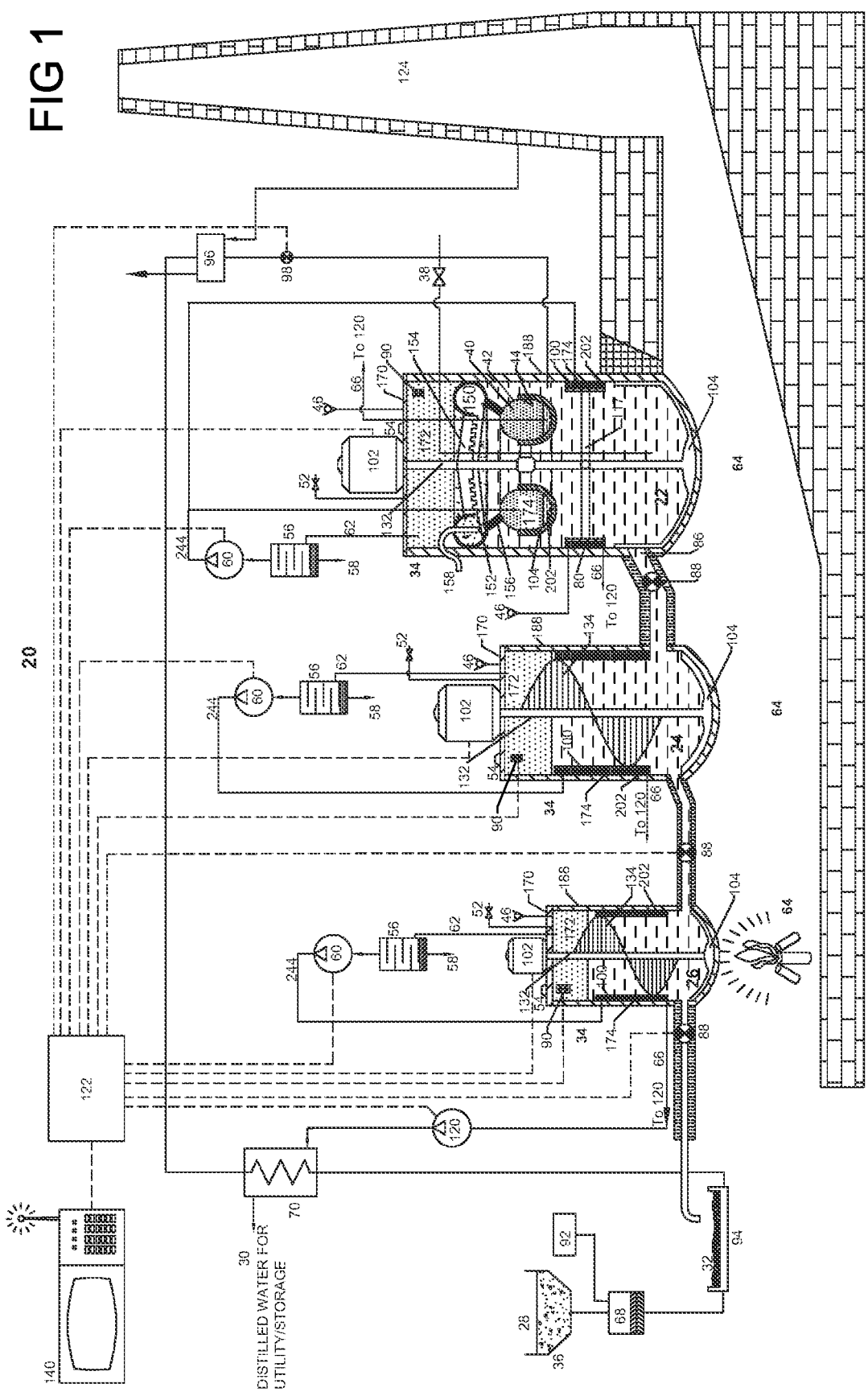
FIG. 1 is a schematic drawing of an energy-recycling pan processing distillation apparatus used for Jaggery processing application.

The description that follows, and the embodiments described therein, are provided by way of illustration of an example, or examples, of particular embodiments incorporating one or more of the principles, aspects, and features of the present invention. These examples are provided for the purposes of explanation, and not of limitation, of those principles and of the invention. In the description, like parts are marked throughout the specification and the drawings with the same respective reference numerals. The drawings may be understood to be not to scale and not in proportion unless otherwise noted. The wording used herein is intended to include both singular and plural where such would be understood, and to include synonyms or analogous terminology to the terminology used, and to include equivalents thereof in English or in any language into which this specification many be translated, without being limited to specific words or phrases.

The scope of the invention herein is defined by the claims. Though the claims are supported by the description, they are not limited to any particular example or embodiment, and any claim may encompass processes or apparatus other than the specific examples described below. Other than as indicated in the claims themselves, the claims are not limited to apparatus or processes having all of the features of any one apparatus or process described below, or to features common to multiple or all of the apparatus described below. It is possible that an apparatus, feature, or process described below is not an embodiment of any claimed invention.

This description relates to distillation processes. To the extent that these processes pertain to flows of fluids, reference made be made to "upstream" and "downstream" relative positions of elements. Further, the processes may start with a feedstock source that is to be subject to distillation. The feedstock source may be thought of being a liquid. However, this liquid may not be homogenous, and may not be entirely liquid. It may start as a liquid with suspended solids. The suspended solids may precipitate out over time through settling, or them may be filtered out mechanically by being passed through a grill or grid, or mesh, or filtering medium such as charcoal or sand.

In the distillation process there may be, generically, a feedstock input fluid. The fluid is heated, driving off vapour. The vapour is then typically subject to some kind of further processing, which, in the end, leads to collection of a "distillate", most typically a condensed liquid distillate. In the processes described herein, the distillate being collected is most typically liquid water or oil crude. However, other gases may also be driven off, including such gases as methane or alcohol or oil crude depending on the constituents of the initial feedstock. These may be collected or vented, as may be.

The balance of the feedstock then forms or constitutes a remainder, being whatever is left over once the vapour has been driven off. This remainder, or concentrate, may then be the source fluid, or feedstock, of a further stage of distillation or a discharge to be discarded. Whatever terminology may be chosen, it may be understood that in a multi-stage process the feed stock becomes progressively more concentrated at each successive step, until a final level of concentration is reached. At that point the remaining residue is one of the end products of the process or a discharge to be discarded.

The processes described herein may be batch processes, or may be continuous flow processes. In a batch process, the last residue is emptied into the final collection receptacle to permit the next to last level of concentrate to be emptied into the previously emptied containment vessel of the last residue; then the next most concentrated into the second last, and so on, until the least concentrated pan is emptied into the second least, and new "fresh" feedstock fluid is poured into the first pan. It is not necessary that each successive pan be fully emptied at each stage. It may be a progressive, half emptying, or one third emptying, or as may be.

In a continuous process, new feedstock may be added and output taken out at a low rate continuously. As there may be a concentration gradient in the containment vessel, output may be taken out at a location of highest concentration, and input added at a location of lowest concentration.

Reference is made herein to heat exchangers. In the generic case a heat exchanger will be understood to have first and second flow passages. The first and second flow passages are segregated from each other. The first passage is generally the "cold side" of the heat exchanger, through which the fluid to be heated passes; equally so, the second passage is generally the "hot side" through which the fluid providing the heat, or that is to be cooled, passes. In general, the flow passage surfaces of the cold side define a first heat transfer interface at which heat flows from the heat exchanger wall to the cold fluid in the first passage. Similarly, the flow passage surfaces of the second passage define a second heat transfer interface at which heat flows from the second fluid into the structure of the heat exchanger. Often the first and second heat transfer interfaces are opposite sides of plates and shells or of plates and tubes.

In these processes, first, it may be that the concentrated remainder is a desired product of the process, and, when cooled may provide a desired liquid; or, when cooled and dried, may provide a useful solid. Second, aside from combustible or potable non-water distillates, in locations in which there is a shortage of water, a liquid water distillate from a condensing process may be valuable of itself. Thirdly, whichever, or both, of the concentrate and distillate may be useful, the energy used into separation of the distillate from the concentrate may represent a resource to be carefully conserved. That is, to the extent that heat is employed to liberate the vapour from the concentrate, it may be an objective to recapture that heat, or to re-use it to reduce the energy consumption of the process or to reduce combustion emissions and byproducts such as may be undesirable.

With these considerations in mind, FIG. 1 shows a schematic of a three-stage distillation installation or apparatus, generally as 20. Installation 20 may include a first stage, indicated generally as 22, a second stage indicated generally as 24, and a third stage, indicated generally as 26. The process may be fed from a feedstock source 28, and it may yield an output distillate product 30, and an output concentrate product as a 32. As the residue becomes more concentrated it moves from right to left in the illustration, through stages 22, 24 and 26.

Considering first stage 22, there is a pan, or tank, or containment vessel 34 however it may be termed herein, into which feedstock fluid may be directed, whether by pouring or by pumping, as may be. First stage 22 may have an external heat source, indicated generically as 64. Containment vessel 34 may also have an all-purpose general discharge, or outlet, or drain, or pump-out to permit containment vessel 34 to be drained or flushed, or purged from time to time, as for cleaning, maintenance, repair and so on, which may typically be controlled by, or symbolized by, a drain valve, as at 38.

First stage 22 has a first floating heat exchanger 40. The floating heat exchanger 40 is connected to a float 150, with stand-off bracket 156. The float 150 has an opening 152 and a skimmer 154. Float 150 is buoyant by design and supports the weight of the evaporator condenser unit 40. Heat exchanger 40 has a first side, or first passage or pass 42, which may be referred to as the "cold side". In operation, fluid from the input feedstock source interacts with, the cold side of heat exchanger 40, and receives heat across the first heat transfer interface defined by the surfaces presented to that fluid. Heat exchanger 40 also has a second side, or second passage or second pass 44, or "hot side", at which hot fluid gives up heat. In operation herein, the hot vapour driven off in heating of the fluid is eventually directed to the second side of heat exchanger 40, and gives up that heat across the second heat transfer interface defined by the surfaces presented by heat exchanger 40 to that flow.

First stage 22 also has a roof, or ceiling, or lid, or cap, or dome, or chamber, or collector (however it may be called), indicated as 170. Collector 172 is located at a high point relative to heat exchanger 40, and represents the space at which the vapour collects, and from which it is conducted as an output, by an off-take 62. Collector 172 may also have a pressure relief valve 46. Off-take 62, which may typically be in the form of a conduit, or ducting, or piping, leads to the input of a compressor 60. It may be that collector 172 includes a second off-take 52 by which to extract gases other than those to be admitted to compressor 60, or a vent 54 by which to flush collector 172. A water separator, or liquid separator, or demistifier 56 is mounted in the output line from collector 172 to compressor 60 to prevent or discourage the ingestion of liquid phase material into compressor 60. Liquid collected in demistifier 56 may be drained to ambient, as at drain 58. Alternatively, it may be drained back into the second side of pre-heater or heat exchanger 70.

Compressor 60 takes in vapour and compresses it. The compression may not necessarily be particularly great. That is, if the liquid entering the first side of heat exchanger 40 is at local atmospheric pressure, the pressure ratio of $P_{output}/P_{input}$ of compressor 60 may be as little as 1.25. Alternatively the pressure ratio may be higher, perhaps as high as 2:1 or 3:1 or more. The output compressed steam of compressor 60 is carried by a conduit or piping 244 to the second side of heat exchanger 40. On the output side, the compressed steam gives up some of its heat and condenses, yielding a liquid distillate collected in the sump or condensate accumulator 202 of heat exchanger 40. This condensate, or distillate, is then carried away through an output line such as 66. Output line 66 may lead to a waste heat reclamation heat exchanger, or pre-heater, 70, in which the hot distillate is cooled in counter-flow heat exchange with fresh incoming feedstock source material flowing in the opposite direction. Thus a portion of the heat of the compressed steam is recycled back into heating the feedstock, first in heat exchanger 40, and then in pre-heater 70. The heat exchange in heat exchanger 40 may be considered latent heat. The heat exchange in pre-heater 70 may be of sensible heat.

Heat exchanger 40 has been nominally designated as a tube and shell heat exchanger. In such a heat exchanger it is customary for the fluid on both the shell side and the tube side to be driven by a pump or other flow-forcing apparatus. Here, the flow on the hot side, the second side of the heat exchanger 40, is driven by the compressor. The flow on the inlet side is merely maintained by the head of the source material in the main containment vessel 34, which is typically the gravity head. Pumps or other methods of moving liquid may be added.

Furthermore, tube and shell heat exchangers may typically be designed for both sides to operate at some elevated pressure, or at a vacuum. In the context of the present disclosure, the first side of heat exchanger 40 may effectively be open, i.e., to the free inflow of source liquid. In that context, containment vessel 34 may be a tank that can be pressurized, or, perhaps more typically, it may be a sump, or pond, or reservoir, or bath having a free surface at local ambient atmospheric pressure, e.g., such as a sewage lagoon, septic tank or a distillation vat. Item 34 may be identified by any of these terms throughout this disclosure. In this context, heat exchanger 40 may be, or may include, a heat exchanger array, such as a tube bundle, that "swims" in the pond of the source material as shown in FIGS. 9 and 12 to 20. That is, tube bundle 110 (or such alternate as may be), may be submerged in the source material, in whole or in part. In some embodiments, the distillation apparatus may include a buoyant structure, or source of buoyancy, such as a float, or floatation member, or members, 150, to which heat exchanger 40 is mechanically mounted, or connected, or fixed, directly or indirectly, such that as the free surface level of the source material rises and falls (i.e., rising due to replenishment; falling due to leakage, evaporation, or distillation, for example) heat exchanger 40 moves in response to the changing liquid level of the source fluid.

Where heat exchanger 40 is mounted to float in the source liquid, it may be mounted such that all of the heat transfer surfaces are lower than the waterline on the floatation member, such that all of the active heat transfer surface area is immersed in source fluid. This need not necessarily be so, as it may be that, when the liquid level in the containment vessel is low, the depth of fluid may be less than the height of the heat exchanger. It may be that flotation member 150 has a footing, or standoff, or standoff structure or standoff array that may encounter the bottom, or bottom wall, of containment vessel 34 when the fluid level is low, preventing any further fall in height relative to containment vessel 34, which is assumed to be stationary, i.e., to define a stationary datum. Such a standoff may extend below the lowermost extremity of heat exchanger 40 to prevent it from bottoming in the reservoir of vessel 34, and thereby becoming clogged or damaged. Such a standoff may also tend to preserve an inlet clearance for source fluid intake into heat exchanger 40 below its lowermost extremity such as may tend to prevent heat exchanger 40 from becoming starved of cold-side input fluid. Such an embodiment may apply where heat exchanger 40 is rigidly fixed relative to flotation member 150.

Alternatively or additionally, as where heat exchanger 40 may have its own standoff, or abutment, or stop, or standoff array 84 such as may bottom in the reservoir for the same purpose, while the flotation member 150 continues to ride buoyantly on a declining fluid surface level, in which case heat exchanger 40 ceases moving relative to containment vessel 34, and moves upwardly relative to flotation member 150, until flotation member 150 also bottoms out due to low fluid level. When the fluid level rises again, flotation member 150 also rises, eventually sufficiently far once again to encounter, to engage, and to lift heat exchanger 40.

Containment vessel 34 may have a discharge 86 at which, or by which, some, or all, of the contents of containment vessel 34 may be removed and directed to another location or stage in the installation or process. Discharge 86 may have a variety of forms depending on the nature of the process and the materials involved. In one embodiment, discharge 86 may be a decanting tap or pouring spout (e.g., where containment vessel 34 is capable of being tipped to permit pouring; or where a skimmer is provided by which to extract an upper stratum of material for further processing. Alternatively, discharge 86 may be bottom-drawing, as in a bottom-drawing pump or siphon (to remove liquids), or augur (to remove solids or a mix, sludge, or slurry of solids and liquids), where a lower stratum of material is desired to be removed. Depending on the circumstances, there may be more than one such discharge or outlet, at an array of heights in the fluid. In each case there may be control apparatus such as a valve, or a pump, or a pump and a valve whose operation governs the output flow, that governor apparatus, however it may be, being indicated generically as 88. As may be understood from the foregoing description, it may be assumed that during the process of heating and distillation, the feedstock remainder in containment vessel 34 may settle, or separate, or stratify, or, to the extent that the feedstock fluid may be of relatively low thermal conductivity and high viscosity, there may be a concentration gradient in the remaining feedstock. That is, it may be desirable to extract material that is either of a highest concentration or a lowest concentration of a particular constituent, and the discharge may be located accordingly. Similarly, the introduction of fresh feedstock material may occur at a location of either high or low concentration, based on the same factors. In a batch process, the stew, or batch, is cooked until a particular concentration or density is reached. At that point the residue is pumped out, and a new, fresh batch is loaded for processing. While a batch cooking approach may be applied, it may alternatively be that a continuous discharge is extracted from a region of, e.g., high concentration, while a continuous supply of fresh feedstock of low concentration is supplied at a region of low concentration in the bath.

Installation 20 in FIG. 1 may have an electronic control unit, or controller, 140. First stage 22 may have an array of sensors, indicated generally as 90, connected to provide process feedback signals to controller 140. Controller 140 in installation 20 may also have an array of outputs, shown as control box 122 to carry command signals to various units of installation 20, such as to the external heat source 64 (or to the operator of the heat source by way of signals to add heat or to reduce heat); to the feedstock source 28, (signaling when to add further feedstock); to the main discharge valve 38 to purge the system; to the usual discharge 88 either to control a continuous output flow, or to control a batch discharge and replenishment; or to compressor 60. It may have a containment reservoir float sensor, which may be an active level sensor from which actual fluid level in the sensor may be read or calculated. It may also have a high level float sensor, whether as a range limit of sensor or as a failsafe back-up of sensor, to indicate when the level of feedstock in the pond, or containment vessel, 34, has reach an upper limit and it is time to cease adding more fresh feedstock. Similarly, it may have a low level float sensor, which may either be a programmed end of range limit of sensor, or may be a secondary, or back-up switch to cause the system (a) to add more fresh feedstock; or (b) if there is no fresh feedstock, to stop the compressor and to turn off the external heat source.

Additionally, installation 20 may have a sensor array comprising for example of a temperature and/or pressure sensor in the pressure dome, i.e., at low pressure chamber 172; a pressure sensor and a temperature sensor at the outlet of compressor 60 (or, equivalently, at the inlet of the condenser) as suitable. It may include a sensor for measuring the concentration of an element of the fluid at the outlet of the first pass to heat exchanger 40—which may be a capacitance or inductance-based sensor, or optical or infrared, or other sensor, or combination of sensors as appropriate for the material being observed. There may be a further sensor, or sensors, 90 mounted to monitor the level of the cap or dome of collector 172 relative to the liquid surface below the cap, or relative to the free surface of the feedstock liquid, or both (where the top of heat exchanger 40 is open, those two levels may be the same). Where collector 172 is sealed over the top of heat exchanger 40, the two fluid level may be different by the amount of pressure head or of vacuum that exists in collector (and, therefore, at the inlet of compressor 60). These sensors 90 may be used to prevent collector 172 from becoming filled with liquid, such that compressor 60 is only drawing liquid rather than vapour, and serve to turn off compressor 60 when insufficient vapour is present, and to activate compressor 60, or to speed up compressor 60, when there has been a build-up of excess vapour pressure in collector 172. To the extent that collector 172 may be positioned over heat exchanger 40, external insulation 188 may be mounted about the outside of containment vessel 34 such that heating occurs within an insulated column with vapour from that column being given off underneath collector 172. In some instances collector 172 may be seal to the top of heat exchanger 40 by a lid 170 so that the vapour has nowhere else to go. It may also be that the external walls of containment vessel 34 are insulated, as at 188.

In some instances, it may be desired to refresh the feedstock that comes into contact with the first side of the heat exchanger, or it may be desired to prevent the stagnation or encrustation of source material such that there may be improved heat transfer from the heat exchange surfaces of heat exchanger 40 into the feedstock fluid. To that end, there may be a wiper, stirrer, or agitator 104 such as may gently sweep the exposed surface, or surfaces, of the tube bundle to refresh the fluid in contact with those surfaces. Alternatively there may be an agitator 104 that may actively stir the feedstock. The wiper or scrapper and the agitator 104 may be the same mechanism or different mechanisms. In some embodiments, agitator 104 may have the form of a slowly moving propeller blade, or may in some instances be a pump capable of developing a sufficient head of pressure to force the feedstock through heat exchanger 40. In some instances, too, there may be a peripheral wiper or scraper 134, to wipe or agitate the feedstock adjacent to the inside peripheral wall of containment vessel 34.

In some instances, first stage 22 may be the only stage of the apparatus or installation, where only a single step of distillation is required. This may be the case where containment vessel 34 is a settling pond or lagoon. In such instances, the concentrated remainder may be a waste sludge, the desired distillate may be the water, and the process may be used to reduce the overall energy consumption involved in recovering the water.

In other processes, the concentrate of the fluid remainder may have value, and the process may have multiple stages of refining. In such instances, second stage 24 and third stage 26 may be substantially the same as first stage 22. In those instances, the cooking vessels may tend to be relatively shallow pans with large surface area to facilitate evaporation. The surface area of the pan, and the surface area of the covering cap or dome, or collector 170, may tend to correspond.

As may be noted in all embodiments herein, the apparatus is tolerant of, or adjusts to, variations in the level of the fluid source, either by floating or by having a compressor intake that is otherwise positioned clear of the liquid to vapour interface level; and by having a heat exchanger that interacts with the source fluid, whether by rising and falling with a float, or being otherwise positioned to function notwithstanding fluctuations in liquid level. Even where the heat exchanger floats, the partial or total submersion depth of the heat exchanger is a function of float buoyancy and of the mounting height of the heat exchanger relative to the floats.

Jaggery Making

One use of apparatus as described herein provides a jaggery making system that recycles energy using the vapour distillation process and capture of the sensible heat, thereby decreasing the overall requirement of energy consumed by burning baggase or other fuels. In another aspect of the invention the goal is to reduce the amount of impurities that fall into the sugar cane juice during the making of jaggery and to remove the froth generated by the boiling of sugarcane juice automatically. Use of such apparatus may allow better control of the states of the jaggery making process with the use of actuators, sensors and stirring equipment. Further, use of the apparatus may permit the collection and use of distilled water for cleanup and other uses.

In one or more embodiments, the above-described apparatus may be adapted for use in evaporating water from sugarcane juice, and conversion of that liquid into jaggery.

Jaggery is prepared from sugarcane and certain species of palm. This document refers predominantly to jaggery-making from sugarcane juice but is intended to provide a general description applicable to all types of liquids or feed stocks from which jaggery is made. The same apparatus design may be used for making Maple syrup from Maple sap, although the apparatus below is described for Jaggery making only.

Tank

Tanks are used for storage of sugarcane juice at various stages of processing. Some tanks are insulated as deemed necessary. The description below refers to FIGS. 1, 3, 4, 6, 7 and 8.

In this instance, feedstock source 28 is a supply of raw sugarcane juice extracted from sugarcane stalk and is collected in a tank, being the feedstock storage, i.e., tank 36. The sugar cane juice is filtered to remove solids in feedstock filter 68. Chemicals may be stored in a dispenser, such as chemical storage 92. The chemicals may be used to aid in the jaggery making process. These chemicals can be added at other appropriate locations, whether at filter 68, or upstream or downstream of the pre-heater, i.e., pre-heat heat exchanger 70. After being filtered, the feedstock or sugarcane juice from tank 36 is pre-heated in a tray heat exchanger 94 in which, after leaving the pan or tray from the last stage, the concentrated jaggery output product 32 is used to heat the incoming sugarcane juice while cooling itself. The sugarcane juice is then passed through a second heat exchanger, also called the pre-heater 70, where it is further heated by the hot condensate 30 collected from various sources as explained later. The pre-heated feed stock sugarcane juice is stored in an insulated tank 96. Tank 96 is connected to pan 34 of first stage 22 through piping that includes a valve 98. Master control 140 opens valve 98 when pan 34 is ready for receiving additional feed stock. In an alternate embodiment (not shown) tank 96 has a jacket through which flue gases from chimney 124 are fed to provide additional heat to the incoming sugarcane juice, such as may improve system efficiency. In yet another embodiment, tank 96 is fitted with a froth skimming mechanism.

Pan

FIG. 1 shows three cylindrical pans 34, one in each of the three stages of processing 22, 24 and 26. Each of these pans 34 has a respective double walled airtight jacket 100 and a lid 170. The wall and floor of the pans 34 are made of material with good heat transfer properties. Insulation 188 is placed around the outer surfaces of the cylindrical pan to reduce the amount of heat lost to leakage. The enclosure is just an example of a type of pan. Other suitable sizes and shapes may also be used.

The pre-heated sugarcane juice is then fed into pan 34 of first stage 22, for the first step in the jaggery making process. After the first processing step is complete, the juice is released from the output of pan 34 through valve 88 and directed to the input of pan 34 of second stage 24. After the second processing stage the sugarcane juice is fed from the output of pan 34 of second stage 24 into the input of pan 34 through another valve 88 for third stage 26. This embodiment shows three stages. Other embodiments may use additional stages or fewer stages. After the last stage in processing, the sugarcane juice has been concentrated into a semi-solid thick paste. The thick paste is ready to be solidified into jaggery. The thick paste is directed to an output pan or tray 94 through output valve 88 of third stage 26. In an alternate embodiment, the tray or pan may be a mold, or array of molds to cast the jaggery into required shapes and sizes. The flow process followed by sugarcane juice as it is converted into jaggery is the same in other embodiments; however, there are alternate possible pan embodiments.

Figure 3:
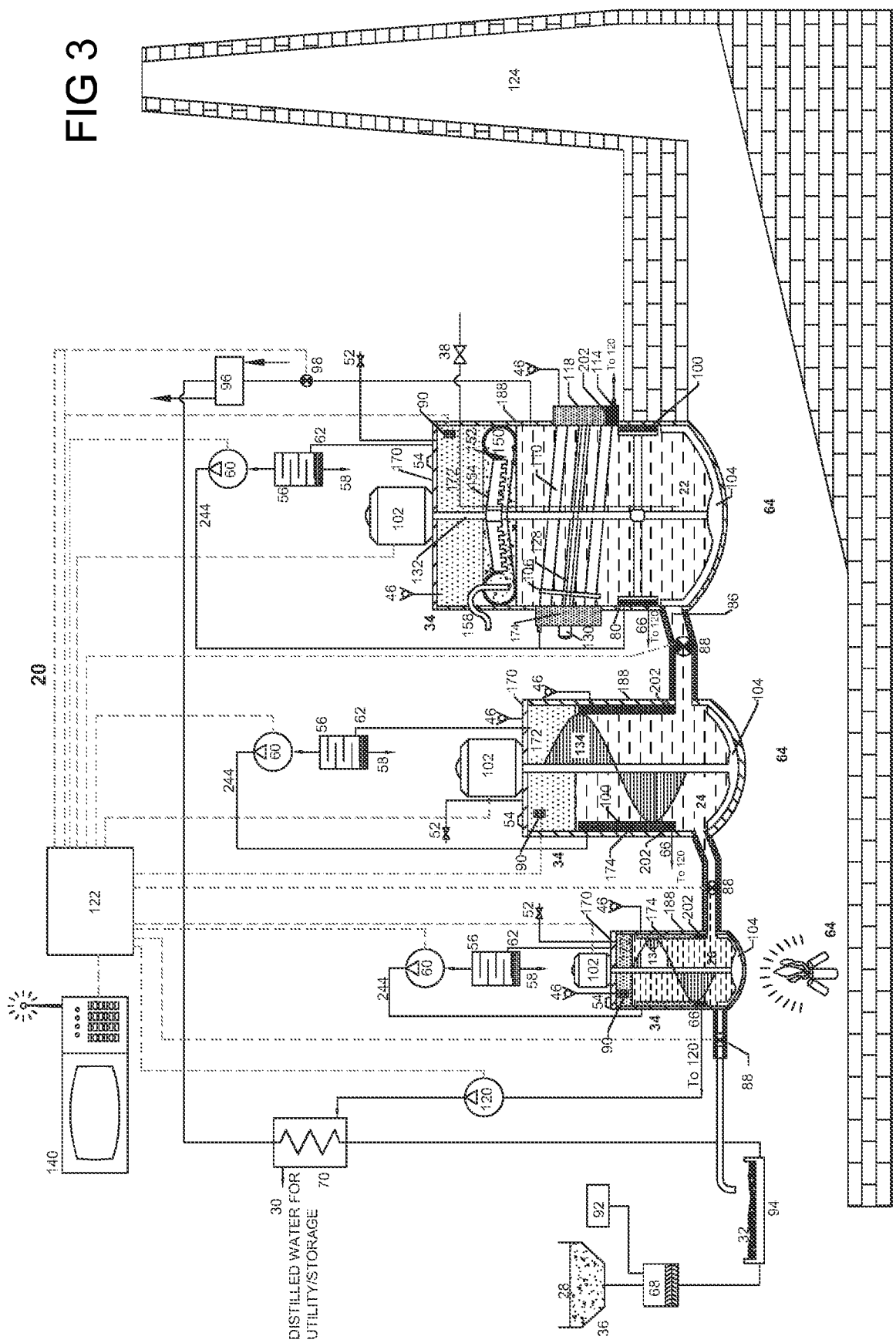
FIG. 3 is a schematic drawing of the energy-recycling pan processing plant for making jaggery of FIG. 1 in which a steam-in-tube (SIT) embodiment of the evaporator condenser is immersed in sugarcane juice.

In an alternate embodiment of FIG. 3, pan 34 of first stage 22 has an inbuilt evaporator condenser of the SIT type as described below. In this embodiment, the air-tight jacket heat exchanger of evaporator condenser 118 includes a vapour collector or steam chest 174 and a distillate sump 114; connected by an array of inclined tubes 110. In this embodiment steam chest 174 is outside the walls of the pan 34. Alternatively, steam chest 174 is located inside pan 34. In this embodiment the pan 34 has a single wall, although double walled airtight jacket 100 can be added in an alternate embodiment of in stage 24. This doubled walled airtight jacket 100 works as an evaporator-condenser or heat exchanger as explained below. The rest of the components in FIG. 3 are the same or substantially the same as in FIG. 1. The evaporator condenser unit used in pan 34 in FIG. 3 is a modular design and can be used, as in FIG. 8 in more than one pan 34 as may be. Multiple pans 34 may be arranged in series or in parallel. FIG. 4 shows an embodiment where the evaporator condenser is used in two stages 22 and 24 of processing sugarcane juice.

Lid

In FIG. 1 a ceiling or lid 170 is made of lightweight, thermally stable, corrosion resistant waterproof material, such that an airtight vapour dome or accumulator, or reservoir 172 is formed above the sugarcane juice surface in pan 34. Ceiling 170 supports the prime movers, scraper stirring motors 102 and the stirring or scraping or agitating mechanism 104. The ceiling has a relief valve 46 to permit that unwanted gases that might otherwise collect or be trapped in the vapour reservoir to be released as may be. FIG. 1 shows one embodiment of the lid.

Vapour Reservoir

Each embodiment herein has a chamber or accommodation or space in which to collect or accumulate water vapour that leaves the heated mixture, the vapour reservoir 172. The vapour reservoir 172 is formed of the space between the ceiling 170 and the surface of the sugarcane juice. All vapour reservoirs 172 have an outlet that leads to a respective compressor 60 through a demistifier 56. Alternate embodiments may have an inlet for air that allows pre-heated air, from an air scrubber or heat exchanger, to enter the vapour reservoir and create a draft that eliminates any dead zones with no movement of air and pushes the steam towards the outlet. In alternate embodiments, pressurized motive steam may be used in place of air to efficiently scavenge the vapor reservoir and positively ejaculate the dead zones, if any.

Float and Froth Skimming Mechanism

The embodiment in FIG. 1 shows a froth removing apparatus detailed in FIG. 5a. It has a float 150, an opening 152 and a skimmer 154. Float 150 is buoyant and supports the weight of the first heat exchanger, identified in this embodiment as evaporator condenser unit 40, with stand-off bracket 156. Float 150 carries the weight of the evaporator condenser unit and keeps it aligned with the surface of the sugarcane juice. That is, float 150 will displace the sugarcane juice until the weight of the float equals the weight of the evaporation condenser and other attachments. The section of the float has an opening 152 to allow the froth to enter and transported through tube 158 to a sump outside of the pan 34 of stage 22 with the help of suitable means such as a pump. The skimming device 154 is flexibly connected to the prime mover shaft 132. This flexible connection allows the skimming device to move up and down the shaft 132 as the sugarcane juice level changes in the tank. The skimming device has two blades, 160, 162 as shown in FIG. 5b. One rotates with shaft 132. The other is rigidly attached to float 150. The moving blade traps the froth between itself and the stationary blade and pushes it into the opening where it collects until a certain level is reached at which time a pump is turned on to draw the froth out of the tank. Other similar mechanisms can be designed.

The embodiments in this document show one shape and location of the floats. Other locations and methods of mountings can also be used in alternate embodiments.

Evaporator Condenser

There are a number of evaporator condensers in each embodiment of jaggery making apparatus. At least one evaporator condenser 40 is located in the pan. It may be immersed, or partially immersed, in the sugarcane juice. The evaporator condenser may be rigidly attached to the pan or lid (FIG. 3) or it may independently float on the sugarcane juice (FIG. 1). Alternatively, the containment vessel or pan 34 may have a double walled airtight jacket around part or whole of its periphery 100. This air tight jacket serves as an evaporator condenser 80.

Common components of evaporator condenser units are: a steam chest or space, variously identified as 112 or 174; a distillate sump 114; a first heat exchanging surface 42 and a second heat-exchanging surface 44. The first heat exchanging surface 42 and the second heat exchanging surface 44 may be the opposite sides of the same plate. Steam chest 112 or 174 is the space in the evaporator condenser where the pressurized steam from the compressor is injected. Distillate sump 202 is the space in the evaporator condenser where hot condensate 30 collects until it is pumped out. Heat-exchanging plates or tubes separate the pressurized steam from the boiling sugarcane juice and promote the exchange of heat between the boiling sugarcane juice and the pressurized steam. In the process, steam condenses, releasing its latent heat, which is transferred to the sugarcane juice that absorbs it and boils.

Evaporator-condensers fall into two main categories depending on the arrangement of steam chest, the distillate sump and the heat-exchanging surface. In the first category the evaporator condenser has an integrated steam chest, distillate sump and the heat-exchanging surface. In the second category the steam chest and distillate sump are two distinct spaces connected by an array of tubes forming the heat-exchanging surface. In essence this is a tube-and-shell heat exchanger. The first category is called the integrated evaporator condenser category. The second category is termed as Steam-in-Tube evaporator condenser (SIT).

Integrated Evaporator Condenser

In the embodiment of FIG. 1 there are two examples of integrated evaporator condenser, namely, 40 and 80. In this type of evaporator condenser the steam chest and the distillate sump are unified into one common entity. Heat exchanger 40 has a torus-like shaped airtight enclosure. Other different shapes may be used. The outside of the torus shaped evaporator condenser is the first pass heat exchanging surface 42 from which the sugarcane juice acquires heat. The inside of the torus shaped evaporator-condenser is the second pass heat exchange surface 44 to which the steam supplies heat as it condenses. The inside of the torus serves as the steam chest 174 and the distillate sump 202.

The other example of the integrated evaporator-condenser is the double walled airtight jacket 100 extending around pan 34 of second stage 24. In this embodiment the doubled walled airtight space comprises of the steam chest 174 and the distillate sump 202. The wall of the containment vessel or pan 34 that is shared with the double walled airtight chamber serves as the heat-exchanging surface. The outside of the double walled evaporator-condenser is the first pass heat exchanging surface 42 from which the sugarcane juice acquires heat. The inside of the double walled evaporator condenser is the second pass heat exchange surface 44 to which the steam supplies heat as it condenses. The inside of the double-walled evaporator-condenser serves as the steam chest and the distillate sump.

SIT Evaporator Condenser

Figure 8:
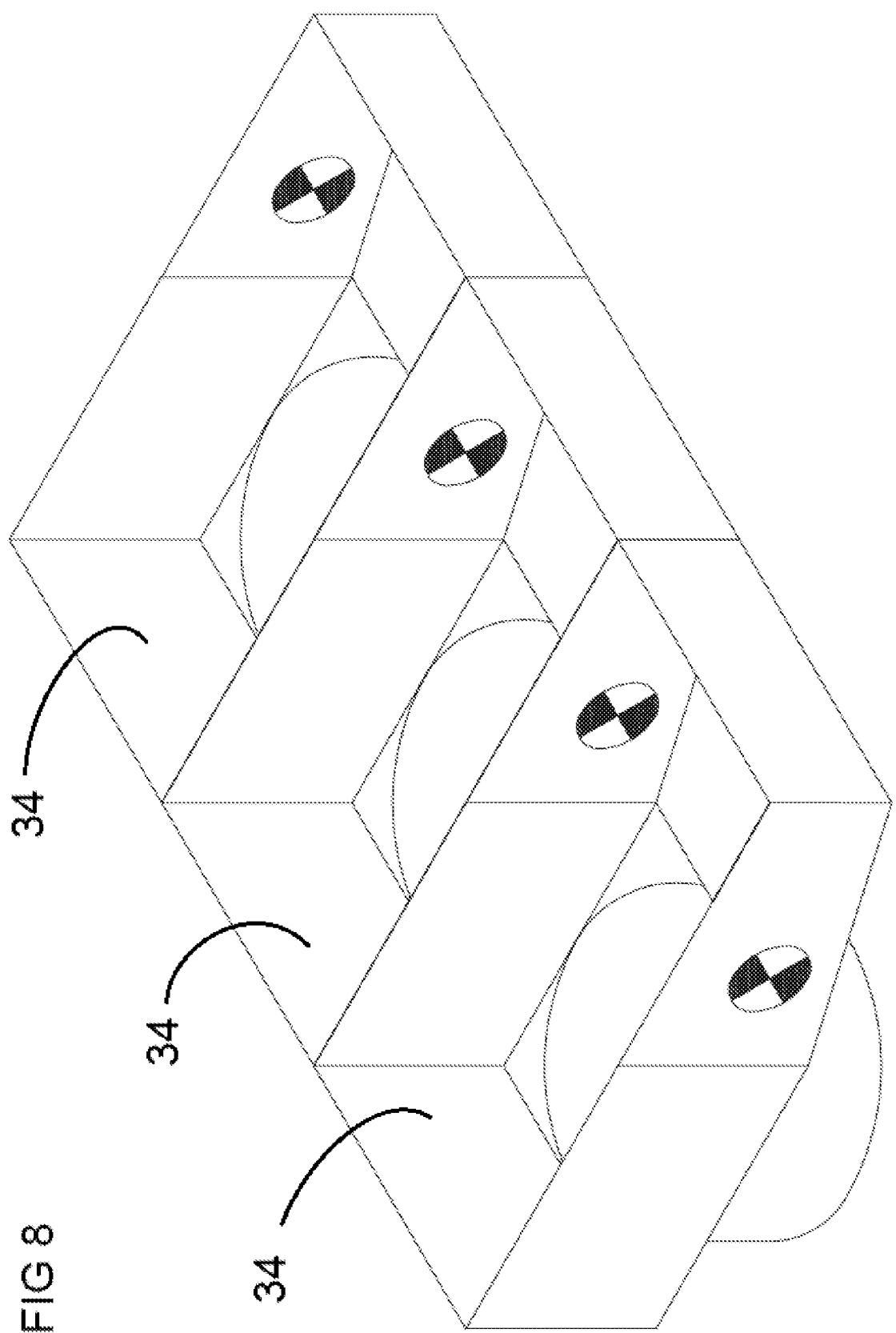
FIG. 8 shows a configuration of offset pans as used in the process plant of FIG. 1.

In the embodiment of FIG. 3, tube evaporator condenser 118 extends around pan 34 of first stage 22 and includes a heat exchanging surface in the form of a tube bundle 110 inclined to the horizontal. One end of the bundle is connected to a steam chest 174 and the other to the distillate sump 114. Steam chest 174 and distillate sump 114 are located outside walls of tank 34. Alternatively, steam chest 174 and sump 114 can be located inside the walls of tank 34. In a further alternative, the steam-in-tube evaporator condenser having a steam chest 174, distillate sump 114 and tube bundle etc. are located in an offset extension 116 to the tank 34 as shown in FIG. 7. FIG. 8 shows a configuration of the offset pans as used in a process plant.

The space inside evaporator condenser is airtight and is used to collect steam under pressure. The pressure in the chamber is modest, being typically a fraction above atmospheric. The pressurized steam exchanges heat through its walls with the sugarcane juice outside the tubes of the tube bundle 110 and along the faces of steam chest 174 and the sump 114. The heat exchange cools the steam and condensate is collected in sump 114. FIG. 3 shows the SIT evaporator condenser in the first stage of processing 22 only. In alternate embodiments (FIG. 4) other pans may have similar evaporator condensers as may be suitable.

Hot distillate is removed from the distillate sump regularly by pump 120 via a tube, and sent to the pre-heater heat exchanger 70 where it heats the incoming sugarcane juice. The cooled distillate can be used for drinking, cleaning of utensils or equivalent activity.

Compressor and Demistifier

All of the embodiments have a vapor reservoir 172. Steam collected in this vapor reservoir 172 is communicated through a tube to a demistifier 56, which separates entrained liquids from incoming vapor. The vapor from the demistifier 56 is fed by tube to the compressor 60. The compressor 60 pressurizes the steam and injects it into the evaporator condenser such as 40 via a tube 244. In FIG. 1, each vapour reservoir has a separate compressor attached to it, however, in an alternate embodiment a different topology of connections between compressors and vapour reservoirs may be used.

Distillate collected in the demistifier 56 is communicated to a pre-heater heat exchanger 70 using suitable means. In an alternate embodiment the distillate may be collected in a hot sump (not shown) for other uses. The compressor is controlled by the master control 140 via control box 122. Other demistifier designs may be used.

Distillate Pump

In all embodiments, distillate sumps 202 of evaporator condenser such as 40 or 80 or 118 collect distillate left behind by the condensed steam. Distillate pump 120 is connected by a tube to sump 202 by which distillate is extracted. The distillate is hot so the tube takes the distillate to a pre-heater heat exchanger 70 where it is used to pre-heat incoming sugarcane juice. Although only one distillate pump 120 is shown, additional pumps may be added as required. The distillate pump is controlled by master control 140 via control box 122. Other methods of extracting distillate may be used. More than one pre-heater may be used.

Sensors

The evaporator condenser units have respective sensor arrays 90 mounted thereto. The sensor arrays such as 90 are used for measuring operating parameters like temperature, pressure, level, gas concentration, Brix concentration, TDS measurements, pH, colour etc. The sensor arrays provide information about operating conditions to the master controller 140 via control box 122. For example when the master control 140 senses that the vapor reservoir 172 is full of unwanted gases via appropriate sensors then it opens the vents to exhaust the gases with exhausting apparatus 46. Each sensor may have own link or all sensors may have one common link to the master controller 140.

Control Box

The smart sensors array, such as, 90 communicates with main controller 140 via a control box 122 that uses the signals to control the functioning of the vent or other controllable elements like compressor, pump, control valves etc. or to communicate the information to the operator via a wired or wireless link or all of them. The sensors are located in disparate areas, the control box provides a localized area for wiring and control. All the embodiments show one control box, but additional control boxes can be added.

Heating Apparatus

The jaggery-making system of FIG. 1, has a heating system that includes a hearth 64, a flue or chimney 124 and a place for pans. Fuel, such as bagasse, is burnt in hearth 64 and the released gasses escape via the flue or chimney 124. The shape of hearth 64 and the chimney 124 are designed to promote the creation of draft through hearth 64. Burning of bagasse may be done manually or may be controlled by master control 140 via control box 122. In alternate embodiments other means of heating such as gas, solar, electricity etc., may be used.

Stirring or Scraping System

As sugarcane juice is heated, it has a tendency to stick to the heating surface and this must be scraped off to allow continuous flow of heat from the heat source to the sugarcane juice. In the jaggery-making, the sugarcane juice may tend to be continuously stirred for good consistency. Each tank 34, has a stirring or agitating or scraping mechanism 104. The stirring unit, system or mechanism, or wiper, stirrer or agitator 104 as it may variously be termed herein, is powered by a prime mover such as a motor 102 that is mounted on top of lid 170 of the tank or is rigidly supported by alternate means.

The mechanism may have the form of a paddle or wiper, which may be moved in the heated feed stock liquid, and which may have a portion that rides against the container wall. In FIG. 1, stirring unit 104 conforms to the shape of the pan. The scraper, or wiper, is attached to the lower end of stirring unit 104. As the stirring mechanism rotates, so does the scraper. The scraper may be made of plastic or other suitable material rigidly attached to the stirring unit 104. The scrapers rub over the bottom face of the pan. This rubbing action cleans the bottom face and may tend to encourage good heat transfer from the hearth to the sugarcane juice.

Figure 6:
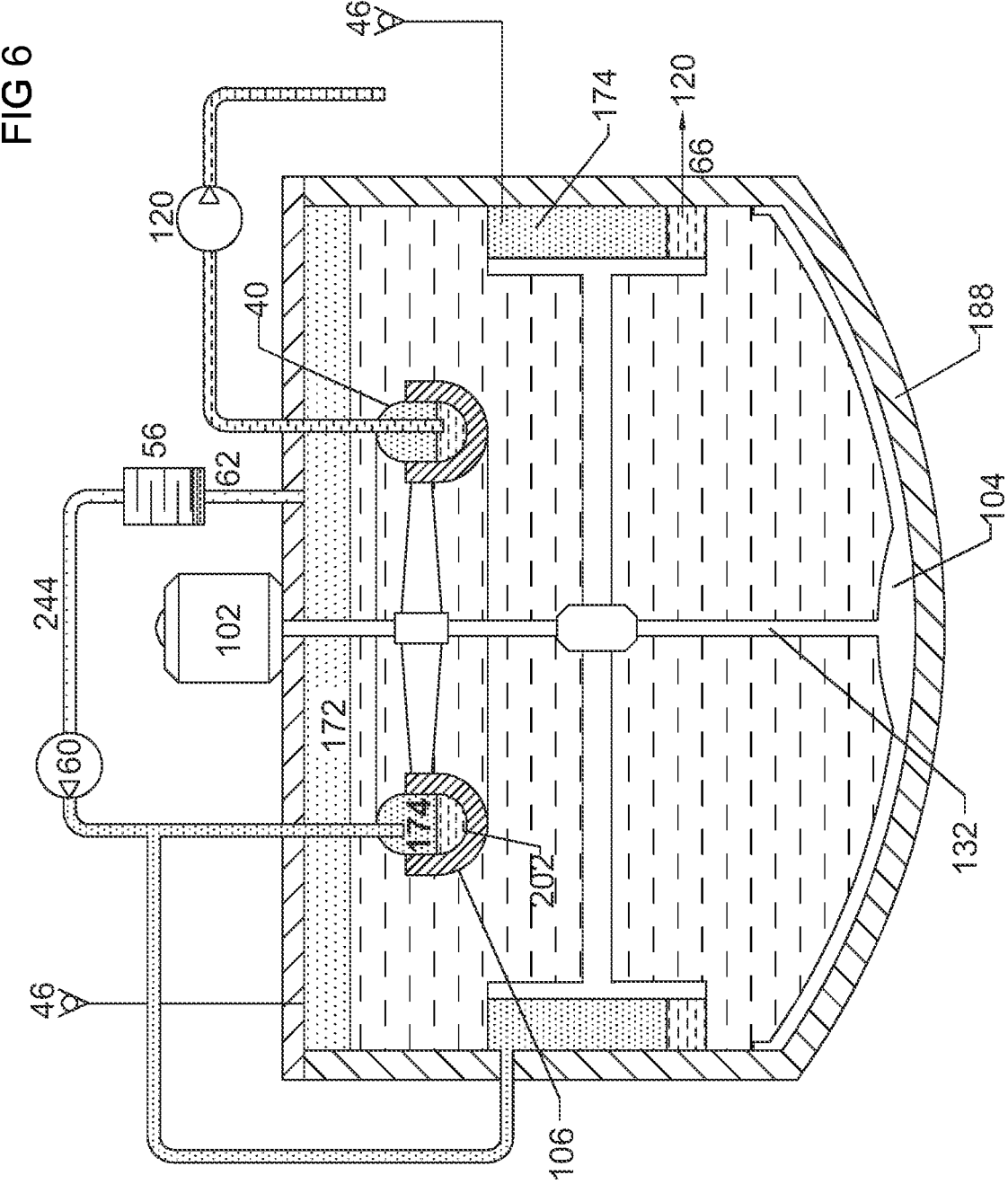
FIG. 6 is a schematic drawing showing a scraping mechanism for the processing plant of FIG. 1.

An example of a scraping mechanism for the integrated evaporator condenser is shown in detail in FIG. 6. In this example a scraping unit has a conforming plate 106. Scrapers surround the heat-exchanging surface 40 of toroidal tube. Plate 106 moves relative to the heat-exchanging surface 40 as driven by prime mover 102. Master controller 140 controls movement of prime mover 102. Alternate designs of scraper or stirring mechanisms may be used.

Another example is shown in FIG. 3. It has a plate 106 and scrapers surround the "cold" or the first pass surface or outside of the heat-exchanging tube bundle surface 110. The heat-exchanging surface 110 of evaporator-condenser 118 passes through a plate 106 with a plurality of holes to pass the tubes. Plate 106 is moved relative to the tube bundle using mechanical means. A lead screw 128 driven by a motor 130 moves plate 106 relative to the outer surface of the tubes in the heat-exchanging surface 110, thereby cleaning them with scraping devices made of plastic, or other suitable material, mounted on the plate. Master controller 140 controls the movement of the motor 130.

Another heat transfer surface is that of the jacket 100 surrounding the containment tank or pan 34. This surface may be scraped using one of two means. In the first method, a rotating mechanism connected to shaft 132 as shown in FIGS. 1, 3 and 4 is used. In the second method an auger 134 with helical blades as shown in the second stage 24 of FIG. 1, may be used. In both cases blades made of suitable material do the scraping. Other designs may be used.

Control Valve

In the embodiment of FIG. 1, the input to control valve 88 is connected to the containment vessel of the respective upstream stage and the output of control valve 88 is connected to the respective downstream containment vessel or tray. This embodiment shows three control valves. Additional or fewer valves may be used as appropriate. In this embodiment, the control valves are under the control of the master control 140. The master control signals can open the control valves at any time. The master control also regulates the flow of liquid between pans/tanks using these control valves.

Master Control

Master control unit 140 controls the function of the jaggery-making apparatus. The tasks of master control 140 may be divided into two main categories. The first category includes ensuring the jaggery-making apparatus is working as pre-programmed. To this end, master control 140 collects data from sensor arrays such as 90, via control boxes such as 122 and algorithmically determines the action to be taken. Master control 140 can change operating conditions by operating actuators such as the one that feeds the hearth with fuel; by opening air feed to the hearth; by switching on or off devices like stirring mechanism 104 and operating devices such as control valves 88. Master control 140 collects data from the sensor arrays 90 and uses the sensor data within a pre-programmed algorithm and issues control signals to the control valves, the heat source, pumps, compressor and other devices connected to the system.

The master control receives data from the sensor arrays. This data is processed in pre-programmed algorithms and is used to activate other parts of the algorithm or program. The other parts of the algorithm can activate the various actuators such as compressors, pumps, motors, furnace controls and other flow regulators in the system, etc., to accomplish a variety of operations such as stirring, or to alter process parameters like pressure, flow etc. Some parts of the algorithm can also be used to monitor and control actuator performance. Some parts of the algorithm can also communicate with the user. They can inform them of critical happenings and can take orders from the user to override the algorithm. Other parts of the algorithm interface with databases to acquire relevant data for improved performance. Other parts of the algorithm can store data about the performance parameters and observed performance conditions acquired from sensors. This data record can be used for later processing either internally or externally of the master control to improve the performance set points of the algorithm or to modify the algorithm either automatically or manually. Yet other parts of the algorithm interface with telephony means as may be prevalent at the time. Yet other parts of the algorithm allow it to interact with remote devices in a secure environment.

Master control 140 may also communicate the status of the apparatus and the application to the operator through use of appropriate means such as internet or telephony. Use master control 140 may permit advances in control to be incorporated in the system by subsequent programming updates without need to alter the physical hardware of the apparatus more generally. Master control 140 may also collect operational data over time and communicate it to the operator. Master control 140 has an application interface that allows the system to be monitored and controlled remotely. The same application interface can be used to interface other devices to the system. Master control 140 may allow other enabled devices to integrate with the applications controlled by the master control and to share operating data with other apparatus and even to collaborate to share resources such as energy, water etc.

Method of Operation

FIGS. 1, 3, 4 and 7 show a variety of embodiments of pan evaporator processing plant for jaggery making. Raw sugarcane juice begins its journey through the processing plant in feedstock source 28, which may also be identified as tank 28. The raw sugarcane juice from tank 28 is first filtered in filter 68 to remove coarse aggregates and solids. Reverse osmosis filters may be used to filter out inclusions from the sugarcane juice and even to concentrate it. At this stage various chemicals may be added to the juice to aid in the jaggery-making process as suitable, e.g., as according to an applicable recipe. The treated juice is pre-heated. There are three stages in the current embodiment. Other embodiments may have different number of such pre-heat stages. First the sugarcane juice is passed through a tray heat exchanger 94 where it gains heat from jaggery that is being solidified. Second it gains heat from hot condensate 30 collected from various sources in the process. The sugarcane juice is heated in heat exchanger 70 before it is conducted to tank 96. Heat exchanger 70 pre-heats the incoming sugarcane juice once the system is operational. Third, the sugarcane juice is pre-heated in storage tank 96, where it gains heat from the flue gases.

Figure 2:
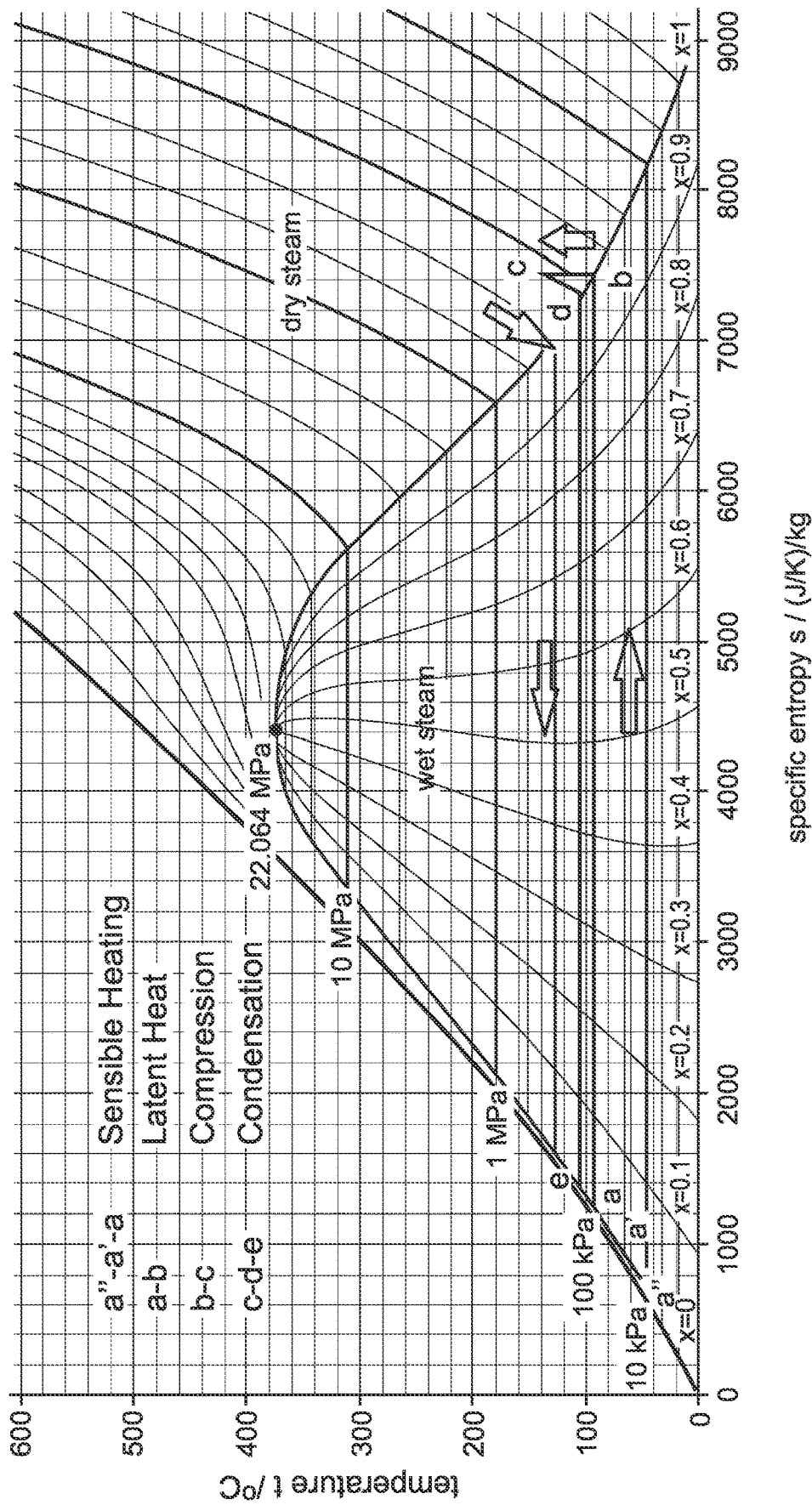
FIG. 2 shows a T-S diagram of Jaggery as approximated by water showing the various thermodynamic states of the working fluid.

From tank 96 the sugarcane juice is directed through an inlet valve 98 to fill pan 34 of first stage 22. During operation, the sugarcane juice undergoes various transformations. FIG. 2 illustrates the thermodynamic states of the sugarcane juice during different stages of operation. Pre-heating of incoming sugarcane juice is indicated by process –a"-a' in FIG. 2 where the temperature of the incoming sugarcane juice increases as heat is received from the various heat sources as described above. Tank or pan 34 of the first stage of processing 22 serves as the primary pan of the Jaggery Making System.

Sugarcane juice in the pan 34 of the first stage 22 is further heated by combustion of fuel in hearth 64. This is indicated by process a-a in FIG. 2. Alternatively, the sugarcane juice can also be heated with electric heaters or gas burners or heating with solar devices as may be. The sugarcane juice begins to boil and the steam collects in the vapor reservoir 172. This phase transformation from liquid to vapour is represented by process a-b in FIG. 2. Steam in vapor reservoir 172 is taken to the demistifier 56, where the water droplets are separated and dried steam is communicated to compressor 60. Vapor compressor 60 raises the pressure of the incoming steam (represented by process b-c in FIG. 2). The pressurized steam is communicated to the evaporator condenser 40 and to the double walled evaporator condensers 80 and 100 of the pan 34. Here in the evaporator condensers the steam exchanges heat with the parent sugarcane juice in pan 34, and condenses. Latent heat released by the condensing steam is transferred to the sugarcane juice across the heat transfer surfaces of the evaporator condensers. In pan 34 the sugarcane juice is further heated and it boils the sugarcane juice producing more steam that collects in the vapour reservoir 172. From the reservoir it finds its way into the compressor and flows to the evaporator condenser once again. This cycling of the latent heat may tend to enhance system efficiency. As latent heat is recycled, only incremental additional heat is required to keep the process operational. This may tend to reduce consumption of fuel and to improve the efficiency to the system.

The condensate is pumped out by distillate pump 120 via tube 66 to heat exchanger 70, where it exchanges heat with the incoming sugarcane juice (as mentioned earlier). The phase transformation through exchange of latent heat of pressurized steam is shown by process c-d-e in FIG. 2. The distillation process continues removing water from the sugarcane juice in the pan and generating distillate.

In a typical process, about 50 kg of sugarcane juice produces about 10 kg of jaggery. Once enough water has been removed from the sugarcane juice in containment vessel or pan 34 of first stage of processing 22 and the juice has thickened enough it is transferred to tank 34 of the second stage of processing 24. Master control 140 can determine the time of transfer based on the data collected from the sensors, or by using an inbuilt timer. The transfer can also be initiated by an operator based on experience. When the juice has thickened enough master control 140 opens control valve 88 and transfers the thickened sugarcane juice to tank 34 of the second stage of processing 24. The sugarcane juice in tank 34 of the second stage of processing 24 continues to be heated. The operation of the process in tank 34 of the second stage 24 of processing is identical to the operation of tank 34 of first stage of processing 22. The heat from the hearth boils the sugarcane juice and the generated steam collects in the vapour reservoir. The steam from the vapour reservoir in compressed and injected into the evaporator condensers such as 40 and 80. The vapour condenses passing its latent heat back into the sugarcane juice in tank 34 of second stage 24. In tank 34 of second stage 24 the sugarcane juice thickens further. To stir the thickened juice continuously, a stirring mechanism, such as an auger, powered by motor 102 of the second stage 24 is used. The stirring mechanism scrapes the surface of tank 34 of second stage 24 for any deposits and also stirs the sugarcane juice regularly. Once the sugarcane juice has thickened enough as determined by an operator or by master control 140 based on data collected from the sensor arrays, the master control opens control valve 88 of the second stage of processing 24 and transfers the sugarcane juice to tank 34 of the third stage 26. The transfer mechanism depicted in the various embodiments is gravity, however, other methods of transfer can also be used.

Operation of tank 34 of third stage 26 is identical to operation of tanks 34 of second stage of processing 24 and 34 of first stage 22. Here the heat from the hearths processes the sugarcane juice further. The sugarcane juice is continually stirred by a stirring mechanism, a helical auger in this embodiment. The sugarcane juice is thickened to a uniform consistency by continued stirring, scraping and heating. At the appropriate time as determined by the master control based on the data collected from the sensor arrays or by using an inbuilt timer or as determined by an operator the thickened and processed jaggery is transferred to cooling tray 94. Since the jaggery has a lot of heat still in it, cooling tray 94 is designed with an integral heat exchanger. This heat exchanger transfers the heat from the cooling jaggery to the incoming sugarcane juice.

The jaggery making system has sensor arrays 90 attached to it. Sensor arrays 90 are used for measuring operating parameters such as temperature, pressure, level, gas concentration, Brix concentration, total dissolved solids (TDS) measurements, pH, colour etc. The sensor arrays provide information about operating conditions to master controller 140 via a control box 122. The sensors monitor the operating conditions inside the jaggery making system. For example, if the temperature begins to rise master control 140 informs the operator using telephony/internet techniques. The operator may choose to turn off the heating and turn on stirring system 104. The operator can take these actions from a remote location, by using a software application that resides in their phone or personal computing device and communicates with the master control. The heating system off signal is communicated to the master control, which enacts it on the machine. Alternatively, the master control can take these actions based on a pre-programmed algorithm residing in it. Other sensor-based actions may also be implemented.

Distillate extraction pump 120 collects the distillate from the distillate sumps of the various evaporator condenser through tubing. Distillate extraction pump 120 is under control of master control 140 through control box 122. Vapor compressor 60 is regulated by the master control 140 via a control box 122. The distillate pump 120 that collects the distillate from the evaporator condenser and other sources of distillate such as the demistifier, heat exchangers etc., may be one pump or more as suitable, however, here in all the figures showing various embodiments of the invention it is shown as a single pump 120.

Distillation of Soiled Water

One facet of the apparatus described herein is to develop an energy recycling system based on vapour distillation process for distillation of soiled water into contamination free water. One method of treating soiled water is at the source. This may be facilitated by using a distributed processing system having equipment that can be easily moved assembled maintained and run. A modular system with standardized condenser-evaporator units and flexible system architecture may permit large variation in its capacity and topology is presented according to particular needs. Such modular systems permit mass manufacturing and may make the technology more affordable to a broader market. The apparatus herein employs an evaporator condenser that can operate in a pan evaporation design.

In another employment, embodiments of the apparatus herein may be used for in situ processing of soiled water using a vapour distillation process. One product of this process is distilled water. The process begins at the site of production of soiled water. The incoming soiled water may be treated to remove solids or other impurities, as by physical filtering to remove solids or other potential flow obstructions. Once treated, the soiled water may be pre-heated in a heat exchanger wherein the incoming soiled water absorbs heat from the outgoing hot distillate. The pre-heated soiled water is stored in a pan such as a septic tank. In these embodiments the septic tank has an evaporator condenser that is at least partially immersed in the soiled water. A heating source, such as a coil, is used to boil the soiled water during the start-up phase and is used to supply a trickle of heat during normal operation to offset thermal losses due to leakage, and so on. Steam generated by boiling the soiled water is collected in a vapour reservoir. The vapour from the vapour reservoir is communicated to a compressor via a demistifier or water separator. The demistifier or water separator removes liquid particles from the steam. The compressor yields pressurized steam at its outlet. The pressurized steam is fed to the condenser, which is at least partially immersed soiled water in the pan.

In the condenser the pressurized steam is separated from the boiling soiled water by a wall typically made of heat conducting material such as brass or steel. The thermodynamic state of the boiling water is marked as b in FIG. 2. The thermodynamic state of the pressurized steam is marked as c in FIG. 2. The pressurized steam condenses on the relatively cooler surface of the evaporator, releasing its latent heat, which is recycled into the soiled water. The recycled heat boils additional soiled water and produces more steam, which collects in the vapour reservoir and becomes part of the process described above. The rate of condensation is largely controlled by the thickness of the condensate film on the surface of the evaporator.

The hot distillate produced by condensing the steam is pumped to a reservoir for later use either to heat the incoming soiled water or to heat the air required in a family home or to generate hot water required in a family home, or such other use as may be. The apparatus works under the control of a master controller, which determines the state of the apparatus through sensors in the apparatus, and controls the various devices as per a preprogrammed algorithm. Various components related to distillation of soiled water are described below:

Walls and Enclosures

Figure 9:
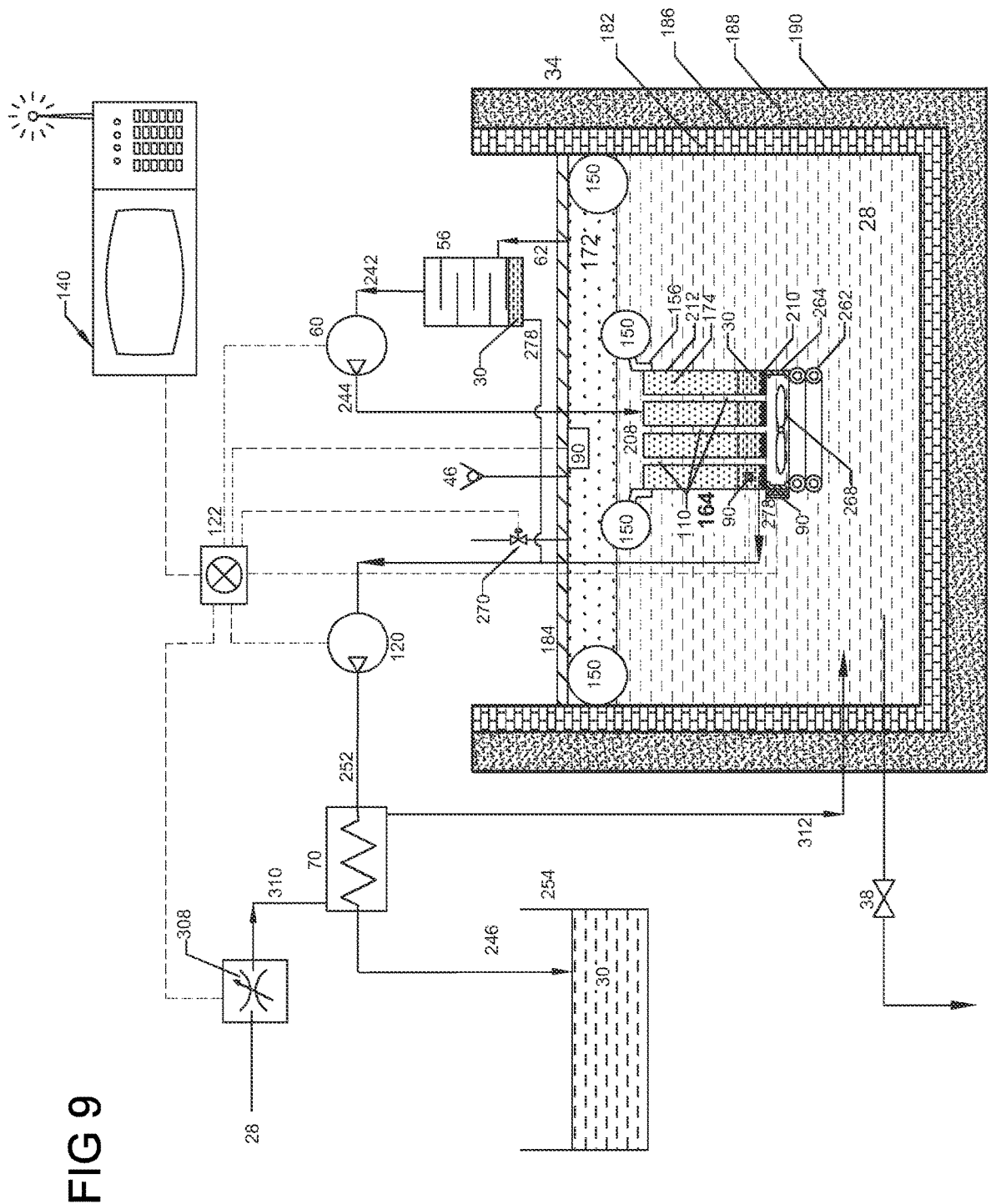
FIG. 9 is a schematic drawing of a portable floating energy recycle evaporator condenser (PMEREC) in which soiled water resides inside a tube bundle as it exchanges heat with compressed steam, the apparatus having a pan made of brick and having a floating ceiling.

The containment vessel 34 can have many embodiments, including an in-ground septic tank, as in FIG. 9. It has a walled pit 182 and a movable ceiling 184. The wall and floor may typically be made of brick or other suitable material. The wall and flooring are encased in a plastic vapour barrier 186 to stop the feedstock source, in this case soiled water, 28, from leaking into the surrounding formation. An internal or first vapour barrier 186 is further encased in insulation 188. Insulation 188 is further encased by an external or second plastic vapour barrier 190 to prevent or discourage moisture ingression from surrounding into the insulation 188. Alternate embodiments may not have the vapour barrier 186 and/or 190 or may use alternate methods of insulation and avoiding seepage or leakage. The enclosure is an example of containment vessel 34. Other suitable sizes and shapes and types may also be used.

Figure 10:
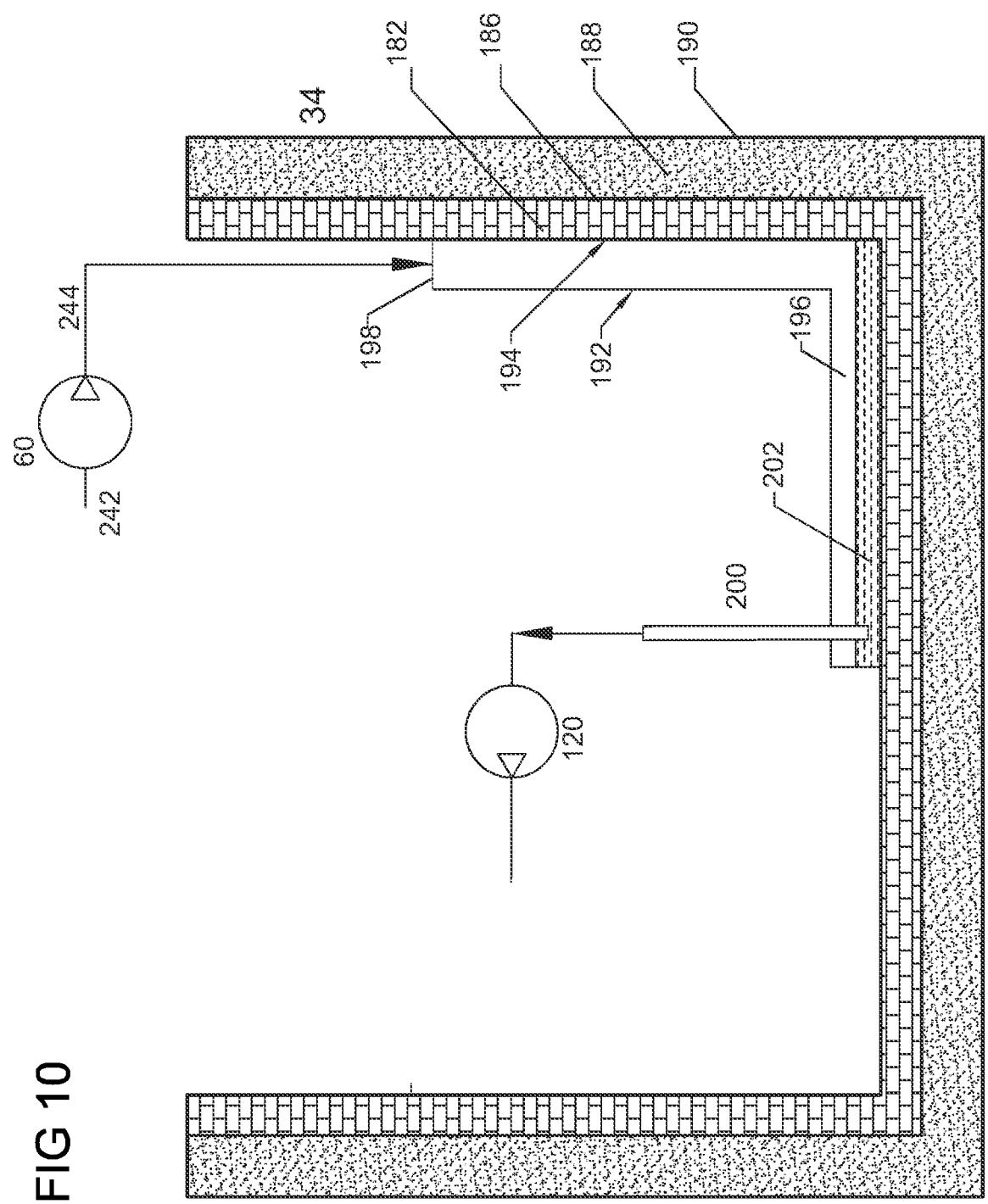
FIG. 10 shows an embodiment of the pan of FIG. 9 having a partial double wall.

In the alternate embodiment of FIG. 10 the sides of septic tank 34 may have double walls 192 and 194. Inner wall 192, which is in contact with the soiled water (feedstock) 28, is made of a material with good heat transfer properties. Airtight space 196 between inner wall 192 and outer wall 194 serves as a heat exchanger 80 and has at least one input and one output. The input 198 is a steam inlet and is connected to a source of high-pressure steam from compressor 60, while the output 200 is connected to a distillate pump 120. A second outlet to allow trapped gases to escape is shown as 236 in FIG. 30, and may be added as required. Inner wall 192 may have corrugations, fins or other features to increase the area of heat transfer. This part with the double walls acts as a condenser in which water vapour enters at input 198, condenses on the relatively cooler wall surface of inner wall 192, drains into a liquid sump or accumulate as at 202, and is drained or pumped out by distillate pump 120.

Figure 11:
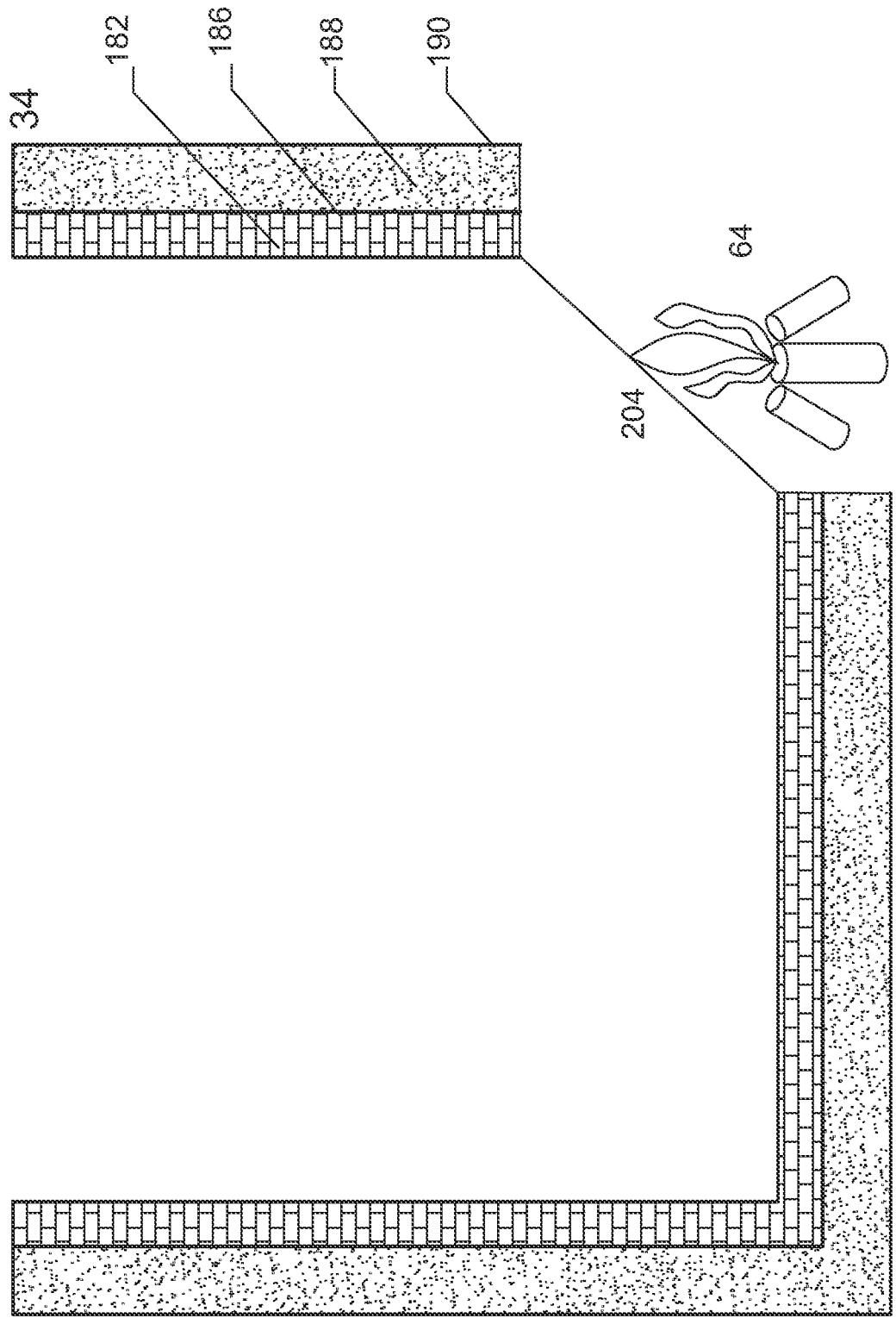
FIG. 11 shows an embodiment of the pan of FIG. 9 having a heat conducting partial wall that allows an external heat source to heat the soiled water.

In an alternate embodiment of containment vessel 34 as shown in FIG. 11, the wall 204 may separate the soiled water 28 from a heat source such as a gas burner or wood-burning fireplace 64. Wall 204 is made of a material with good heat transfer properties. Heat from fireplace 64 is transferred to soiled water 28, thereby heating it. This part of the wall acts as a heat source. Other methods of providing heat to soiled water may be used.

Ceiling

In the embodiment of FIG. 9, ceiling 184 is made of lightweight, thermally stable, corrosion resistant waterproof material. Ceiling 184 is mounted to a float or pontoon 150. Pontoon 150 floats on soiled water 28 and ensures that no leakage of vapour occurs. Ceiling 184 is of sufficient structural strength to support the loadings as are appropriate at the installation. Pontoon 150 is made of thermally stable, corrosion resistant, lightweight material. The gap between ceiling 184 and the soiled water 28 act as a floating vapour reservoir 172. Evaporated water in the form of steam collects in this space. In an alternate embodiment the ceiling may be self-floating and may not require separate pontoons 150 to give it buoyancy. The floating ceiling may also have a vent in some embodiments.

Figure 14:
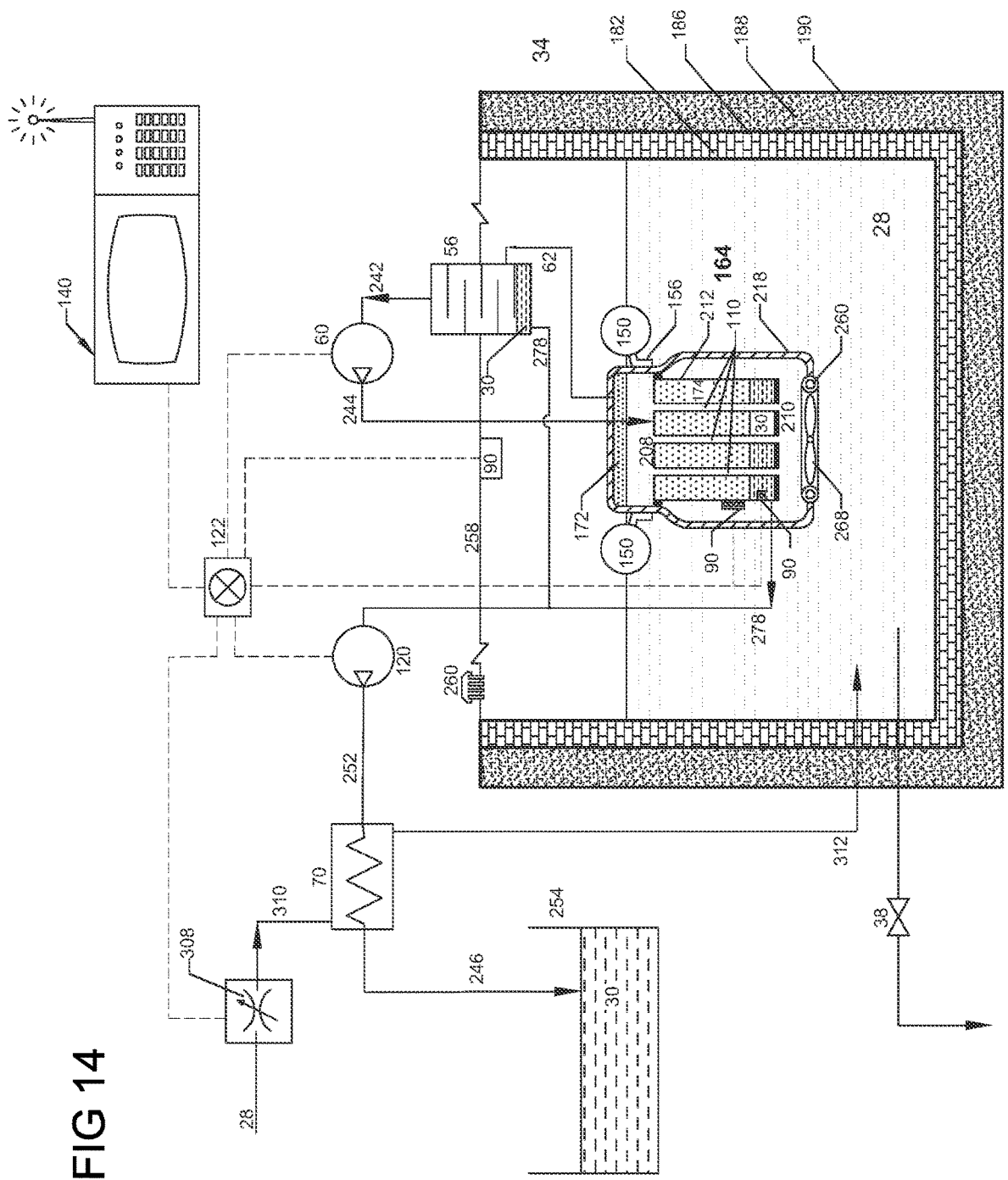
FIG. 14 is a schematic drawing of the apparatus of FIG. 9 in which the evaporator condenser is covered with an insulating shroud.
Figure 19:
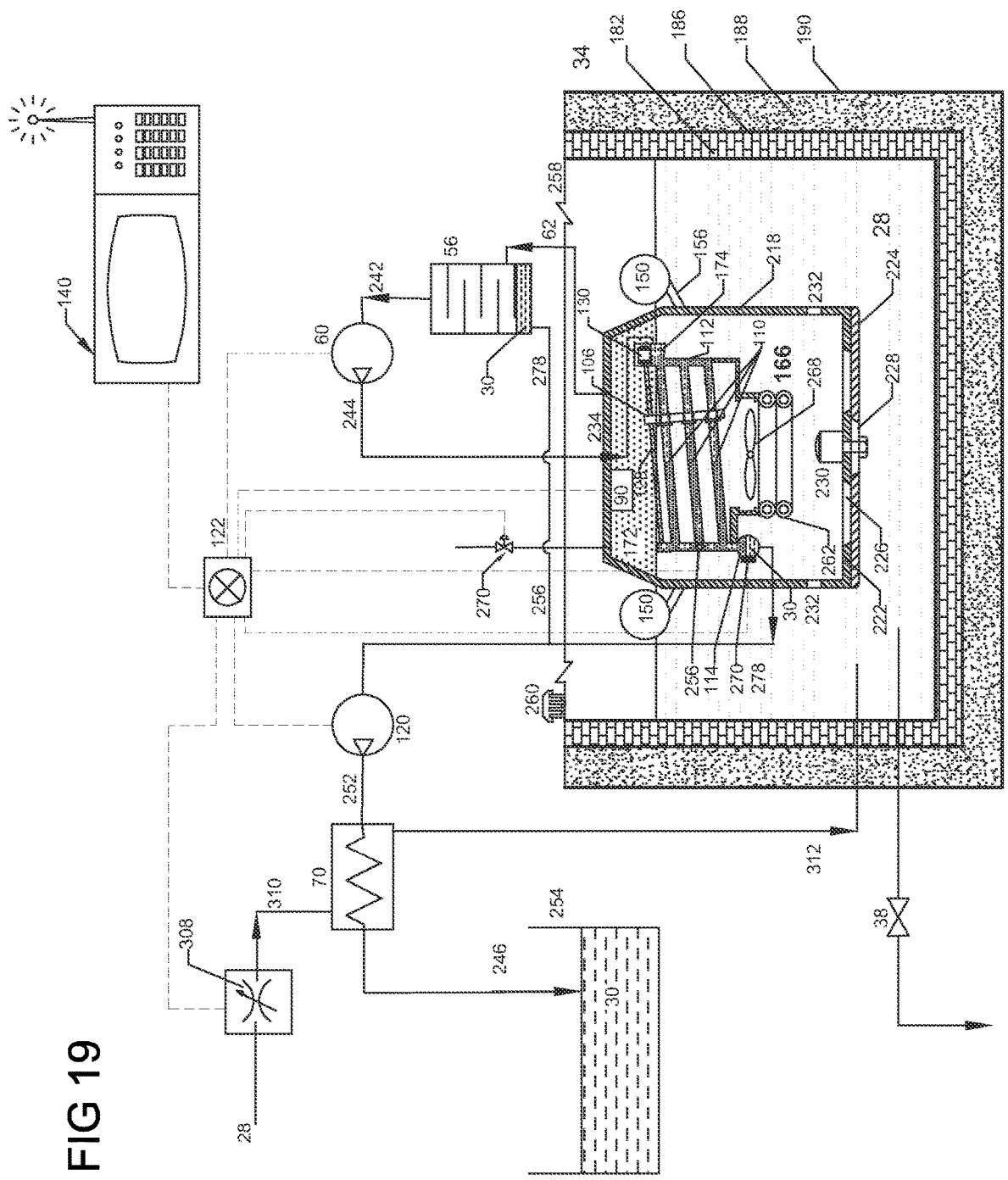
FIG. 19 is a schematic drawing of the apparatus of FIG. 16 in which the evaporator condenser is covered by an insulated shroud that acts as a floating vapour reservoir, and having a fixed ceiling and a venting mechanism.

In the alternate embodiment of FIGS. 14 and 19 ceiling 258 is rigidly attached to the walls or rigidly located on columns or side-walls. Ceiling 258 has a vent 260 to allow the gases or air to escape and to accommodate changes in level of soiled water 28. Other designs of ceilings may be used.

Portable Modular Energy Recycling Evaporator Condenser

Figure 12:
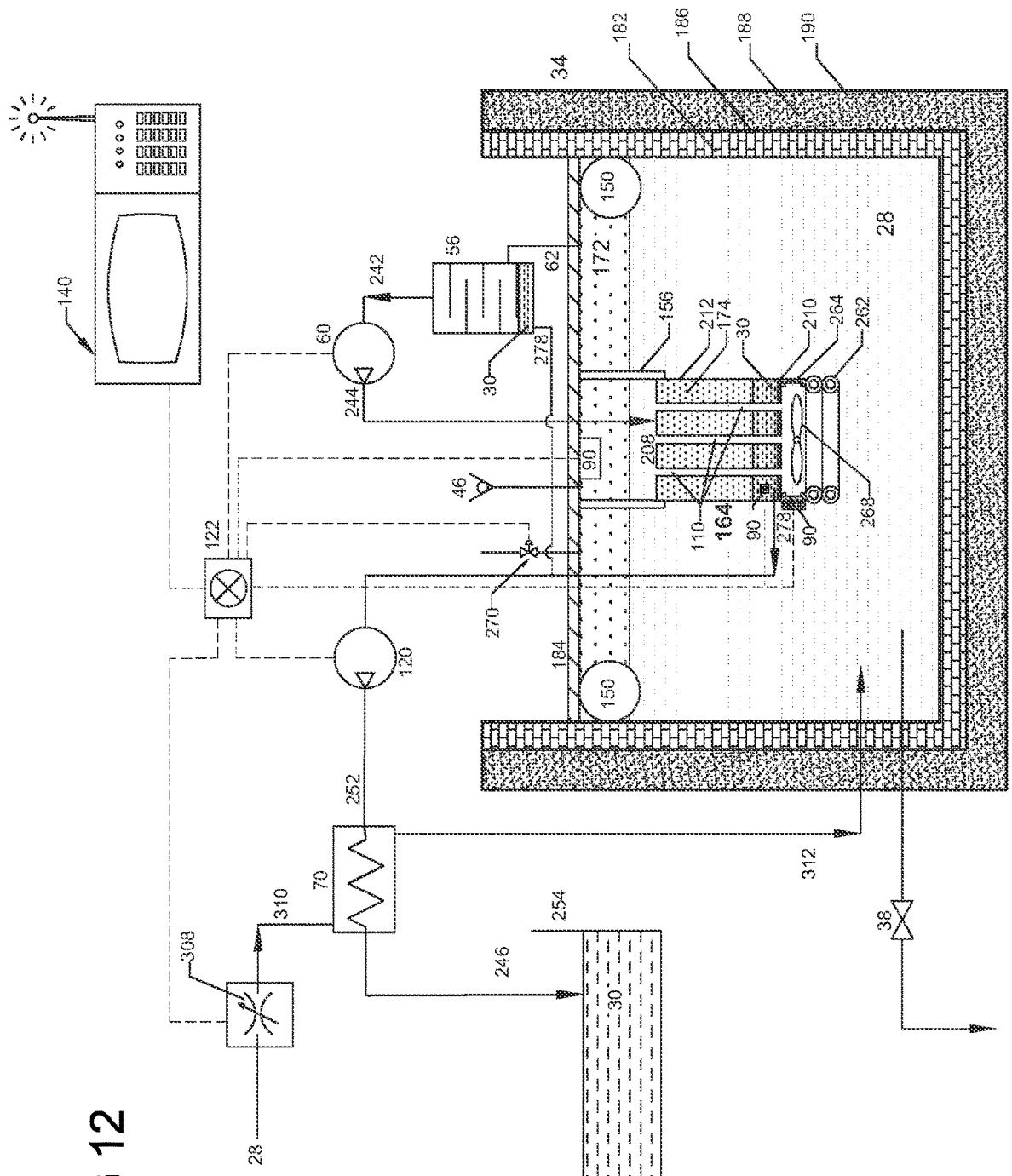
FIG. 12 is a schematic drawing of the apparatus of FIG. 9 that is rigidly attached to floating ceiling.

At least one modular evaporator condenser 164 floats in soiled water 28 in FIGS. 9 to 11, 13 to 16, 18 and 19. In FIGS. 12 and 17 the entire ceiling 184 floats in soiled water 28 and evaporator condenser 164 is rigidly attached to the ceiling with stand-off bracket 156. Each embodiment of the portable modular energy recycling evaporator condenser unit includes:

(a) Floats

Modular evaporator condenser 164 has a float 150 that lifts the weight of the modular evaporator condenser unit and keeps it aligned with the surface of soiled water 28. Float 150 is rigidly connected to the evaporator condenser body 164 via a stand-off bracket 156.

In an alternate embodiment the evaporator condenser may be indirectly connected to the float attached to the ceiling as is shown in FIGS. 12 and 17. The float attached to the ceiling 258 with stand-off bracket 156 keeps the evaporator condenser 164 in close proximity to the surface of soiled water 28.

In an alternate embodiment the evaporator condenser may be self-floating due either to its shape, or material. This embodiment is not shown. The embodiments in this document show one shape and location of the floats. Other locations and methods of mounting may be employed.

(b) Evaporator Condenser

Evaporator condenser or heat exchangers have a "cold" side or the first side or the first pass where the cold feed source liquid or source gas extracts heat from the "cold" surface or face of the heat exchanger. The heat exchangers have a "hot" side or the second side or the second face or the second pass where the hot liquid or hot vapour transfers heat. The first or "cold" surface and the second or "hot" surface of the heat exchanger maybe opposite sides of the same plate or tube. This process is sometimes referred to as the cold liquid or gas acquiring heat from the warm liquid or gas.

The embodiments of evaporator condensers shown fall into two main categories. In the first category the "hot" side or the condenser surrounds the "cold" side or the evaporator and in the second category the "cold" side or the evaporator surrounds the "hot" side or the condenser. The first category is termed as Water-in-Tube or integrated evaporator condenser (WIT) and the other category is termed a Steam-in-Tube evaporator condenser (SIT).

WIT or Integrated Evaporator Condenser

In this embodiment, evaporator condenser 164 as shown in FIG. 9, includes a tube bundle 110 having a first end that is connected to a first end plate 208 and a second end that is connected to a second end plate 210. This configuration does not have a steam chest or soiled water sump attached to it. An encasing shell 212 extends between and connects second end plate 210 and first end plate 208 to each other. End plate 208 may not necessarily be parallel to the end plate 210. The steam chest or space 174 enclosed by end plate 208, end plate 210, shell 212 and tube bundle 110 is air tight and used for steam under pressure. The pressurized steam in the steam chest or space 174 gives up its heat to the "hot" surface or the second pass surface, or the outside surface, of the tube bundle and other connected surfaces. This heat is communicated to the first side or the "cold" side of the heat exchanger where it transfers this heat to soiled water 28 inside the tubes of tube bundle 110, and also along the surfaces of end plate 208, end plate 210 and shell 212. The heat exchange cools the steam and it condenses. That is, steam in the space 174 loses latent heat and converts to distillate.

Figure 13:
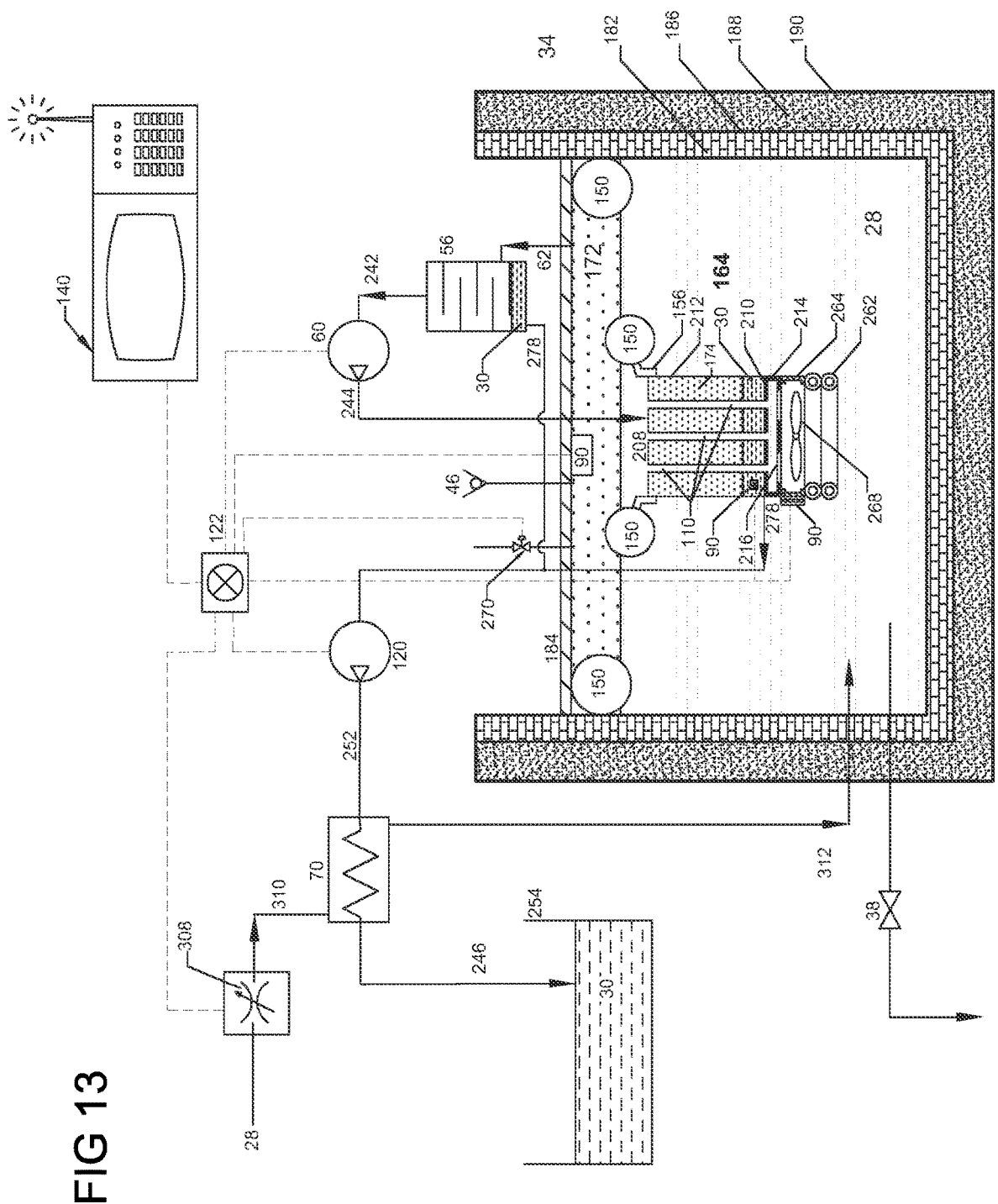
FIG. 13 is a schematic drawing of the apparatus of FIG. 9 in which the soiled water is directed into the tubes through a source chamber.

In the embodiment of FIG. 13, end plate 210 of evaporator condenser 164 has a feed stock source chest 214 for collecting soiled water 28. Source chest 214 has a plurality of openings 216 along its base. Soiled water 28 enters the source chest 214 through these openings 216. The soiled water entering the openings passes through the source chest 214 into the inside of the tube bundle 110.

In the alternate embodiment of FIG. 14, a shroud 218 made of insulating material is mounted to evaporator condenser 164 using a bracket 156. Shroud 218 separates cold soiled water from hot soiled water inside shroud 218, thus creating a localized boiling chamber. In this embodiment the space between the top of shroud 218 and the soiled water inside evaporator condenser 164 forms a vapour reservoir 172 and collects steam from the boiling soiled water.

Figure 15:
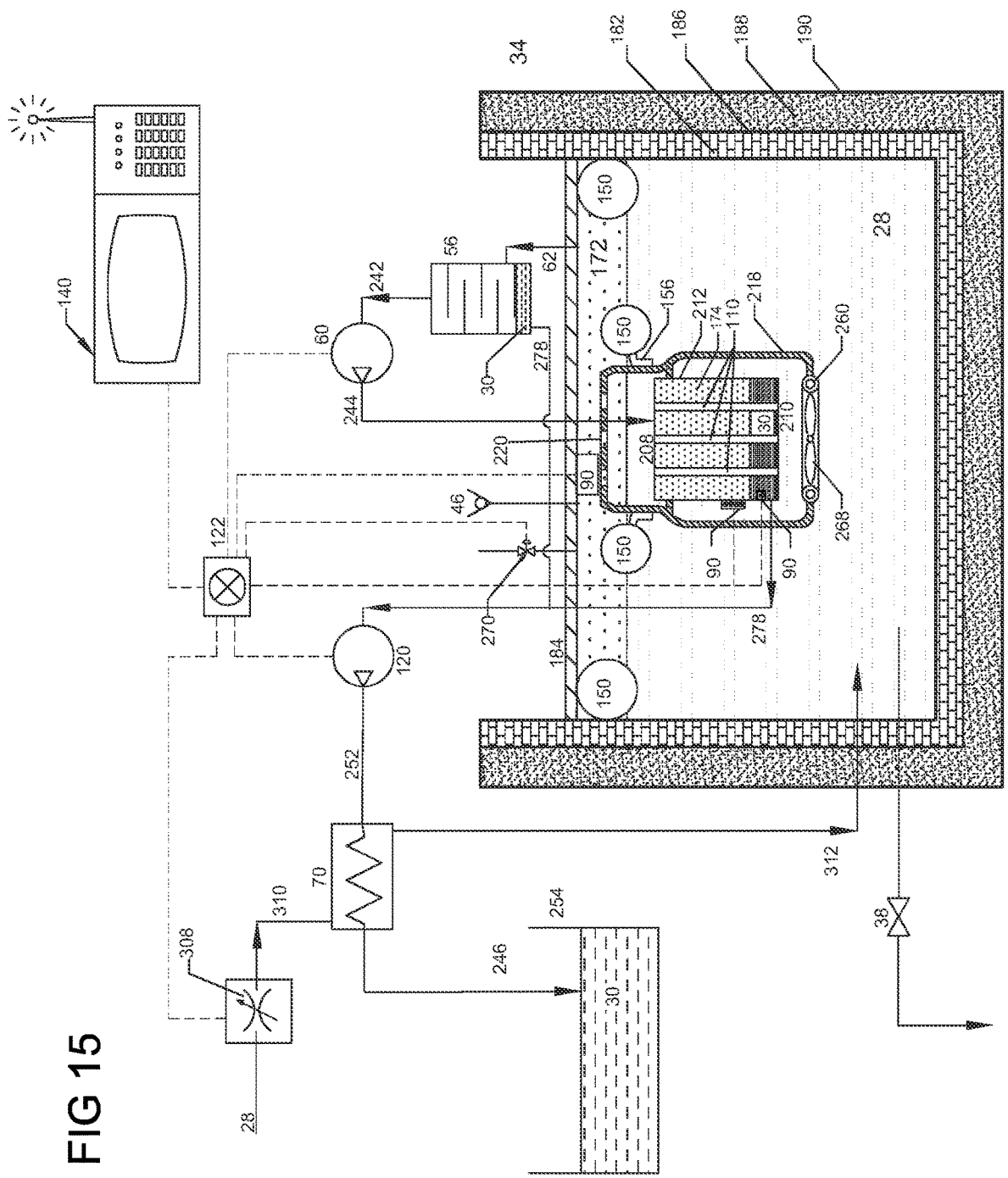
FIG. 15 is a schematic drawing of the apparatus of FIG. 9 in which the evaporator condenser is covered with an insulating shroud that has holes to permit movement of vapour.

In the alternate embodiment of FIG. 15, the ceiling of shroud 218 has holes 220 in it. In this case the evaporator condenser 164 does not have its own vapour reservoir such as 172 in FIG. 14. Steam generated by the boiling soiled water is collected in a common or different vapour reservoir or reservoirs such as vapour reservoir 172 between floating ceiling 184 and soiled water 28 in FIG. 15.

SIT Evaporator Condenser

Figure 16:
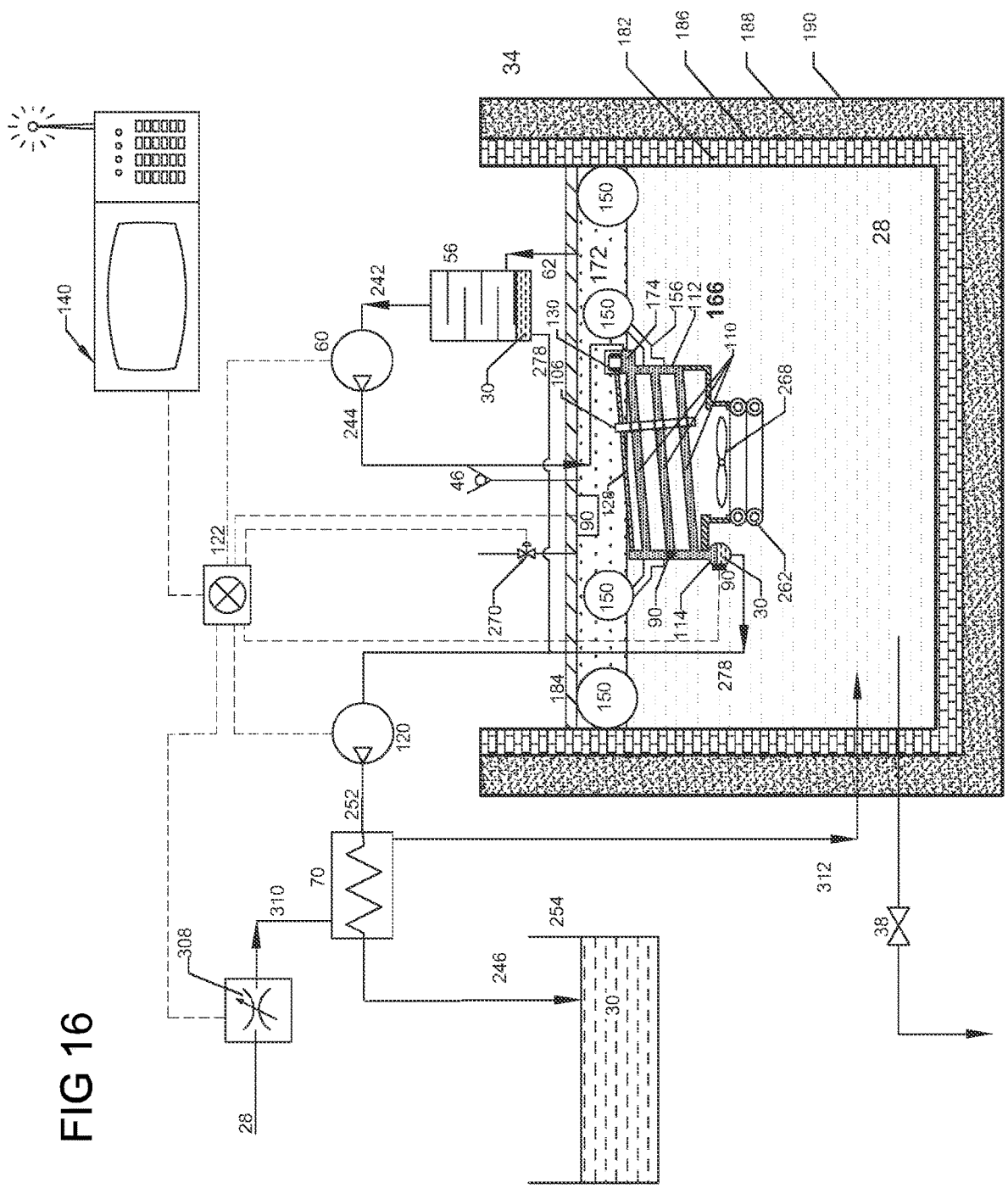
FIG. 16 is a schematic drawing of an alternate embodiment of the apparatus of FIG. 9 in which the soiled water resides outside an inclined tube bundle.
Figure 17:
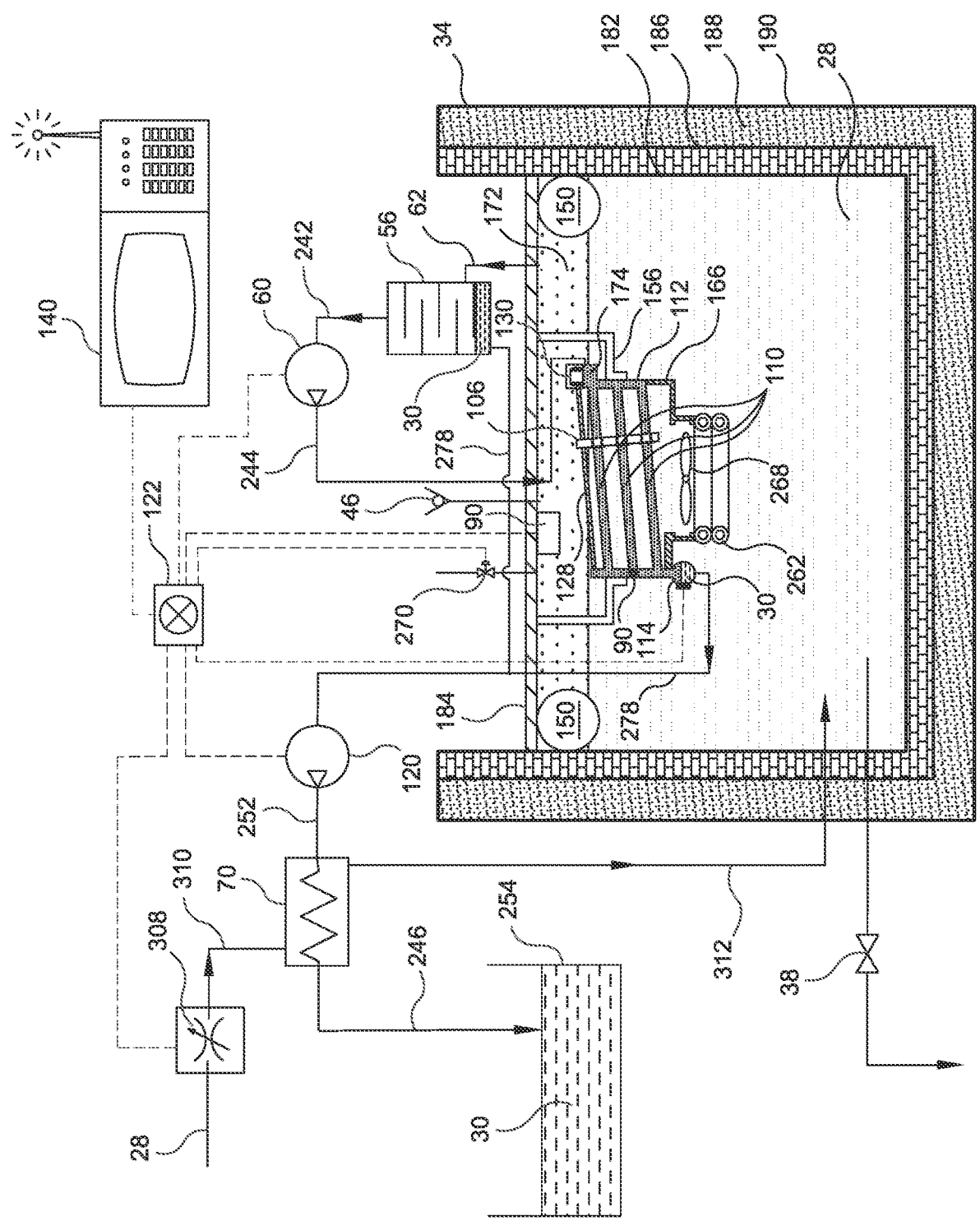
FIG. 17 is a schematic drawing of the apparatus of FIG. 16 in which the evaporator condenser is rigidly connected to the ceiling.

In the embodiment of FIG. 16 an evaporator condenser 166 includes a tube bundle 110 inclined to the horizontal. It has a first end connected to a steam chest 112 and a second end connected to a sump 114. Space 174 enclosed by steam chest 112, sump 114 and tube bundle 110 is air tight and used for steam under pressure. The enclosing surface of space 174 is the "hot" side or the second pass or the second surface of the heat exchanger where the steam deposits heat. The second surface transfers the heat to the first surface as they are opposite faces of the same plate with good heat transfer characteristics. The first surface or the "cold" side or the first pass including the outside of the tubes of the tube bundle 110, the faces of steam chest 112 and sump 114, exchanges heat with the soiled water 28. The heat exchange cools the steam. Condensate 30 is collected in sump 114.

Figure 18A:
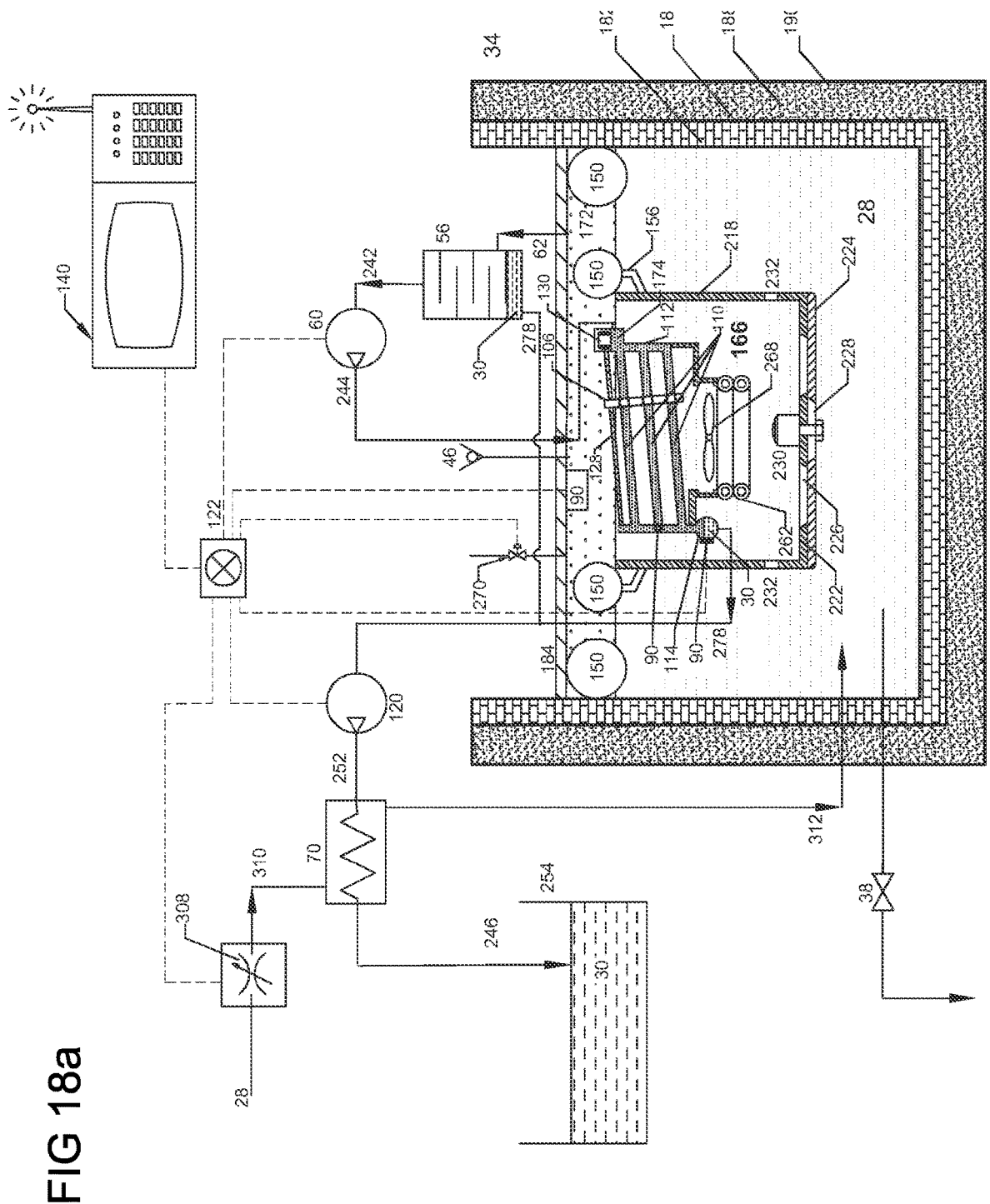
FIG. 18a is a schematic drawing of the apparatus of FIG. 16 in which the evaporator condenser is covered by an insulated shroud.

In the embodiment of FIG. 18a, an evaporator condenser 166 of FIG. 16 has a shroud 218 made of insulating material and attached to floats 150. Shroud 218 separates cold soiled water from hot soiled water in the space inside the shroud 218 and thus acts as a localized boiling chamber. Shroud 218 has a base made of two axially connected sedimentation removal plates 222, 224 with a plurality of holes 226, 228. One plate 222 is attached to the base of shroud 218. The other plate 224 rotates under the control of a motor 230. The plates 222, 224 have two positions relative to one another as shown in FIGS. 18b and 18c. In one position holes 226, 228 align with one another (FIG. 18b) and in the second position are misaligned (FIG. 18c). The misaligned hole is the normal position. The position with aligned holes is used during blowout to expel the concentrated soiled water and sedimentation from the inside of the shroud 218. The shroud 218 has an opening 232 for in-flow of soiled water 28.

In the embodiment of FIG. 19, shroud 218 has a ceiling 234. The space between the ceiling 234 and the soiled water 28 inside the shroud 218 forms a vapour reservoir 172. In this embodiment the soiled water 28 enters the evaporator condenser via in-flow hole 232. Inside evaporator condenser 166 the soiled water boils and steam collects in vapour reservoir 172.

Figure 30:
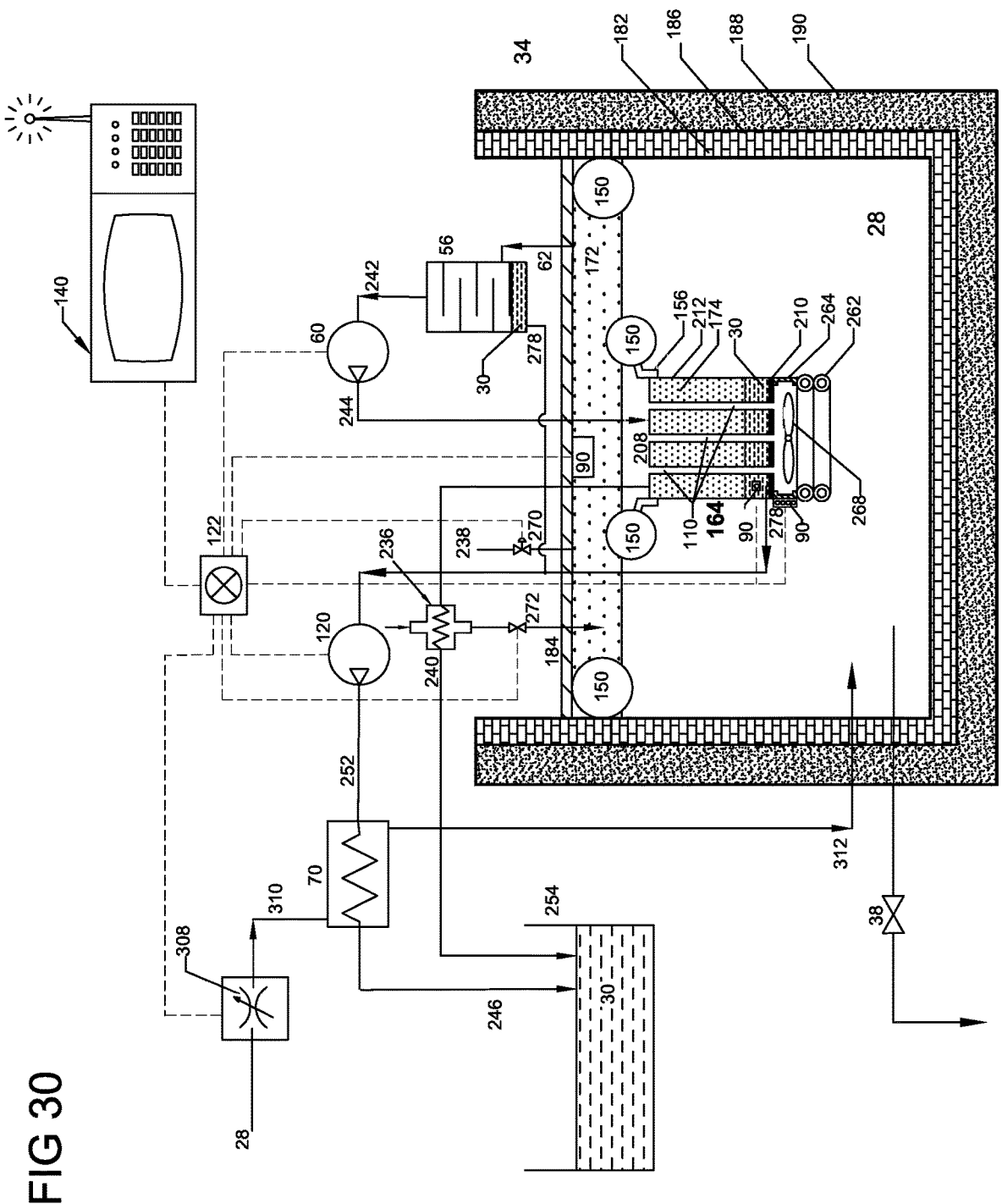
FIG. 30 shows an embodiment for moving and flushing the vapour reservoir cavity for the apparatus of FIG. 9.

The embodiment shown in FIG. 30 has a circuit 236 to release trapped gases in the vapour reservoir and the condenser. The circuit comprises of an air scrubber and an air-to-air heat exchanger 240. The trapped gases from vapour reservoir 174 are piped to the air scrubber and air-to-air heat exchanger 240 through tube 238 using pumps or blowers and tubing. The trapped gases from vapour reservoir 174 are hot and their heat is transferred to the incoming air in the heat exchanger. This circuit can be applied to any other embodiment as well. The gases along with air and steam exiting the evaporator condenser cool down as they pass through the heat exchanger 240 thereby condensing the steam that is collected in sump 254. The gas scrubber is not shown explicitly but as part of the heat exchanger 240. In some embodiments it may be a separate unit. In alternate embodiments pressurized motive steam may also be used in place of air to scavenge the vapor reservoir space.

Figure 20:
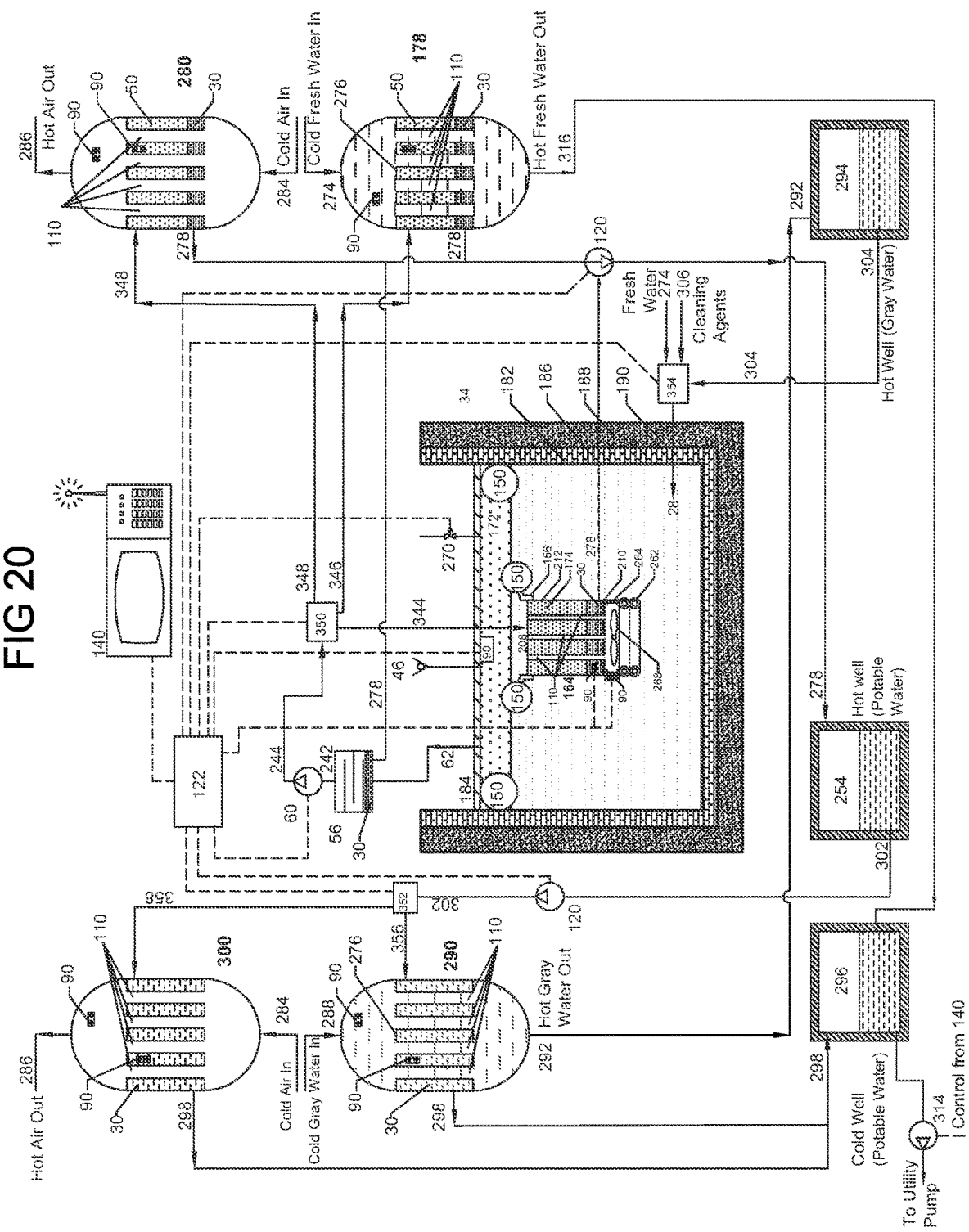
FIG. 20 is a schematic of the apparatus of FIG. 9 integrated with a residential air/water heating system.

(a) Compressor and Demistifier or Water Separator:

All the embodiments have a vapour reservoir 172, however it may be called. Steam collected in vapour reservoir 172 flows through tube 62 to a demistifier or water separator 56, which separates entrained liquids from the incoming vapour of tube 62. The vapour from demistifier or water separator 56 is fed by tube 242 to compressor 60 which pressurizes the steam and injects it into a modular evaporator condenser, such as 164, via tube 244. However, in the house heating example of FIG. 20 compressor 60 pressurizes the steam and injects it into evaporator condenser 164 via control valve 350 through tube 244. Distillate 30 collected in the demistifier or water separator 56 flows to a distillate pump 120 using tubing 278. In all embodiments except in FIG. 20 the distillate leaving pump 120 flows to heat exchanger 70 through tubing 252. In the embodiment of FIG. 20, distillate from pump 120 is connected by tubing 278 to hot well 254 for further processing.

(b) Distillate Pump

In the embodiments of FIGS. 9 and 12 to 19, the condenser units of evaporator condenser 164 have a sump to collect distillate 30 left behind by the condensed steam. Distillate pump 120 extracts distillate via tube 278. As distillate 30 is hot, tube 252 carries it to heat exchanger 70 where it is used to pre-heat incoming soiled water 28 before flowing to sump 254 via tube 246. In FIG. 20 one distillate pump 120 extracts water from the various devices such as condensers, and transports it to hot well 254. More than one distillate pump 120 may be used. Different topologies for transferring distillate may be used.

(c) Sensors

The evaporator condenser units 164 and 166 have two sensor arrays 90, attached to the "hot" side and to the "cold" side of the evaporator condenser. Another sensor array 90 is attached to ceiling 184. The sensor arrays 90 are used for measuring operating parameters such as temperature, pressure, level, gas concentration and so on. The sensor arrays provide information about operating conditions to master controller 140 via a link 122. For example when master control 140 senses that vapour reservoir 172 is full of unwanted gases, it opens the vents to exhaust the gases with exhaust apparatus 236 (FIG. 30) such as may be a centrifugal blower. Each sensor may have its own link or all sensors may have one common link to the master controller 140. In embodiments with a rigid ceiling 258 as shown in FIGS. 14 and 19, a vent 260 is provided for accommodating the changes in level of soiled water 28 in the septic tank or containment vessel 34.

(d) Control Box:

Smart sensors 90 are connected to communicate with main controller 140 via a control box 122 that uses the signal level to control the functioning of the vent and other controllable elements and to communicate with the operator by a wired or wireless link. The sensors are located in disparate areas, the control box provides a localized area for wiring and control.

(e) Heating Coil:

Each evaporator condenser 164 (or 166) has a heating coil 262 attached to it either directly or on a bracket 264. The method and location of mounting may vary. Heating coil 262 is controlled by master control 140 through the control box 122. This control ensures that heating coil 262 can be switched on or off as required. Insulation layer 266 above coil 262 stops heating coil 262 from reheating the condensate.

(f) Stirring System

Each evaporator condenser 164 (or 166) has a stirring system 268 that is used to move soiled water over or into the tube bundle 110.

(g) Scraper Unit:

A scrapper unit is shown in FIGS. 16, 17, 18a and 19. In these figures tube bundle 110 of evaporator condenser 166 passes through a scraper plate 106. Scraper plate 106 has an array of holes to admit the tubes of tube bundle 110. Plate 106 is moved relative to tube bundle 110 using mechanical means. A lead screw 128 driven by a motor 130 moves plate 106 relative to the outer surface of the tubes in the tube bundle 110, thereby cleaning them. The scraping device can be made of plastic or other suitable material and is suitably mounted on the plate. Master controller 140 controls the movement of the motor. Other embodiments may use other scrapers.

Vapour Reservoir

Each embodiment has a vapour reservoir. There are two types of vapour reservoirs. In the first type the vapour reservoir is formed of the space between the ceiling 184 and the surface of the soiled water 28, see FIGS. 9, 12, 13, 15, 16, 17 and 18. In this type of reservoir the entire batch of soiled water is heated and its temperature is near the boiling point. The second type of vapour reservoir is formed by the shroud or insulation covering around the portable modular energy recycling evaporator condenser. This type of vapour reservoir is shown in embodiments of FIGS. 14 and 19. Here the vapour reservoir is small and localized to the PMEREC.

All vapour reservoirs have an outlet that leads to compressor 60 via the demistifier or water separator 56; a relief valve 270 to release trapped gases; and an inlet for air. The inlet valve in one embodiment, shown in FIG. 30 as circuit 236, allows pre-heated air, from an air scrubber or heat exchanger 240, to enter the vapour reservoir and create a swirl that eliminates any dead zones and pushes the steam towards the outlet.

Steam-Water Heat Exchanger

FIG. 20 shows a steam-water heat exchanger 178. Although only one heat exchanger is shown in this embodiment, others could be added. Heat exchanger receives steam from compressor 60 via control valve 350 through tube 346. This steam collects around tube bundle 110. Heat exchanger 178 receives cold fresh water from tube 274. The water collects on the "cold" side of heat exchanger 178, inside the tubes of tube bundle 110 and in the enclosing domes 276. The fresh water is on the "cold" side, or the first side, of tube bundle 110, which is heated from the second surface, or the "hot" side, which acquires it from the steam. This cools the steam and condenses it. At the same time it heats up the cold fresh water, which is transported by tube 316 to well 296. Condensate 30 is transported to hot well 254 via tube 278 using means such as a pump.

Steam-Air Heat Exchanger

FIG. 20 shows a steam-air heat exchanger 280. Although only one heat exchanger is shown, others could be added. This heat exchanger receives steam from compressor 60 through tube 348 via control valve 350. This steam collects around tube bundle 110. Heat exchanger 280 receives cold air via duct 284. The air collects in the enclosing space, a dome shape in this embodiment, and moves through the tube bundle 110. The air exchanges heat with the steam across tube bundle 110. This cools the steam condensing it and at the same time heats up the air. The hot air from heat exchanger 280 is transported via duct 286 to the utility as needed. Condensate 30 is transported via tube 278 to hot well 254 using means such as a pump. The heated air is transported via duct 286 to the utility.

Water-to-Water Heat Exchanger

FIG. 20 shows a water-to-water heat exchanger 290. Although only one heat exchanger is shown in this embodiment, others may be added. Heat exchanger 290 receives hot water from hot well 254 through a control valve 352, pump 120 and tube 356. This hot water collects in space surrounding tube bundle 110 of heat exchanger 290. Heat exchanger 290 receives cold gray water via tube 288. The cold gray water collects in the enclosing space, a dome shape in this embodiment, and moves through tube bundle 110. The cold water exchanges heat with the hot distillate across the tube bundle 110. This cools the distillate and at the same time heats up the cold water. The hot water from heat exchanger 290 is transported via tube 292 to hot water well 294 using means such as a pump. The cooled distillate is transported to well 296 via tube 298 using means such as a pump.

Water-to-Air Heat Exchanger

FIG. 20 shows a water-air heat exchanger 300. Although only one heat exchanger is shown in this embodiment, others could be added. Heat exchanger 300 receives hot distillate from hot well 254 via a control valve 352 through pump 120 and tube 358. Hot water collects in the enclosing space, surrounding tube bundle 110. Heat exchanger 300 receives cold air through tube 284. The cold air collects in the enclosing space, a dome shape in this embodiment, and moves through tube bundle 110. The cold air exchanges heat with the hot distillate across tube bundle 110. This cools the distillate and at the same time heats up the cold air. The hot air from heat exchanger 300 is transported via duct 286 to the utility as needed. The cooled distillate is transported to well 296 via tube 298 using means such as a pump.

Control Valve

FIG. 20 shows three control valves 350, 352 and 354. These control valves can be multi-port control valves having one or more inputs and one or more outputs. The input of control valve 350 is connected to compressor 60 through tube 244 and receives pressurized steam. The outputs of control valve 350 are connected to heat exchangers 280, 178 and to evaporator condenser 164 by tubes 344, 346 and 244 respectively. While this embodiment shows three outputs, additional outputs may be connected.

The input of control valve 352 is connected by tube 302 to pump 120 and receives hot distillate from well 254. The outputs of control valve 352 are connected by tube 356 and 358 to heat exchangers 290 and 300 respectively. This embodiment only shows two outputs, additional outputs may also be connected.

The input of control valve 354 is connected to lines 304, 274 and 306 and the output is connected to pan 34. Line 304 connects sump 294 to pan 34. Lines 274 and 306 connect a fresh water supply and suitable cleaning agents to pan 34. This embodiment only shows three inputs and one output. Additional inputs and outputs may also be connected as required.

In this embodiment, the control valve is controlled by a control box 122 under the control of master control 140, which provides a capability to connect the input to any of the many outputs at any time. The master control regulates the flow of liquid using these control valves.

Sensors

The embodiments shown in FIGS. 9 and 13 to 21 have two types of sensors. The first type, are utility sensors. They are situated in a utility or heating load, such as family home, and measure parameters such as temperature, pressure, humidity, level and flow, and vary according to the type of load and its operating parameters. The second type of sensors are called operating parameter sensors. They measure operating conditions, such as temperature, level, pressure, flow, and so on, in each heat exchanger and in the evaporator condenser. The sensors are located at various locations. Although they may be discrete, and placed in locations suitable for sensing a variety of state point parameters, for clarity and simplicity in this description they are referred to collectively as a sensor array, indicated as 90 connected to master control 140.

Master Control

Master control unit 140 is used to control the functioning of the portable immersed evaporator condenser and its energy recycling applications. Master control 140 divides its tasks into two main categories. The first category includes verifying that the portable immersed evaporator condenser is working as per a preprogrammed script. To that end, master control 140 collects data from sensor arrays such as 90 connected to control boxes such as 122 and algorithmically determines the action to be taken. Master control 140 can change operating conditions by operating actuators such as turning on or off heating coil 262, stirring fan 268 and operating valves such as 350. Master control 140 collects data from whichever of sensor arrays 90 may be present in different sub-systems of FIG. 20. Master control 140 is also connected to control valves 350, 352 and 354 through control box 122. Master control 140 uses the sensor data within a pre-programmed algorithm and issues control signals to the control valves, the heat source, pumps, compressor and other devices connected to the system.

Master control 140 also communicates the status of the actuating and sensor elements of the apparatus and the application to the operator through use of appropriate means such as internet or telephony. Master control 140 can also collect operational data over time and communicate it to the operator. Master control 140 has an application interface that allows operators and other authorized persons to control the system remotely. The same application interface can be used to interface other devices to the system. Master control 140 has features that allow other enabled devices to integrate seamlessly with application controlled by master control 140 and to share operating data and even to collaborate to share resources such as energy, water with other systems.

Method of Operation

Figure 24:
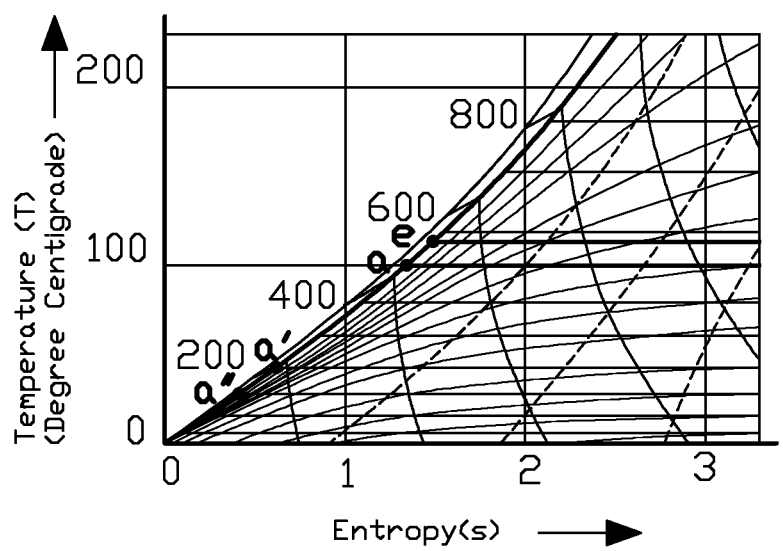
FIG. 24 shows an enlarged section of the Temperature-Entropy (T-S) diagram for sensible heating of water in heat exchanger followed by evaporator condenser.

FIGS. 9 and 12 to 19 show alternate embodiments of the apparatus. In these systems, soiled water fills septic tank 34 through an inlet valve 308 and tubing 310. Tubing 310 passes the soiled water through a heat exchanger 70 before arriving at septic tank 34 through tubing 312. When the system is operational, the incoming soiled water is pre-heated in heat exchanger 70. During operation, the working fluids undergo various phase transformations. FIGS. 2 and 24 illustrate the thermodynamic states of the working fluid during different stages of operation. Pre-heating of incoming soiled water is indicated by process 'a-a' in FIG. 24 where temperature of the incoming soiled water increases by receiving heat from the outgoing hot distillate in heat exchanger 70. Septic tank 34 serves as the pan of the pan evaporation system. Since, many houses, institutions and businesses already have septic tanks or equivalent, converting them into pan evaporators may be convenient and practicable.

Soiled water in the septic tank is further heated by turning on the coil or coils 262. This is indicated by process a'-a in FIG. 24. Alternatively, soiled water can also be heated by the external addition of heat from a heat source such as a wood fire, gas burners or solar energy (see FIGS. 11, 23, 26, 27 and 28). The soiled water begins to boil and the steam collects in low pressure vapour reservoir 172. This phase transformation is represented by process a-b in FIG. 2. Steam in vapour reservoir 172 is taken to demistifier or water separator 56 by tube 62 where the liquid water droplets are separated and dried steam flows through tube 242 to compressor 60. Vapour compressor 60 raises the pressure of the incoming steam. The pressurized steam flows to chamber 174 of evaporator condenser 164 (represented by process b-c in FIG. 2). In chamber 174 the steam exchanges heat in tube bundle 110 and condenses. Condensate 30 is pumped out by distillate pump 120 to heat exchanger 70 where it exchanges heat with incoming soiled water.

In another embodiment pressurized steam is communicated to chamber 196 of the double wall evaporator condenser shown in FIG. 10. In chamber 196 steam exchanges heat with soiled water and condenses. The phase transformation through exchange of latent heat of pressurized steam is shown by process c-d-e in FIG. 2. The condensate from chamber 196 is pumped out by distillate pump 120 to heat exchanger 70 where it exchanges heat with the incoming soiled water. The distillation process continues depleting the soiled water in the septic tank 34 and collecting as distillate in sump 254.

Over time, scale can build up on the evaporator condenser. In FIGS. 16 to 19 a scraper has a screw 128, motor 130 and scraper 106. The motor rotates under control of master control 140 and moves scraper 106 across the surface of the tube bundle, cleaning it periodically. In other embodiments other different scraper mechanism not shown can be used.

In FIG. 9, evaporator condenser 164, has two sensor arrays 90. Another sensor array 90 is mounted to ceiling 184. Sensor arrays 90 measure operating parameters such as temperature, pressure, fluid level, gas concentration, and so on. Sensor arrays 90 provide information about operating conditions to master controller 140 via a control box 122. The sensors monitor the operating conditions inside the evaporator condenser. For example, if the temperature begins to rise, master control 140 informs the operator using telephony or internet techniques. The operator may choose to turn off heating coil 262 and turn on stirring system 268. The operator can take these actions from a remote location, by using a software application that resides in their phone or personal computing device and communicates with the master control. The heating coil "off" signal is communicated to the master control, which implements it on the machine. Alternatively, the master control can have a pre-programmed algorithm that causes suitable control signals to be conveyed to the elements of the apparatus.

Figure 31:
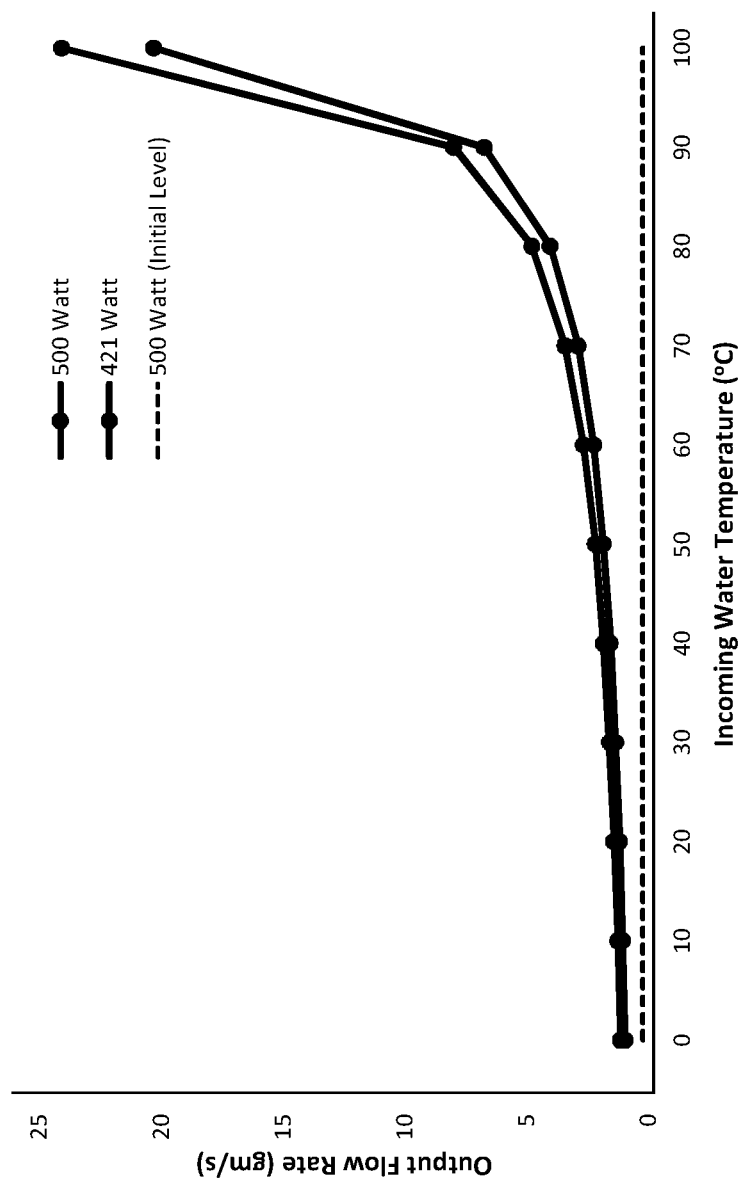
FIG. 31 shows a correlation of output flow rate to incoming water temperature for an apparatus according to an embodiment herein.

For example, FIG. 31 shows that the yield of the system at pump 120 increases substantially with the increase in input soiled water temperature at the entry to the evaporator condenser 164 from heat exchanger 70.

Distillate extraction pump 120 also collects distillate from evaporator condenser 164 through tube 278. Distillate extraction pump 120 is controlled by master control 140 through control box 122. Vapour compressor 60 is also regulated by master control 140 through a control box 122.

Distillate pump 120, which collects the distillate from the evaporator condenser and other sources of distillate such as the demistifier, heat exchangers etc., may be one pump or more than one as may be necessary.

Figure 29:
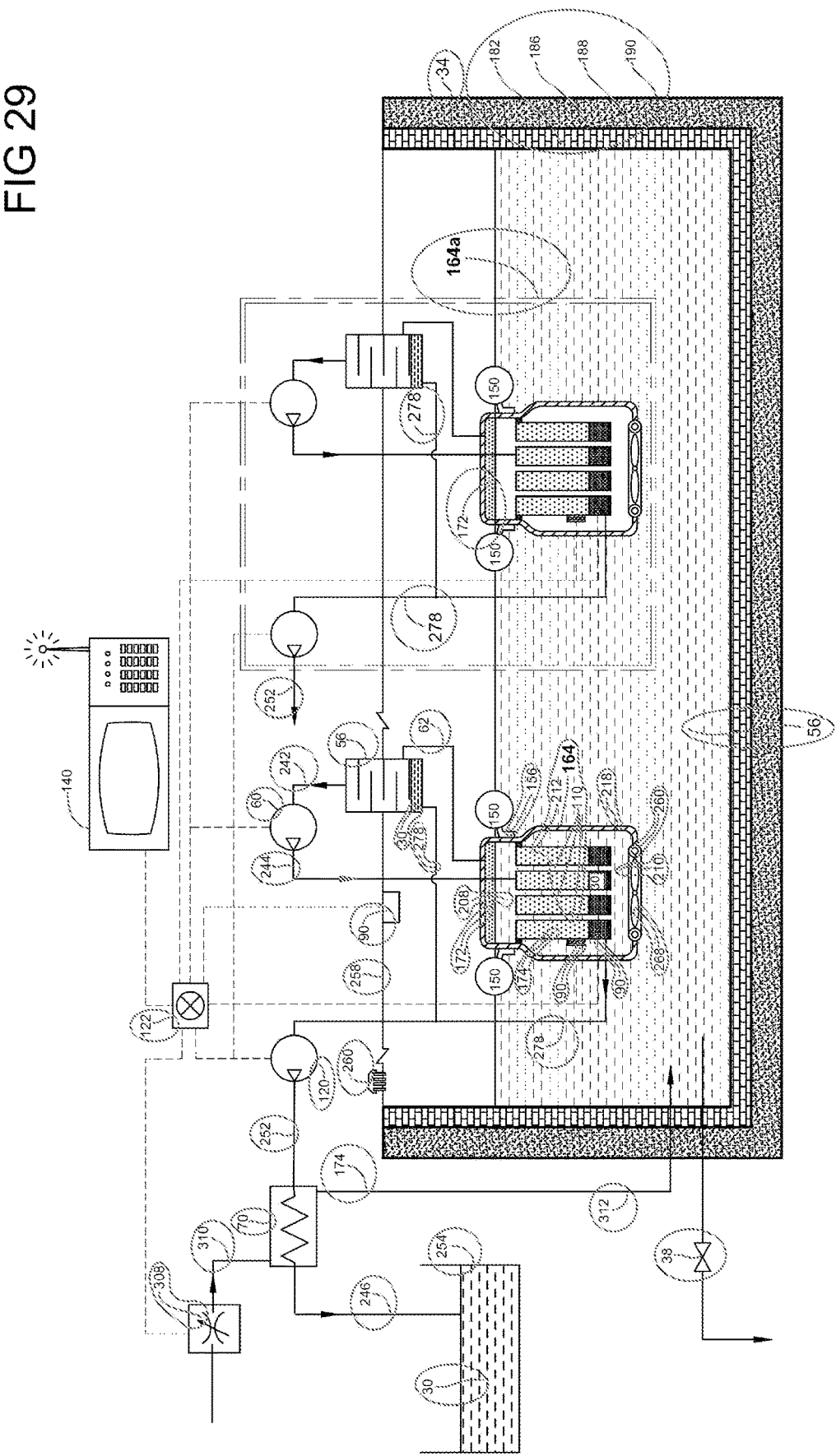
FIG. 29 shows two modules of the portable evaporator condenser is such as used in FIG. 9 controlled by the same master control.

FIG. 29 shows two evaporator condensers 164. They are both connected to the same master control 140 via the same control box 122. The master control 140 can deploy both of the units or can deploy one as required. The modularity of the system ensures that additional units can be easily added, as an increase in capacity of processing is required.

FIG. 30 shows an example of a circuit 236 that removes trapped gases and facilitates the flow of vapour in vapour reservoir 172. Pre-heated air from heat exchanger 240 enters the vapour reservoir 172 through tube 272 and facilitates the flushing of the vapour in to the inlet of the demistifier, or water separator 56, via tube 62. Dried steam flows to compressor 60 where its pressure is increased and it is injected via tube 244 into chamber 174 of the evaporator condenser 164 or 166. Excess vapour in steam chamber 172 is exhausted through tube 238 to the air scrubber and heat exchanger 240, where it heats the incoming air. A gas scrubber may be used in some embodiments and can be placed at other locations.

The production rate for distillate depends on the thickness of the film that will form around the condenser walls. The thickness of the film depends on the thermal conductivity, viscosity, density of fluid at distillate temperature, geometric features of the surface and the temperature gradient across the film. To enhance heat transfer between the compressed steam and the evaporator mechanical means such as centrifuge and scrapings etc. can be employed.

Distributed processing may involve use of the energy recycling vapour distillation system in a family home or at the institutional level. Each unit needs a source of energy such as electricity or gas etc. Use of high grade energy will result in using more fossil fuel or tax our electricity grid. Use of the apparatus herein may permit fuel currently being used for other applications such as heating water and air for human comfort to be reduced, and to use the hot distillate produced in the vapour distillation process to meet the need for hot water and air in a family dwelling or in a institute such as a hospital or university etc., in whole or in part, instead. Some embodiments permit a vapour distillation system to use power sources that are in local abundance, such as solar power.

Figure 21:
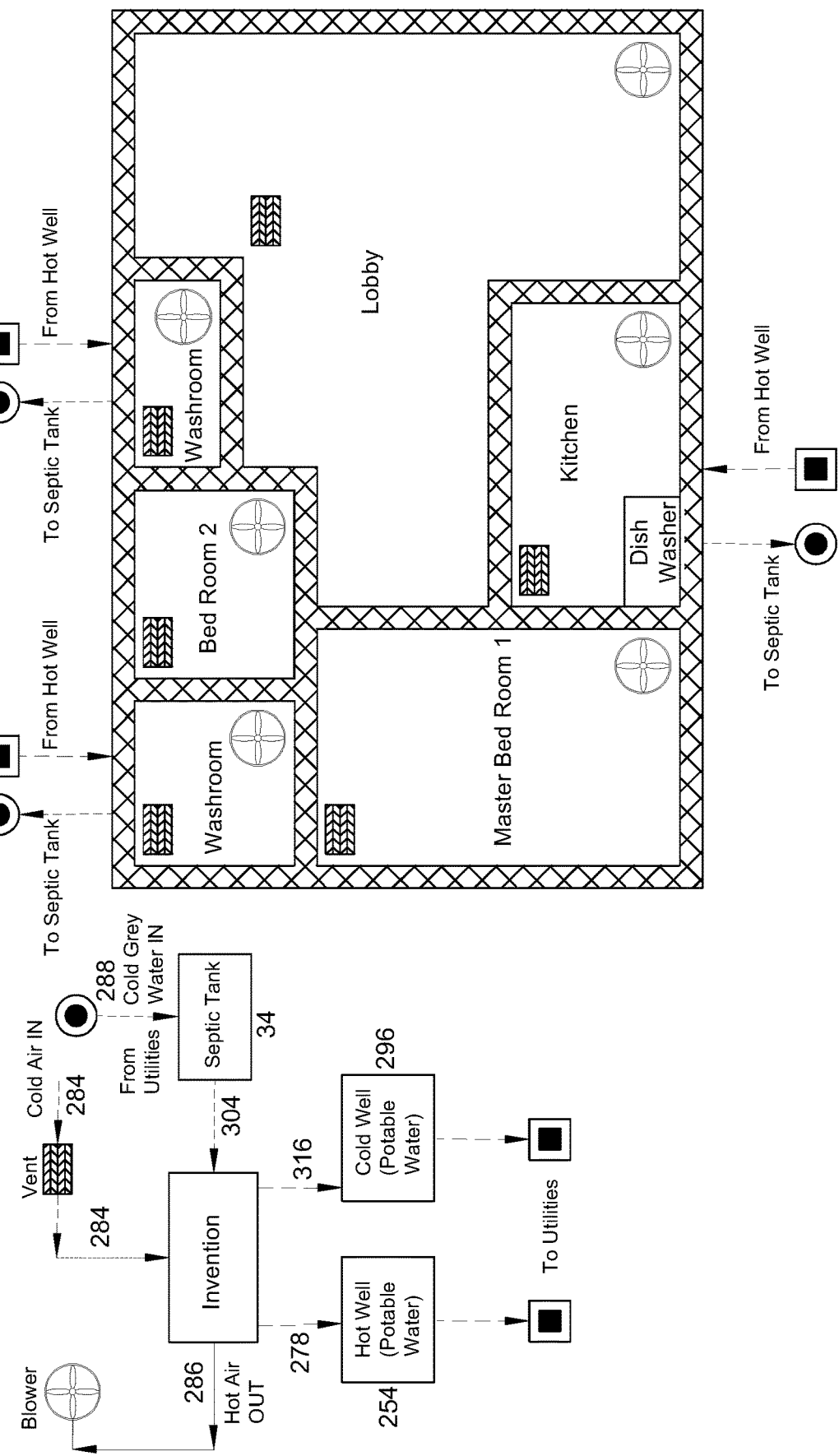
FIG. 21 shows a typical family home identifying the sources of waste-water generation and locations of air diffusers for distributing warm air. The waste-water is collected in the septic tank for processing by the invention.

In FIG. 20 the apparatus is used to supply heated water and heated air to a house while cleaning the soiled water generated in a family home. FIG. 21 shows a family house with locations of waste-water generation and locations for heated air diffusers. The generated waste-water is collected in a sump (e.g., the septic tank) 34. The numbering of tubes and lines in FIG. 21 correspond to those of FIG. 20. The waste-water from sump 34 is processed to remove solids from it and the cold gray water through feed line 288 (see FIG. 20) is pre-heated in a water-water heat exchanger 290 where it is heated by absorbing heat from hot distillate brought from sump 254 by a pump 120 through line 356. The pre-heated gray water is stored in the hot well 294 through line 292.

When the level in pan evaporator 34 drops below a predetermined level, or datum, pre-heated gray water from sump 294 is pumped into pan evaporator 34 through line 304. Inside the pan evaporator, gray water is distilled by the process described above. Hot distillate 30 is transported to the hot well 254 via tube 278. The hot distillate in well 254 is around saturation temperature. Any reduction in temperature is due to thermal losses during transportation of liquid through various devices such as tubes and pumps. Thus, a substantial amount of thermal energy is stored in the hot water in sump 254. This thermal energy in sump 254 is used for two purposes under the control of the master control 140.

First, some of the hot water in sump 254 is used to pre-heat the cold gray water coming from the family home through line 288 in water-water heat exchanger 290. In this process the hot distillate loses some of its thermal energy and its temperature may drop for example to about 40 degrees C. This colder distilled (potable) water is stored in sump 296 from where it can be used in the home directly or to heat water from an auxiliary source.

Second, some of the hot water in sump 254 is used to heat the water required in the family home and to meet the need for hot air in the family home. The method of meeting these needs is explained in terms of the various states the systems may encounter and the ways in which the master control 140 handles them.

In one state of operation the evaporator condenser 164 is processing soiled water 28 from well 294 and producing hot distillate 30 which is transported to well 254 via tube 278. In this state, hot distillate 30 is sent to heat exchanger 290 via tube 356 via pump 120 and control valve 352 to heat up the incoming cold soiled water from tube 288. The hot grey water from heat exchanger 290 is stored in the well 294 through tube 292. This heated soiled water is the source of water being pumped into the pan 34.

In a second state of operation, master control 140 determines that warm air is required in the family home. Master control 140 instructs control valve 352 to direct hot distillate from sump 254 to heat exchanger 300 through tube 358. The heat exchanger heats up the air and produces cold distillate that is stored in well 296 through tube 298. If the amount of air required is not met then master control 140 instructs control valve 350, through control box 122, to direct pressurized steam to heat exchanger 280 via tube 348. Heat exchanger 280 heats the incoming cold air through duct 284 by exchanging heat with the pressurized steam coming through tube 348. The heated air flows through duct 286 to the utility (the home) and condensate 30 flows to hot well 254 via tube 278. The system can operate in this state for a short period of time. To increase the period of operation the heat source will have to provide additional heat.

In the third state of operation, master control 140 determines that warm water is required. It instructs utility pump 314 to send water from well 296. If additional hot water is required and the need cannot be met by well 296, then master control 140 directs control valve 350, through control box 122, to send pressurized steam to heat exchanger 178 via tube 346. Here the steam condenses and heats up incoming cold fresh water from tube 274. The hot fresh water is sent to well 296 via 316 and augments the need for heated water. The condensate 30 is communicated to well 254 via tube 278.

In the fourth state of operation, master control 140 determines that both warm water and air are required. Master control 140, through control box 122, directs control valve 352 to split the incoming hot distillate from well 254 to heat exchangers 290 and 300 in appropriate proportions. The master control also turns on pump 314 to supply hot water from well 296.

In the fifth state of operation, master control 140 determines that a large amount of heated air is required. Master control 140, through control box 122, instructs control valve 352 to direct all the hot water to heat exchanger 300 and at the same time instructs control valve 350 to direct pressurized steam to heat exchanger 280. Master control 140 further instructs heating source 262 to supply additional heat. This state will produce a large volume of heated air.

In the start-up state of operation, master control 140 turns on the heating source 262. During this transient state the distillate in well 254 will gradually increase and so will the ability of the system to supply warm water and hot air. Other techniques to speed up the start-up phase can also be used.

Apparatus as described herein may require periodic cleaning. In a first method the unit is cleaned on site. In this method the unit is shutdown and cleaned. In this state, master control 140 instructs the control valve 354 to switch the intake of the evaporator condenser from a source of soiled water from line 304 to a fresh water supply delivered by line 274. It also meters detergent or other cleaning agents through line 306 under the control of the master control 140. For cleaning, the system may activate stirring system 268 or other similar devices. Once cleaning is complete the system is purged of liquid. In a second method, the unit is removed from the pan or vessel and cleaned.

Figure 22:
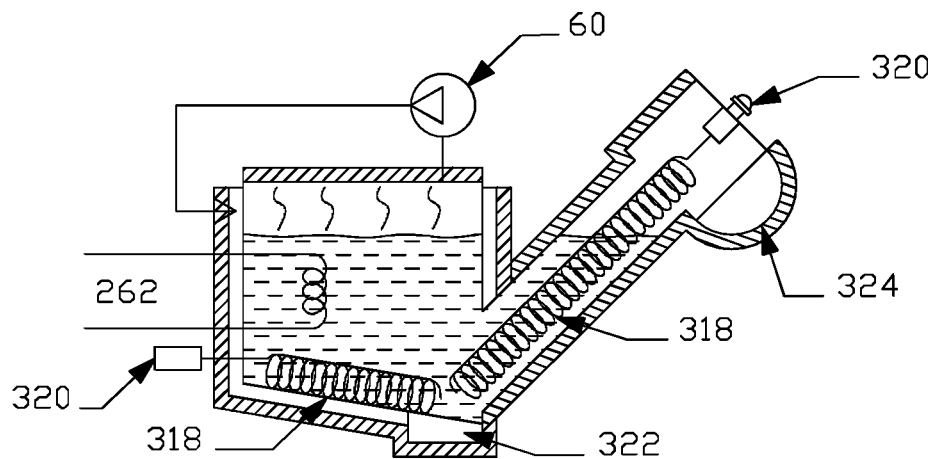
FIG. 22 shows schematically an embodiment of the apparatus of FIG. 9 with a method for collecting solids deposited at the bottom of the pan using helical augers.

FIG. 22 shows an embodiment of the Portable Modular Energy Recycling Evaporator Condenser in a pan. The pan 34 in this embodiment has an apparatus for removing solids, that includes two helical sedimentation augers 318 driven by motors 320. The first auger 318 moves solids laterally along the sloping bed of the pan and collects it in the sump 322. The second auger 318 takes the solid from sump 322 and moves it to sump 324 near the trap door. From this sump the solid waste can be removed by appropriate means.

Figure 23:
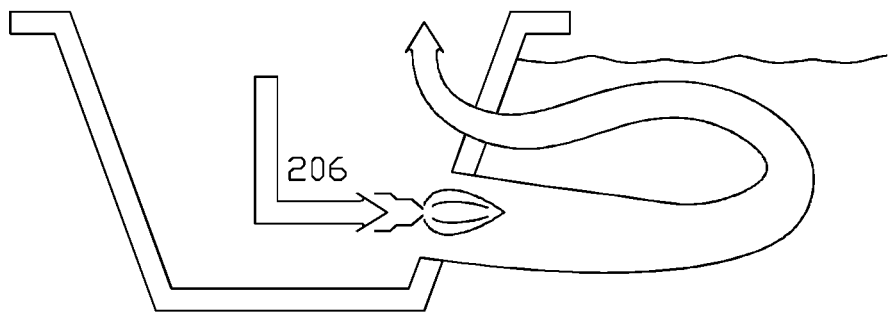
FIG. 23 shows a schematic of a gas burner that can be integrated to the pan for heating soiled water according to FIG. 9.

FIG. 23 shows a burner fired by natural gas or other gaseous means. The burner can be suspended into the pan via appropriate means and used as a heat source similar to heating coil 262 or heating source 64 of FIG. 11.

Figure 28:
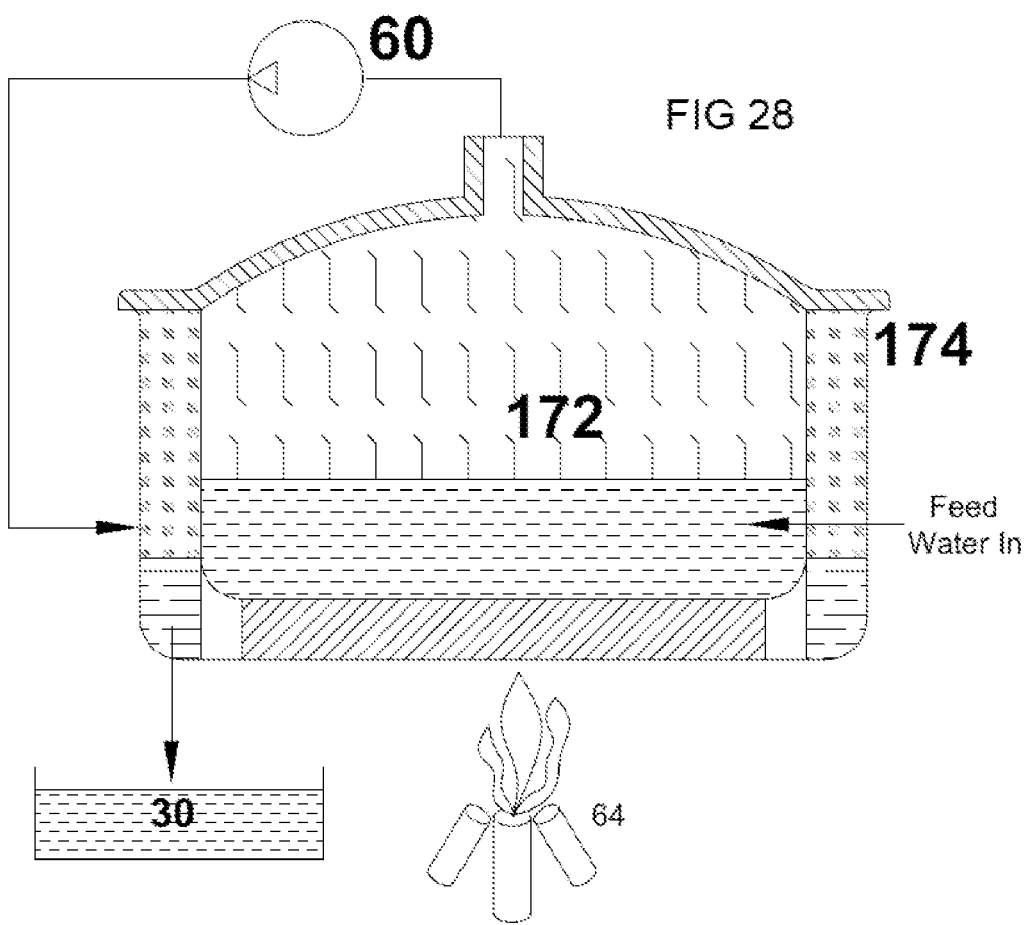
FIG. 28 shows an embodiment of the apparatus of FIG. 9 in the form of a cooking vessel.

FIG. 28 shows an embodiment in which many common utensils used in the house are coupled to the PMEREC as sources of soiled water and users of distilled water. The embodiment shows that the PMEREC system is connected to the dishwasher, bathroom appliances etc.

Figure 25:
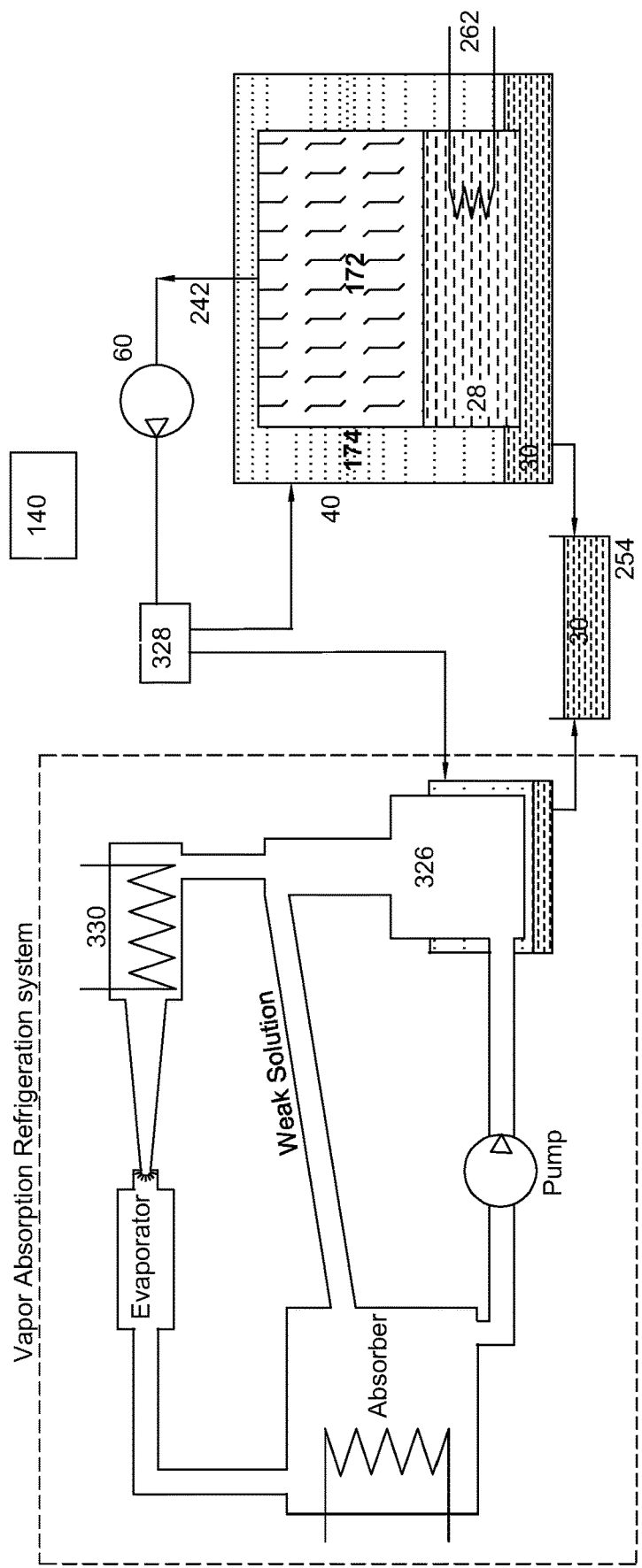
FIG. 25 shows an embodiment of the apparatus of FIG. 9 integrated with a vapour absorption refrigeration system.

FIG. 25 shows an embodiment integrated with a vapour absorption refrigeration system. The embodiment shows a generic evaporator condenser 40. The typical refrigeration system requires heat input into the generator 326. Master control 140 at the appropriate time directs the control valve 328 to send steam to the outer jacket of generator 326. Steam heats up water in the generator and increases its capacity to absorb ammonia or similar gas. This water is pumped to the condenser 330 of the refrigeration system and the process continues. The generated steam can be redirected by valve 328 to any application requiring heat input.

Figure 26:
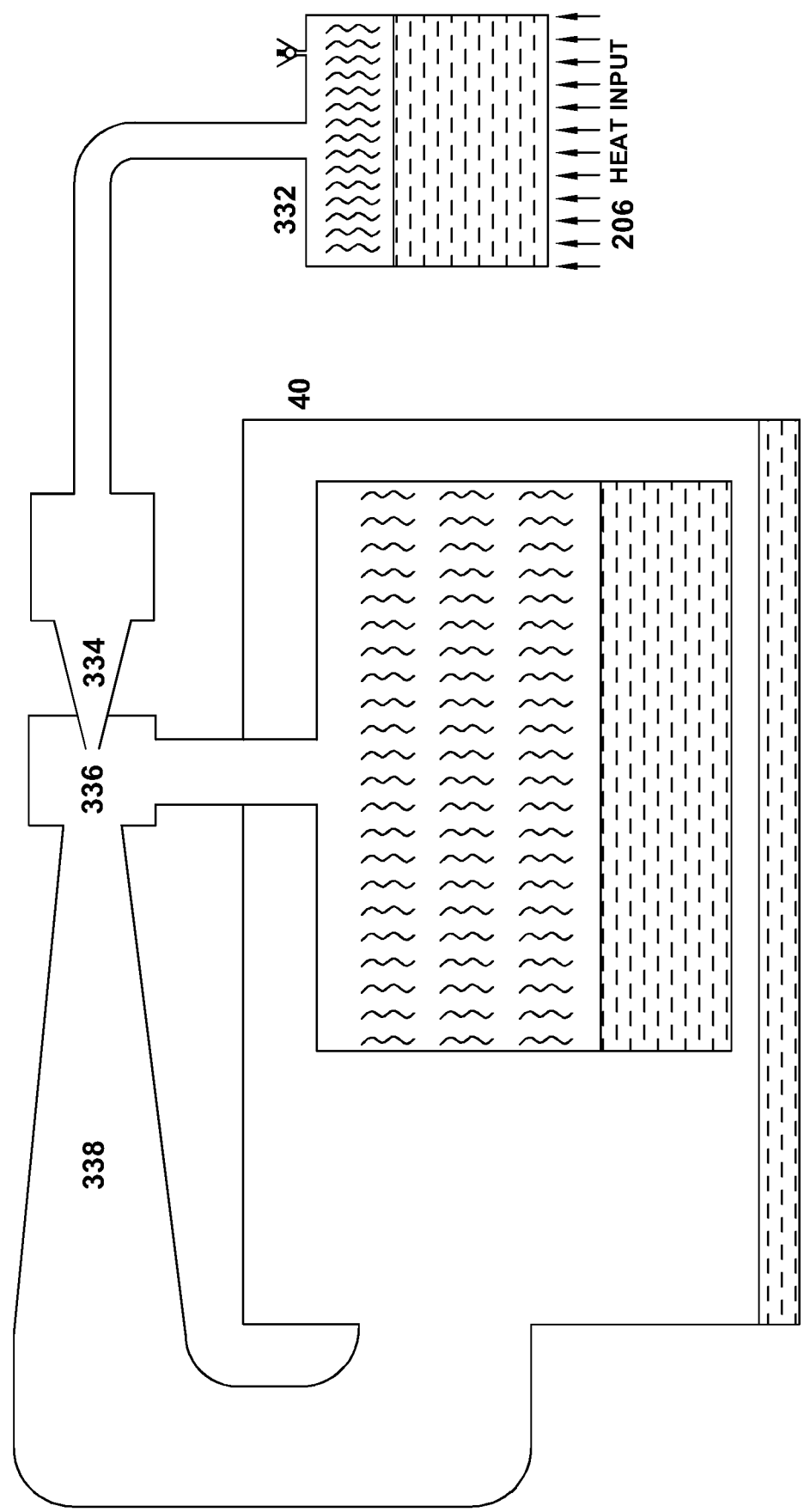
FIG. 26 shows an embodiment of the apparatus of FIG. 9 that uses a thermo-compressor.

FIG. 26 shows an embodiment that does not employ a reciprocating or rotary compressor. In this embodiment a thermo compressor is used to pressurize the steam generated in pan 34. The thermo compressor has an evaporation chamber 332 where steam is produced from water. The steam at high pressure, called motive steam, is taken to a nozzle 334, and released to a chamber 336. The steam leaves the nozzle at high speed, creating a local vacuum in chamber 336 causing steam from inside chamber of 40 to be sucked into chamber 336. A diffuser 338 is connected to chamber 336 where the velocity head of the mixed steam is converted to pressure head and the pressurized steam is taken to the outer jacket of the evaporator condenser 40. In this jacket the steam comes in contact with the relatively cooler surface of the inner chamber of evaporator 40 and condenses releasing its latent heat back into the water in the inner chamber of 40. In alternate embodiments compressed air may be used instead of steam.

Figure 27:
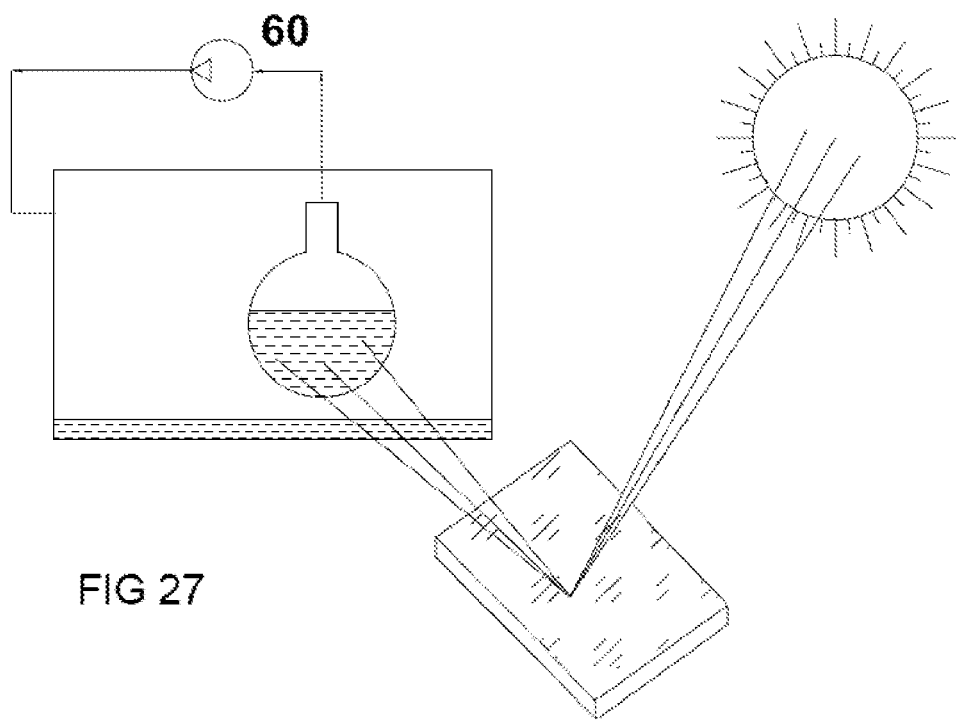
FIG. 27 shows an embodiment of the apparatus of FIG. 9, which uses solar energy as the source of heat.

FIG. 27 shows an embodiment that employs solar energy as the source of heating. In this embodiment the outer shell of the pan is made of transparent material. The inner chamber of the pan is made of heating conducting material. The solar rays reflect off a reflecting surface and fall on the inner chamber, thereby heating it. The heating of inner chamber produces steam that is pressurized by compressor 60 and used. The solar energy can be used in other embodiments for driving the various fluid handling devices. The heat input source 64 of FIG. 26 may be solar rays in an appropriately designed system.

FIG. 28 shows an embodiment used in a cooking vessel. The steam produced during the cooking process 172 is pressurized by a compressor 60 and injected into an outer chamber 174 where it condenses on the relatively cooler surface of the inner chamber and releases it latent heat that is recycled into the food being cooked.

The embodiments and the method disclosed in this disclosure document have focused on water, however, apparatus as described herein are not necessarily limited to water only and can be used for other fluids such as oils.

Uses of the Apparatus

Apparatus of the nature described above may be used in other applications. For example, car washes are common in our society. Car washes produce large quantity of soiled water. The apparatus described above can be used to clean the soiled water and reuse the distilled soft water. A similar application exists in laundromats or other industrial applications where a lot of soiled water is produced. Tailings ponds for oil or other mineral extraction may pose similar challenges. In the food industry, it may be desired to use such an apparatus to concentrate fruit juice or to make jams and jellies. Apparatus of the nature described above may be used for desalination processes. Since the invention is portable it can be used abroad ships and other off-shore vessels.

The distilled water by-product can be used as feed water in industrial boilers and other applications, the apparatus being used to produce distilled water and not as a method of recycling.

Distributed processing applies to many other processes. As an example maple sap is collected from trees located at different geographical locations and has to be transported to a central location for processing. Alternatively, many establishments choose to process the maple sap at the source (a family farm) itself. Here as well pan evaporators are used with a lot of energy consumed to boil the maple sap until it turns into syrup, in a manner analogous to jaggery.

Various embodiments have been described in detail. Since changes in and or additions to the above-described examples may be made without departing from the nature, spirit or scope of the invention, the invention is not to be limited to those details.

I claim:

1. A floating heat exchanger in combination with a compressor, for use with a fluid that includes an at least partially liquid medium, wherein:
   the heat exchanger is mounted to transfer heat to the fluid in which the heat exchanger is mounted to float;
   said compressor is connected to receive input vapour leaving said floating heat exchanger, and
   said compressor has an output connected to return compressed vapour to said floating heat exchanger, whereby heat from the compressed vapour is transferred away therefrom in said floating heat exchanger.

2. The floating heat exchanger and the compressor of claim 1, wherein:
   said floating heat exchanger is mounted to a buoyant member for floatation in the at least partially liquid medium;
   said heat exchanger has at least a first heat transfer interface at which, in operation, said heat exchanger interacts with the at least partially liquid medium;
   said heat exchanger has a second heat transfer interface, said second heat transfer interface having an inlet and an outlet by which a working fluid may pass, whereby, in operation, heat is transferred between the working fluid and the at least partially liquid medium through said first and second heat transfer interfaces.

3. The floating heat exchanger and the compressor of claim 2 in combination with a vapour collector mounted to capture vapour given off by the liquid medium in consequence of heating thereof.

4. The floating heat exchanger and the compressor of claim 3 wherein said vapour collector is movable in response to changes in fluid level of said at least partially liquid medium.

5. The floating heat exchanger and the compressor of claim 1 wherein, in operation, at least part of said first heat transfer interface is submerged in the at least partially liquid medium.

6. A distillation apparatus comprising:
   a heat exchanger having a first side and a second side; and
   a compressor;
   said first side of said heat exchanger being mounted for interaction with an at least partially liquid source fluid, whereby to heat at least a portion of the source fluid;
   the compressor being mounted to take in vapour from the source fluid;

the compressor being mounted to output compressed vapour to said second side of said heat exchanger;

said second side of said heat exchanger being in heat transfer co-operation with said first side of said heat exchanger whereby, in operation, heat flows from said second side to said first side and into said source fluid; and said distillation apparatus accommodating changes in fluid level of the at least partially liquid fluid source.

7. The distillation apparatus of claim 6 wherein, in use, said heat exchanger is at least partially immersed in the source fluid.

8. The distillation apparatus of claim 6 wherein said heat exchanger is mounted to move in response to fluid level of the source fluid.

9. The distillation apparatus of claim 6 wherein said heat exchanger is floatingly mounted relative to the source fluid.

10. The distillation apparatus of claim 6 further comprising a buoyant member mounted to float relative to the source fluid, and said heat exchanger is mounted to said buoyant member.

11. The distillation apparatus of claim 6 further comprising a vapour collector mounted to extract vapour from the first side of the heat exchanger.

12. The distillation apparatus of claim 11 wherein said vapour collector is mounted to rise and fall with said heat exchanger.

13. The distillation apparatus of claim 6 wherein said distillation apparatus includes multiple stages mounted in series and at least one of:

(a) each of said stages includes a pan for source fluid, and, in operation, said pans are arranged in series for successive processing of the source fluid; and (b) each stage has a respective said heat exchanger; said compressor is a first compressor of a first stage of said apparatus, and there is at least a second compressor of a second stage of said apparatus; said first compressor draws vapour from a first said heat exchanger and said second compressor draws vapour from a second of said heat exchangers.

14. The distillation apparatus of claim 13 wherein at least one of:

(a) any compressor of said apparatus draws vapour from more than one of said stages; and (b) output of any compressor of said apparatus is allocated to heat exchangers of more than one said distillation stage.

15. The distillation apparatus of claim 6 wherein said compressor is a first compressor, said apparatus includes an electronic control system and an array of sensors, and output from at least said first compressor is allocated by said electronic control system to at least one heat exchanger second side in response to sensed observations.

16. The distillation apparatus of claim 6 wherein said apparatus includes at least one of (a) an agitator mounted to disturb the source fluid; and (b) at least one wiper operable to discourage encrustation of source fluid.

17. The distillation apparatus of claim 6 wherein said apparatus includes a concentrate accumulator mounted to receive an output source fluid remainder; and said apparatus includes a feedstock heater mounted to transfer heat from said accumulator to incoming source fluid.

18. The distillation apparatus of claim 6 wherein said apparatus includes an external heat source.

19. The distillation apparatus of claim 6 wherein said second side of said heat exchanger is a condenser.

20. An energy recycling system comprising the distillation apparatus of claim 6 and a sump to collect condensed liquid from any components of the distillation apparatus;

at least one other heat exchanger;

a control valve with at least one input for hot water and at least one output connected to said at least one other heat exchanger, said control valve being operable to direct flow of the input to said at least one output;

a fluid conduit connected to transport hot water from said sump to the input of the control valve;

when said control valve directs hot water to said at least one other heat exchanger heat in the hot water is transferred to a second medium;

at least one sensor mounted to monitor a system parameter; and said control valve being connected to function in response to the at least one sensor.

* * * * *